(12) United States Patent
Kim et al.

(10) Patent No.: US 12,587,894 B2
(45) Date of Patent: Mar. 24, 2026

(54) METHOD AND WIRELESS COMMUNICATION TERMINAL FOR TRANSMITTING/RECEIVING DATA IN WIRELESS COMMUNICATION SYSTEM

(71) Applicant: WILUS INSTITUTE OF STANDARDS AND TECHNOLOGY INC., Gyeonggi-do (KR)

(72) Inventors: Sanghyun Kim, Seoul (KR); Geonjung Ko, Gyeonggi-do (KR); Juhyung Son, Gyeonggi-do (KR); Jinsam Kwak, Gyeonggi-do (KR)

(73) Assignee: WILUS INSTITUTE OF STANDARDS AND TECHNOLOGY INC., Gyeonggi-do (KR)

( * ) Notice: Subject to any disclaimer, the term of this patent is extended or adjusted under 35 U.S.C. 154(b) by 259 days.

(21) Appl. No.: 18/109,251

(22) Filed: Feb. 13, 2023

(65) Prior Publication Data

US 2023/0199551 A1 Jun. 22, 2023

Related U.S. Application Data

(63) Continuation of application No. PCT/KR2021/010833, filed on Aug. 13, 2021.

(30) Foreign Application Priority Data

| | | |
|---|---|---|
| Aug. 13, 2020 | (KR) ........................ | 10-2020-0101519 |
| Mar. 11, 2021 | (KR) ........................ | 10-2021-0032318 |
| Jun. 8, 2021 | (KR) ........................ | 10-2021-0073933 |

(51) Int. Cl.
*H04W 28/02* (2009.01)

(52) U.S. Cl.
CPC ... *H04W 28/0263* (2013.01); *H04W 28/0268* (2013.01)

(58) Field of Classification Search
CPC ............... H04W 28/082; H04W 76/15; H04W 28/0263; H04W 28/0268; H04W 76/11; H04W 84/12; H04L 69/14
See application file for complete search history.

(56) References Cited

U.S. PATENT DOCUMENTS

| | | | | |
|---|---|---|---|---|
| 2008/0311923 A1* | 12/2008 | Petrovic | ................ | H04W 76/12 |
| | | | | 455/450 |
| 2016/0278138 A1* | 9/2016 | Chen | ..................... | H04W 76/15 |
| (Continued) | | | | |

FOREIGN PATENT DOCUMENTS

| | | |
|---|---|---|
| GB | 202003452 | 3/2020 |
| KR | 10-2017-0062719 A | 6/2017 |
| | (Continued) | |

OTHER PUBLICATIONS

International Search Report for PCT/KR2021/010833 mailed on Dec. 1, 2021 and its English translation from WIPO (now published as WO 2022/035291).

(Continued)

*Primary Examiner* — Mehmood B. Khan
(74) *Attorney, Agent, or Firm* — EIP US LLP

(57) ABSTRACT

Disclosed is a method by which a multi-link device (MLD) of a wireless communication system transmits a frame. The MLD transmits a request frame for mapping between a traffic identifier (TID) and a link, and the request frame can include: first mapping information for establishing a mapping relationship between one or more TIDs from among a plurality of TIDs and one or more links; and information related to the number of the one or more TIDs for which mapping with the one or more links is requested. Thereafter, the MLD can receive a response frame in response to the request frame, and first remaining TIDs that exclude the one or more TIDs from among the plurality of TIDs maintain, to be valid, a previously established mapping relationship with (Continued)

(C)TID-to-Link Mapping element a link, or a default mapping relationship is applied, and, for the first remaining TIDs, a mapping relationship with a specific link may not be indicated by the first mapping information.

16 Claims, 24 Drawing Sheets

(56) References Cited

U.S. PATENT DOCUMENTS

| | | | |
|---|---|---|---|
| 2019/0261402 A1 | 8/2019 | Asterjadhi et al. | |
| 2020/0137626 A1 | 4/2020 | Huang et al. | |
| 2021/0037583 A1 | 2/2021 | Seok et al. | |
| 2021/0058868 A1* | 2/2021 | Cariou | H04W 52/0206 |
| 2021/0144787 A1* | 5/2021 | Kwon | H04W 72/23 |
| 2021/0274500 A1* | 9/2021 | Cariou | H04W 48/08 |
| 2022/0124855 A1 | 4/2022 | Hu et al. | |

FOREIGN PATENT DOCUMENTS

| | | |
|---|---|---|
| WO | 2018/066955 | 4/2018 |
| WO | 2020/243117 | 12/2020 |
| WO | 2021/011476 | 1/2021 |
| WO | 2022/035291 | 2/2022 |

OTHER PUBLICATIONS

Written Opinion of the International Searching Authority for PCT/KR2021/010833 mailed on Dec. 1, 2021 and its English translation by Google Translate (now published as WO 2022/035291).
Kwon, Young Hoon et al.: "Multi-Link TIM", IEEE 802.11-20/0066r2, May 19, 2020, slides 1-18.
Patil, Abhishek et al.: "MLO: Efficient Paging", IEEE 802.11-19/1955r2, Jun. 1, 2020, slides 1-17.
Jang, Insun et al.: "Indication of Multi-link Information: Follow-up", IEEE 802.11-20/0741r1, Jul. 22, 2020, slides 1-18.
Seok, Yongho et al.: "Multi-Link Operation Management", IEEE 802.11-19/1358r4, Nov. 13, 2019, slides 1-14.
Seok, Yongho et al.: "MLO TID-to-link Mapping", IEEE 802.11-21/0019r3, Mar. 1, 2021, slides 1-11.
Seok, Yongho et al.: "MLO TID-to-link Mapping", IEEE 802.11-21/0019r5, Mar. 25, 2021, slides 1-10.
Seok, Yongho et al.: "MLO TID-to-link Mapping", IEEE 802.11-21/0019r8, Apr. 13, 2021, slides 1-11.
Seok, Yongho et al.: "MLO TID-to-link Mapping", IEEE 802.11-21/0019r9, Apr. 13, 2021, slides 1-11.
Seok, Yongho et al.: "MLO TID-to-link Mapping", IEEE 802.11-21/0019r10, Apr. 14, 2021, slides 1-11.
Extended European Search Report dated Jul. 11, 2024 for European Patent Application No. 21856297.3.
Laurent Cariou et al.: "Multi-link: steps for using a link", doc.: IEEE 802.11-19/1924r1, Jan. 16, 2020, slides 1-24.
Insun Jang et al.: "Indication of Multi-Iink Information: Follow-up", doc.: IEEE 802.11-20/0741r0, Jul. 15, 2020, slides 1-18.
Young Hoon Kwon et al.: "Multi-Link TIM", doc.: IEEE 802.11-20/0066r3, May 21, 2020, Slides 1-16.
Notice of Allowance dated Jun. 3, 2025 for Japanese Patent Application No. 2023-510432 and its English translation from Global Dissier.
Payam Torab et al. (Facebook): "Comment Resolution for ML Reconfiguration", doc.: IEEE 802. 11-21/0534r3 , May 29, 2021 , [retrieved on May 28, 2025], Retrieved from the Internet<URL:https://mentor.ieee.org/802.11/dcn/21/11-21-0534-03-00be-cr-ml-reconfiguration.docx>, pp. 1-17.
Sharan Naribole et al. (Samsung): "MLO Constraint Indication and Operating Mode", doc.: IEEE 802.11-20/0226r5 , Apr. 24, 2020 , [retrieved on May 28, 2025], Retrieved from the Internet<URL:https://mentor.ieee.org/802.11/dcn/20/11-20-0226-05-00be-mlo-constraint-indication-and-operatingmode.pptx>, slides 1-28.
Yongho Seok et al. (MediaTek): "Proposed Draft Text for MLO TID-to-link Mapping", doc.: IEEE 802.11-21/0019r10 , Apr. 14, 2021 , [retrieved on May 28, 2025], Retrieved from the Internet<URL:https://mentor.ieee.org/802.11/dcn/21/11-21-0019-10-00be-pdt-mlo-tid-to-link-mapping.docx>, pp. 1-11.
Laurent Cariou et al. (Intel): "Resolutions for CC34 CIDs for MLO TID to link mapping subclause", IEEE 802.11-21/0282r1 , Apr. 19, 2021, [retrieved on May 28, 2025], Retrieved from the Internet<URL:https://mentor.ieee.org/802.11/dcn/21/11-21-0282-01-00be-resolutions-for-cc34-cids-for-mlo-tid-to-link-mapping-subclause.docx>, pp. 1-14.
Office Action (1st) dated Apr. 24, 2025 for European Patent Application No. 21856297.3.
Cariou et al., "Multi-link: steps for using a link," IEEE 802.11-19/1924r0 Jan. 6, 2020, 23 pg.
Patil et al., "MLO: Efficient Paging," IEEE 802.11-19/1955r3 Jun. 1, 2020, 17 pgs.
European Office Action issued in 21856297.3, dated Oct. 1, 2025, 7 pgs.
Chinese Office Action issued in 202180068453.6, dated Aug. 14, 2025, 14 pgs.

* cited by examiner

(a) AP MLD (b) Non-AP MLD

| Link ID | TIDs info | ... |
|---------|-----------|-----|

(C)TID-to-Link Mapping element

(a) Default TID-to-Link mapping

FIG. 13

| Link ID | TIDs info | QMF Support | ... | (QMF)Management Frame Subtype | ... |
|---------|-----------|-------------|-----|-------------------------------|-----|

TID-to-Link Mapping element

(a) TID-to-Link Mapping element example (b) QMF transmission example

| Element ID | Length | Element ID Extension | TID-to-Link Mapping Control | TID-to-Link Mapping Info fields |
|------------|--------|----------------------|-----------------------------|----------------------------------|

Variable length

(a) TID-to-Link Mapping element format

| TID-to-Link Mapping info size | Link Bitmap size | Reserved |
|-------------------------------|------------------|----------|

(b) TID-to-Link Mapping Control field format

| TID Info | Link Info |
|----------|-----------|

Variable length

(c) TID-to-Link Mapping Info field format (a) Initial TID-to-Link mapping status (default mode)

(b) TID-to-Link Mapping negotiation (c) Established TID-to-Link Mapping status

TID-to-Link Mapping procedure (example)

(a) TID-to-Link Mapping element format (b) TID-to-Link Mapping Control field format

| Element ID | Length | Element ID Extension | TID-to-Link Mapping Control | Link Mapping Of TID 0 (Optional) | ... | Link Mapping Of TID 7 (Optional) | Padding (Optional) |
|---|---|---|---|---|---|---|---|
| Bits: 8 | 8 | 8 | 16 | 0~15 | | 0~15 | 0~7 |
| Octets: 1 | 1 | 1 | 2 | Variable | | Variable | Variable (to meet 'Octet' boundary) |

'n' Octets

TID-to-Link Mapping element format
(variable length in Link Mapping Of TID field)

METHOD AND WIRELESS COMMUNICATION TERMINAL FOR TRANSMITTING/RECEIVING DATA IN WIRELESS COMMUNICATION SYSTEM

CROSS-REFERENCE TO RELATED APPLICATIONS

The present application is a continuation of PCT Application No. PCT/KR2021/010833 filed on Aug. 13, 2021, which claims the priority to Korean Patent Application No. 10-2020-0101519 filed with the Korean Intellectual Property Office on Aug. 13, 2020, Korean Patent Application No. 10-2021-0032318 filed with the Korean Intellectual Property Office on Mar. 11, 2021, and Korean Patent Application No, 10-2021-0073933 filed with the Korean Intellectual Property Office on Jun. 8, 2021, the entire contents of which are incorporated herein by reference.

TECHNICAL FIELD

The present disclosure relates to a wireless communication system and, more particularly, to a wireless communication method and a wireless communication terminal for efficiently signaling of uplink (UL) multi user information in a wireless communication system.

BACKGROUND ART

In recent years, with supply expansion of mobile apparatuses, a wireless LAN technology that can provide a rapid wireless Internet service to the mobile apparatuses has been significantly spotlighted. The wireless LAN technology allows mobile apparatuses including a smart phone, a smart pad, a laptop computer, a portable multimedia player, an embedded apparatus, and the like to wirelessly access the Internet in home or a company or a specific service providing area based on a wireless communication technology in a short range.

Institute of Electrical and Electronics Engineers (IEEE) 802.11 has commercialized or developed various technological standards since an initial wireless LAN technology is supported using frequencies of 2.4 GHz. First, the IEEE 802.11b supports a communication speed of a maximum of 11 Mbps while using frequencies of a 2.4 GHz band. IEEE 802.11a which is commercialized after the IEEE 802.11b uses frequencies of not the 2.4 GHz band but a 5 GHz band to reduce an influence by interference as compared with the frequencies of the 2.4 GHz band which are significantly congested and improves the communication speed up to a maximum of 54 Mbps by using an OFDM technology. However, the IEEE 802.11a has a disadvantage in that a communication distance is shorter than the IEEE 802.11b. In addition, IEEE 802.11g uses the frequencies of the 2.4 GHz band similarly to the IEEE 802.11b to implement the communication speed of a maximum of 54 Mbps and satisfies backward compatibility to significantly come into the spotlight and further, is superior to the IEEE 802.11a in terms of the communication distance.

Moreover, as a technology standard established to overcome a limitation of the communication speed which is pointed out as a weak point in a wireless LAN, IEEE 802.11n has been provided. The IEEE 802.11n aims at increasing the speed and reliability of a network and extending an operating distance of a wireless network. In more detail, the IEEE 802.11n supports a high throughput (HT) in which a data processing speed is a maximum of 540 Mbps or more and further, is based on a multiple inputs and multiple outputs (MIMO) technology in which multiple antennas are used at both sides of a transmitting unit and a receiving unit in order to minimize a transmission error and optimize a data speed. Further, the standard can use a coding scheme that transmits multiple copies which overlap with each other in order to increase data reliability.

As the supply of the wireless LAN is activated and further, applications using the wireless LAN are diversified, the need for new wireless LAN systems for supporting a higher throughput (very high throughput (VHT)) than the data processing speed supported by the IEEE 802.11n has come into the spotlight. Among them, IEEE 802.11ac supports a wide bandwidth (80 to 160 MHz) in the 5 GHz frequencies. The IEEE 802.11ac standard is defined only in the 5 GHz band, but initial 11ac chipsets will support even operations in the 2.4 GHz band for the backward compatibility with the existing 2.4 GHz band products. Theoretically, according to the standard, wireless LAN speeds of multiple stations are enabled up to a minimum of 1 Gbps and a maximum single link speed is enabled up to a minimum of 500 Mbps. This is achieved by extending concepts of a wireless interface accepted by 802.11n, such as a wider wireless frequency bandwidth (a maximum of 160 MHz), more MIMO spatial streams (a maximum of 8), multi-user MIMO, and high-density modulation (a maximum of 256 QAM). Further, as a scheme that transmits data by using a 60 GHz band instead of the existing 2.4 GHz/5 GHz, IEEE 802.11ad has been provided. The IEEE 802.11ad is a transmission standard that provides a speed of a maximum of 7 Gbps by using a beamforming technology and is suitable for high bit rate moving picture streaming such as massive data or non-compression HD video. However, since it is difficult for the 60 GHz frequency band to pass through an obstacle, it is disadvantageous in that the 60 GHz frequency band can be used only among devices in a short-distance space.

As a wireless LAN standard after 802.11ac and 802.11ad, the IEEE 802.11ax (high efficiency WLAN, HEW) standard for providing a high-efficiency and high-performance wireless LAN communication technology in a high-density environment, in which APs and terminals are concentrated, is in the development completion stage. In an 802.11ax-based wireless LAN environment, communication with high frequency efficiency should be provided indoors/outdoors in the presence of high-density stations and access points (APs), and various technologies have been developed to implement the same.

In order to support new multimedia applications, such as high-definition video and real-time games, the development of a new wireless LAN standard has begun to increase a maximum transmission rate. In IEEE 802.11be (extremely high throughput, EHT), which is a 7th generation wireless LAN standard, development of standards is underway aiming at supporting a transmission rate of up to 30 Gbps via a wider bandwidth, an increased spatial stream, multi-AP cooperation, and the like in a 2.4/5/6 GHz band.

DISCLOSURE OF INVENTION

Technical Problem

An aspect of the present invention is to provide a high-speed wireless LAN service for a new multimedia application, as described above.

In addition, the present invention is to provide a method for mapping a TID and a link between multi-link devices corresponding to a set of logical entities,

In addition, the present invention is to provide a method for implicitly determining a mapping relationship of a TID for which the mapping relationship is not indicated in a process of mapping between the TID and a link.

Technical tasks to be achieved in the specification are not limited to the technical tasks mentioned above, and other technical tasks that are not mentioned may be clearly understood by those skilled in the art on the basis of the following descriptions.

Solution to Problem

A multi-link device (MLD) of a wireless communication system includes a communication module, and a processor configured to control the communication module. The processor is configured to transmit a request frame for mapping between a traffic identifier (TID) and a link, wherein the request frame includes first mapping information for configuring a mapping relationship between at least one TID of multiple TIDs and at least one link, and information related to the number of the at least one TID for which mapping with the at least one link is requested, and receive a response frame as a response to the request frame, wherein for first remaining TIDs after excluding the at least one TID of the multiple TIDs, a mapping relationship previously configured with a link is maintained as valid, or a default mapping relationship is applied, and for the first remaining TIDs, a mapping relationship with a specific link is not indicated by the first mapping information.

In addition, in the present invention, one of the at least one link is mapped with one or more TIDs among the at least one TID.

In addition, in the present invention, the default mapping relationship corresponds to a state in which TIDs are mapped with all links, and the default mapping relationship is applied when the default mapping relationship is configured for the first remaining TIDs before the transmission of the request frame.

In addition, in the present invention, the request frame further includes transmission direction information indicating a transmission direction of the at least one TID, and the multiple TIDs are only mapped with a link for which a configuration between the MLD and a counterpart MLD having transmitted the request frame is completed.

In addition, in the present invention, the response frame indicates whether to allow the mapping relationship between the at least one TID of the multiple TIDs and the at least one link.

In addition, in the present invention, when the mapping relationship between the at least one TID of the multiple TIDs and the at least one link is allowed, the response frame does not include second mapping information relating to another mapping relationship between the at least one TID of the multiple TIDs and the at least one link.

In addition, in the present invention, when the mapping relationship between the at least one TID of the multiple TIDs and the at least one link is not allowed, the response frame further includes second mapping information indicating a mapping relationship different from a first mapping relationship for the at least one TID of the multiple TIDs.

In addition, in the present invention, the processor is configured to receive a management frame, wherein the management frame is transmitted only on the at least one link for which the mapping relationship is configured with the at least one TID.

In addition, in the present invention, the management frame is transmitted on the basis of an allocated access category (AC), and is transmitted on the at least one link regardless of an access category configured for the at least one link.

In addition, in the present invention, the processor is configured to receive a frame including second mapping information for configuration of a mapping relationship between one or more TIDs of the multiple TIDs and one or more links, wherein for a second remaining TID after excluding the one or more TIDs of the multiple TIDs, a specific preferred mapping relationship is indicated or it is indicated that there is no preferred mapping relationship.

In addition, in the present invention, the specific preferred mapping relationship is an originally configured mapping relationship or the default mapping relationship.

In addition, in the present invention, the specific mapping relationship is the default mapping relationship or there is no preferred mapping relationship, a mapping relationship for an overlapping TID among the at least one TID and the second remaining TID is not indicated by the response frame.

In addition, the present invention provides a method including transmitting a request frame for mapping between a traffic identifier (TID) and a link, the request frame includes first mapping information for configuring a mapping relationship between at least one TID of multiple TIDs and at least one link, and information related to the number of the at least one TID for which mapping with the at least one link is requested, and receiving a response frame as a response to the request frame, wherein for first remaining TIDs after excluding the at least one TID of the multiple TIDs, a mapping relationship previously configured with a link is maintained as valid, or a default mapping relationship is applied, and for the first remaining TIDs, a mapping relationship with a specific link is not indicated by the first mapping information.

Advantageous Effects of Invention

According to an embodiment of the present invention, a QoS of a multi-link device can be enhanced.

According to an embodiment of the present invention, a multi-link device can perform TID-to-link mapping.

According to an embodiment of the present invention, a multi-link device can perform QMF-to-link mapping.

According to an embodiment of the present invention, a multi-link device can implicitly indicate a request/proposal link when performing TID-to-link mapping.

According to an embodiment of the present invention, a multi-link device can manage TID-to-link mapping when changing ML setup.

The effects obtainable in the present invention are not limited to the above-mentioned effects, and other effects that are not mentioned may be clearly understood by those skilled in the art to which the present invention belongs, from descriptions below.

BRIEF DESCRIPTION OF DRAWINGS

FIG. 2 illustrates a wireless LAN system according to another embodiment of the present invention.

FIG. 13 illustrates an embodiment of a TID-to-link mapping element indicating a QMF which can be transmitted regardless of a link.

BEST MODE FOR CARRYING OUT THE INVENTION

Terms used in the specification adopt general terms which are currently widely used by considering functions in the present invention, but the terms may be changed depending on an intention of those skilled in the art, customs, and emergence of new technology. Further, in a specific case, there is a term arbitrarily selected by an applicant and in this case, a meaning thereof will be described in a corresponding description part of the invention. Accordingly, it should be revealed that a term used in the specification should be analyzed based on not just a name of the term but a substantial meaning of the term and contents throughout the specification.

Throughout this specification and the claims that follow, when it is described that an element is "coupled" to another element, the element may be "directly coupled" to the other element or "electrically coupled" to the other element through a third element. Further, unless explicitly described to the contrary, the word "comprise" and variations such as "comprises" or "comprising", will be understood to imply the inclusion of stated elements but not the exclusion of any other elements. Moreover, limitations such as "or more" or "or less" based on a specific threshold may be appropriately substituted with "more than" or "less than", respectively. Hereinafter, in the present invention, a field and a subfield may be interchangeably used.

Figure 1:
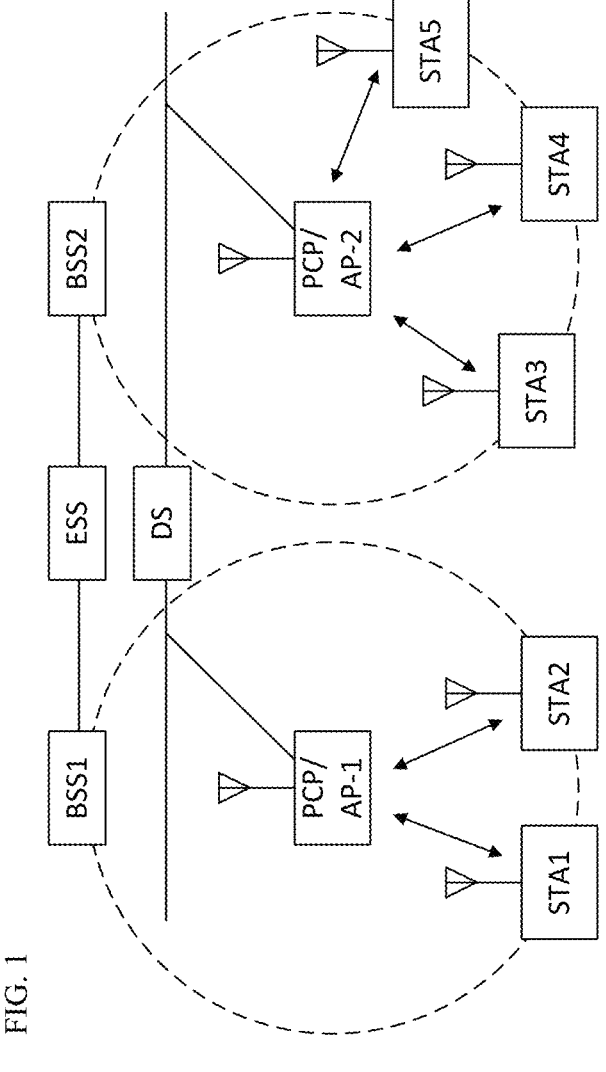
FIG. 1 illustrates a wireless LAN system according to an embodiment of the present invention.

FIG. 1 illustrates a wireless LAN system according to an embodiment of the present invention.

FIG. 1 is a diagram illustrating a wireless LAN system according to an embodiment of the present invention. The wireless LAN system includes one or more basic service sets (BSS) and the BSS represents a set of apparatuses which are successfully synchronized with each other to communicate with each other. In general, the BSS may be classified into an infrastructure BSS and an independent BSS (IBSS) and FIG. 1 illustrates the infrastructure BSS between them.

As illustrated in FIG. 1, the infrastructure BSS (BSS1 and BSS2) includes one or more stations STA1, STA2, STA3, STA4, and STA5, access points AP-1 and AP-2 which are stations providing a distribution service, and a distribution system (DS) connecting the multiple access points AP-1 and AP-2.

The station (STA) is a predetermined device including medium access control (MAC) following a regulation of an IEEE 802.11 standard and a physical layer interface for a wireless medium, and includes both a non-access point (non-AP) station and an access point (AP) in a broad sense. Further, in the present specification, a term 'terminal' may be used to refer to a non-AP STA, or an AP, or to both terms. A station for wireless communication includes a processor and a communication unit and according to the embodiment, may further include a user interface unit and a display unit. The processor may generate a frame to be transmitted through a wireless network or process a frame received through the wireless network and besides, perform various processing for controlling the station. In addition, the communication unit is functionally connected with the processor and transmits and receives frames through the wireless network for the station. According to the present invention, a terminal may be used as a term which includes user equipment (UE).

The access point (AP) is an entity that provides access to the distribution system (DS) via wireless medium for the station associated therewith. In the infrastructure BSS, communication among non-AP stations is, in principle, performed via the AP, but when a direct link is configured, direct communication is enabled even among the non-AP stations. Meanwhile, in the present invention, the AP is used as a concept including a personal BSS coordination point (PCP) and may include concepts including a centralized controller, a base station (BS), a node-B, a base transceiver system (BTS), and a site controller in a broad sense. In the present invention, an AP may also be referred to as a base wireless communication terminal. The base wireless communication terminal may be used as a term which includes an AP, a base station, an eNB (i.e. eNodeB) and a transmission point (TP) in a broad sense. In addition, the base wireless communication terminal may include various types of wireless communication terminals that allocate medium resources and perform scheduling in communication with a plurality of wireless communication terminals.

A plurality of infrastructure BSSs may be connected with each other through the distribution system (DS). In this case, a plurality of BSSs connected through the distribution system is referred to as an extended service set (ESS).

Figure 2:
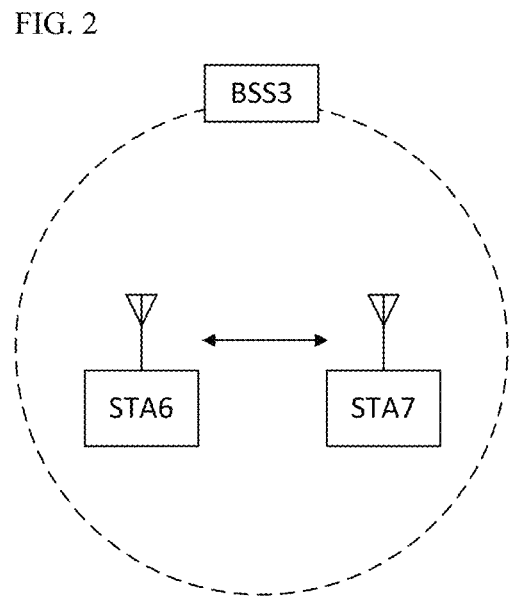

FIG. 2 illustrates an independent BSS which is a wireless LAN system according to another embodiment of the present invention. In the embodiment of FIG. 2, duplicative description of parts, which are the same as or correspond to the embodiment of FIG. 1, will be omitted.

Since a BSS3 illustrated in FIG. 2 is the independent BSS and does not include the AP, all stations STA6 and STA7 are not connected with the AP. The independent BSS is not permitted to access the distribution system and forms a self-contained network. In the independent BSS, the respective stations STA6 and STA7 may be directly connected with each other.

Figure 3:
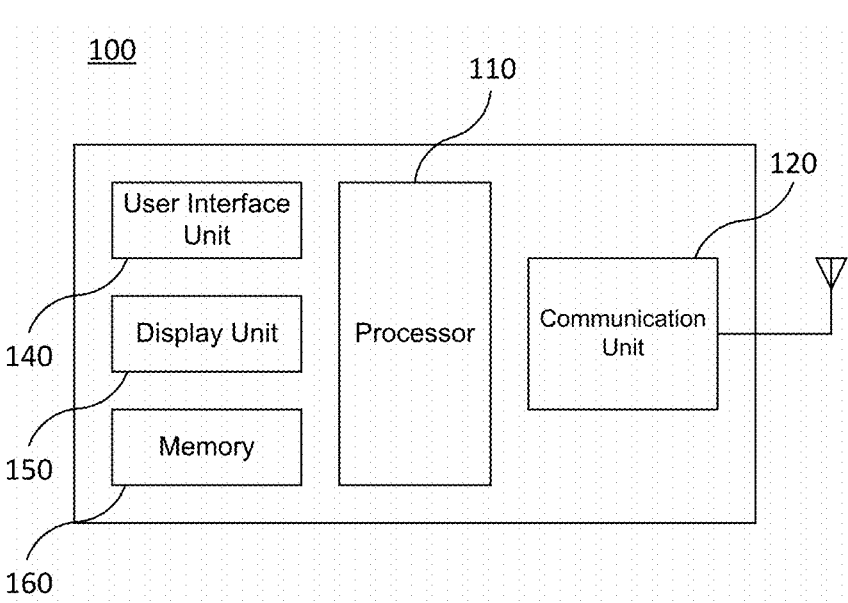
FIG. 3 illustrates a configuration of a station according to an embodiment of the present invention.

FIG. 3 is a block diagram illustrating a configuration of a station 100 according to an embodiment of the present invention. As illustrated in FIG. 3, the station 100 according to the embodiment of the present invention may include a processor 110, a communication unit 120, a user interface unit 140, a display unit 150, and a memory 160.

First, the communication unit 120 transmits and receives a wireless signal such as a wireless LAN packet, or the like and may be embedded in the station 100 or provided as an exterior. According to the embodiment, the communication unit 120 may include at least one communication module using different frequency bands. For example, the communication unit 120 may include communication modules having different frequency bands such as 2.4 GHz, 5 GHz, 6 GHz and 60 GHz. According to an embodiment, the station 100 may include a communication module using a frequency band of 7.125 GHz or more and a communication module using a frequency band of 7.125 GHz or less. The respective communication modules may perform wireless communication with the AP or an external station according to a wireless LAN standard of a frequency band supported by the corresponding communication module. The communication unit 120 may operate only one communication module at a time or simultaneously operate multiple communication modules together according to the performance and requirements of the station 100. When the station 100 includes a plurality of communication modules, each communication module may be implemented by independent elements or a plurality of modules may be integrated into one chip. In an embodiment of the present invention, the communication unit 120 may represent a radio frequency (RF) communication module for processing an RF signal.

Next, the user interface unit 140 includes various types of input/output means provided in the station 100. That is, the user interface unit 140 may receive a user input by using various input means and the processor 110 may control the station 100 based on the received user input. Further, the user interface unit 140 may perform output based on a command of the processor 110 by using various output means.

Next, the display unit 150 outputs an image on a display screen. The display unit 150 may output various display objects such as contents executed by the processor 110 or a user interface based on a control command of the processor 110, and the like. Further, the memory 160 stores a control program used in the station 100 and various resulting data. The control program may include an access program required for the station 100 to access the AP or the external station.

The processor 110 of the present invention may execute various commands or programs and process data in the station 100. Further, the processor 110 may control the respective units of the station 100 and control data transmission/reception among the units. According to the embodiment of the present invention, the processor 110 may execute the program for accessing the AP stored in the memory 160 and receive a communication configuration message transmitted by the AP. Further, the processor 110 may read information on a priority condition of the station 100 included in the communication configuration message and request the access to the AP based on the information on the priority condition of the station 100. The processor 110 of the present invention may represent a main control unit of the station 100 and according to the embodiment, the processor 110 may represent a control unit for individually controlling some component of the station 100, for example, the communication unit 120, and the like. That is, the processor 110 may be a modem or a modulator/demodulator for modulating and demodulating wireless signals transmitted to and received from the communication unit 120. The processor 110 controls various operations of wireless signal transmission/reception of the station 100 according to the embodiment of the present invention. A detailed embodiment thereof will be described below.

The station 100 illustrated in FIG. 3 is a block diagram according to an embodiment of the present invention, where separate blocks are illustrated as logically distinguished elements of the device. Accordingly, the elements of the device may be mounted in a single chip or multiple chips depending on design of the device. For example, the processor 110 and the communication unit 120 may be implemented while being integrated into a single chip or implemented as a separate chip. Further, in the embodiment of the present invention, some components of the station 100, for example, the user interface unit 140 and the display unit 150 may be optionally provided in the station 100.

Figure 4:
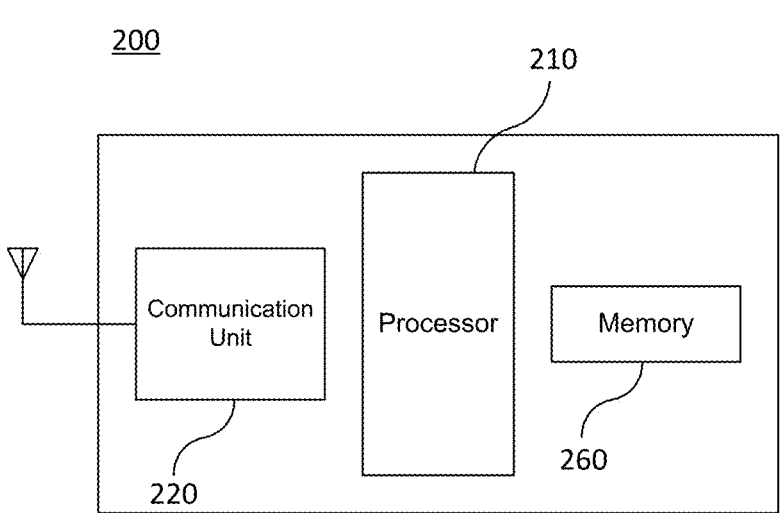
FIG. 4 illustrates a configuration of an access point according to an embodiment of the present invention.

FIG. 4 is a block diagram illustrating a configuration of an AP 200 according to an embodiment of the present invention. As illustrated in FIG. 4, the AP 200 according to the embodiment of the present invention may include a processor 210, a communication unit 220, and a memory 260. In FIG. 4, among the components of the AP 200, duplicative description of parts which are the same as or correspond to the components of the station 100 of FIG. 3 will be omitted.

Referring to FIG. 4, the AP 200 according to the present invention includes the communication unit 220 for operating the BSS in at least one frequency band. As described in the embodiment of FIG. 3, the communication unit 220 of the AP 200 may also include a plurality of communication modules using different frequency bands. That is, the AP 200 according to the embodiment of the present invention may include two or more communication modules among different frequency bands, for example, 2.4 GHz, 5 GHz, 6 GHz and 60 GHz together. Preferably, the AP 200 may include a communication module using a frequency band of 7.125 GHz or more and a communication module using a frequency band of 7.125 GHz or less. The respective communication modules may perform wireless communication with the station according to a wireless LAN standard of a frequency band supported by the corresponding communication module. The communication unit 220 may operate only one communication module at a time or simultaneously operate multiple communication modules together according to the performance and requirements of the AP 200. In an embodiment of the present invention, the communication unit 220 may represent a radio frequency (RF) communication module for processing an RF signal.

Next, the memory 260 stores a control program used in the AP 200 and various resulting data. The control program may include an access program for managing the access of the station. Further, the processor 210 may control the respective units of the AP 200 and control data transmission/reception among the units. According to the embodiment of the present invention, the processor 210 may execute the program for accessing the station stored in the memory 260 and transmit communication configuration messages for one or more stations. In this case, the communication configuration messages may include information about access priority conditions of the respective stations. Further, the processor 210 performs an access configuration according to an access request of the station. According to an embodiment, the processor 210 may be a modem or a modulator/demodulator for modulating and demodulating wireless signals transmitted to and received from the communication unit 220. The processor 210 controls various operations such as wireless signal transmission/reception of the AP 200 according to the embodiment of the present invention. A detailed embodiment thereof will be described below.

Figure 5:
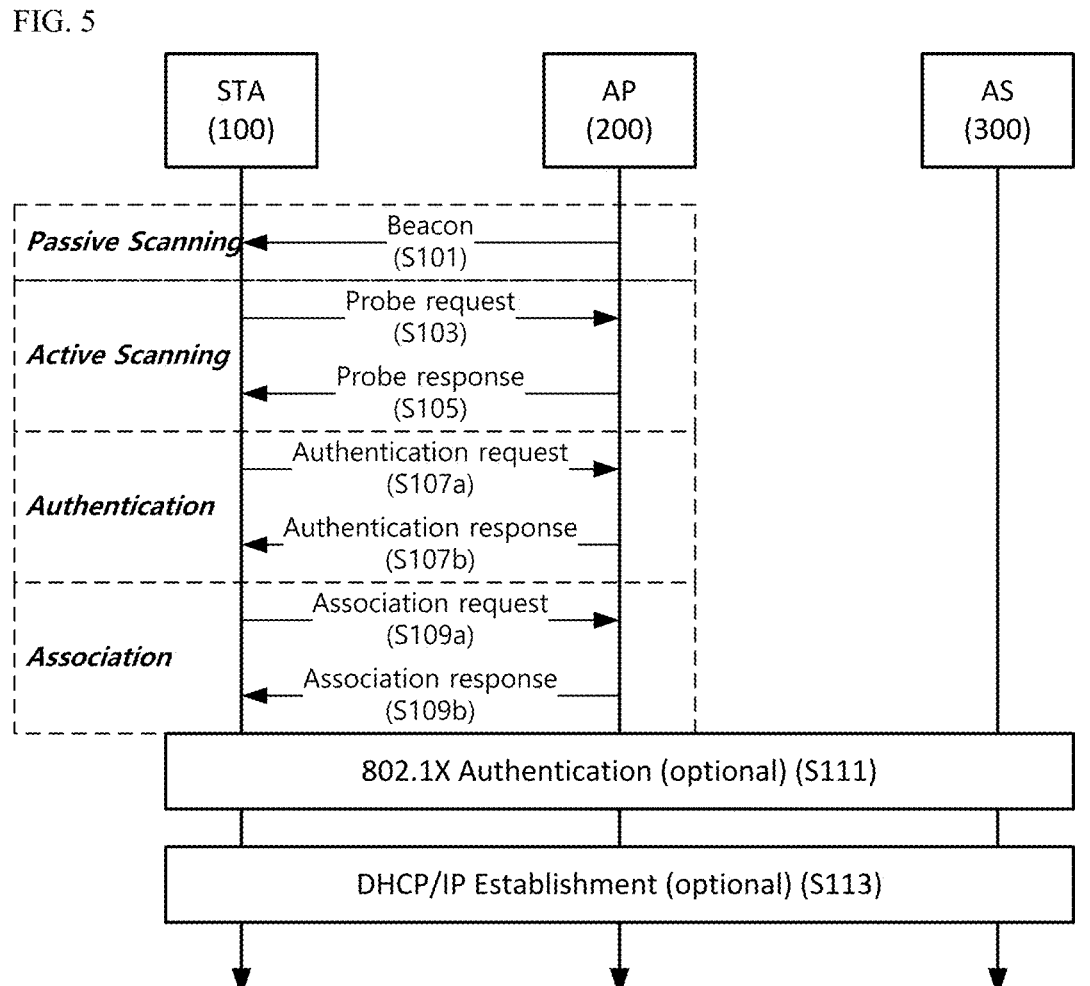
FIG. 5 schematically illustrates a process in which a STA and an AP set a link.

FIG. 5 is a diagram schematically illustrating a process in which a STA sets a link with an AP.

Referring to FIG. 5, the link between the STA 100 and the AP 200 is set through three steps of scanning, authentication, and association in a broad way. First, the scanning step is a step in which the STA 100 obtains access information of BSS operated by the AP 200. A method for performing the scanning includes a passive scanning method in which the AP 200 obtains information by using a beacon message (S101) which is periodically transmitted and an active scanning method in which the STA 100 transmits a probe request to the AP (S103) and obtains access information by receiving a probe response from the AP (S105).

The STA 100 that successfully receives wireless access information in the scanning step performs the authentication step by transmitting an authentication request (S107a) and receiving an authentication response from the AP 200 (S107b). After the authentication step is performed, the STA 100 performs the association step by transmitting an association request (S109a) and receiving an association response from the AP 200 (S109b). In this specification, an association basically means a wireless association, but the present invention is not limited thereto, and the association may include both the wireless association and a wired association in a broad sense.

Meanwhile, an 802.1X based authentication step (S111) and an IP address obtaining step (S113) through DHCP may be additionally performed. In FIG. 5, the authentication server 300 is a server that processes 802.1X based authentication with the STA 100 and may be present in physical association with the AP 200 or present as a separate server.

Figure 6:
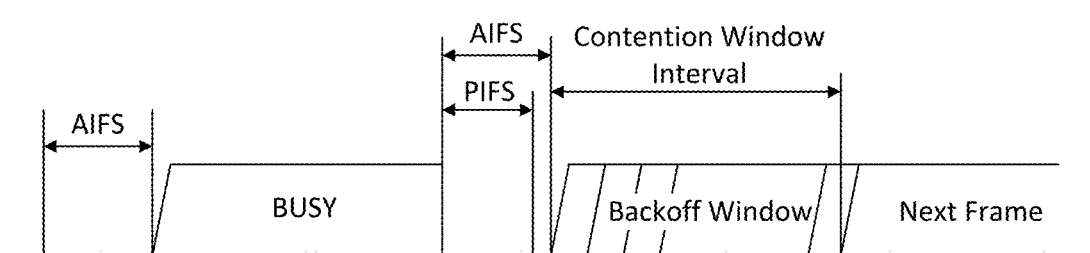
FIG. 6 illustrates a carrier sense multiple access (CSMA)/collision avoidance (CA) method used in wireless LAN communication.

FIG. 6 is a diagram illustrating a carrier sense multiple access (CSMA)/collision avoidance (CA) method used in wireless LAN communication.

A terminal that performs a wireless LAN communication checks whether a channel is busy by performing carrier sensing before transmitting data. When a wireless signal having a predetermined strength or more is sensed, it is determined that the corresponding channel is busy and the terminal delays the access to the corresponding channel. Such a process is referred to as clear channel assessment (CCA) and a level to decide whether the corresponding signal is sensed is referred to as a CCA threshold. When a wireless signal having the CCA threshold or more, which is received by the terminal, indicates the corresponding terminal as a receiver, the terminal processes the received wireless signal. Meanwhile, when a wireless signal is not sensed in the corresponding channel or a wireless signal having a strength smaller than the CCA threshold is sensed, it is determined that the channel is idle.

When it is determined that the channel is idle, each terminal having data to be transmitted performs a backoff procedure after an inter frame space (IFS) time depending on a situation of each terminal, for instance, an arbitration IFS (AIFS), a PCF IFS (PIFS), or the like elapses. According to the embodiment, the AIFS may be used as a component which substitutes for the existing DCF IFS (DIFS). Each terminal stands by while decreasing slot time(s) as long as a random number determined by the corresponding terminal during an interval of an idle state of the channel and a terminal that completely exhausts the slot time(s) attempts to access the corresponding channel. As such, an interval in which each terminal performs the backoff procedure is referred to as a contention window interval.

When a specific terminal successfully accesses the channel, the corresponding terminal may transmit data through the channel. However, when the terminal which attempts the access collides with another terminal, the terminals which collide with each other are assigned with new random numbers, respectively to perform the backoff procedure again. According to an embodiment, a random number newly assigned to each terminal may be decided within a range (2*CW) which is twice larger than a range (a contention window, CW) of a random number which the corresponding terminal is previously assigned. Meanwhile, each terminal attempts the access by performing the backoff procedure again in a next contention window interval and in this case, each terminal performs the backoff procedure from slot time(s) which remained in the previous contention window interval. By such a method, the respective terminals that perform the wireless LAN communication may avoid a mutual collision for a specific channel.

Hereinafter, in the present invention, a terminal may be referred to as a non-AP STA, an AP STA, an AP, an STA, a reception device, or a transmission device, and the present is not limited thereto. In addition, the AP STA of the present disclosure may be referred to as the AP.

<Examples of Various PPDU Formats>

Figure 7:
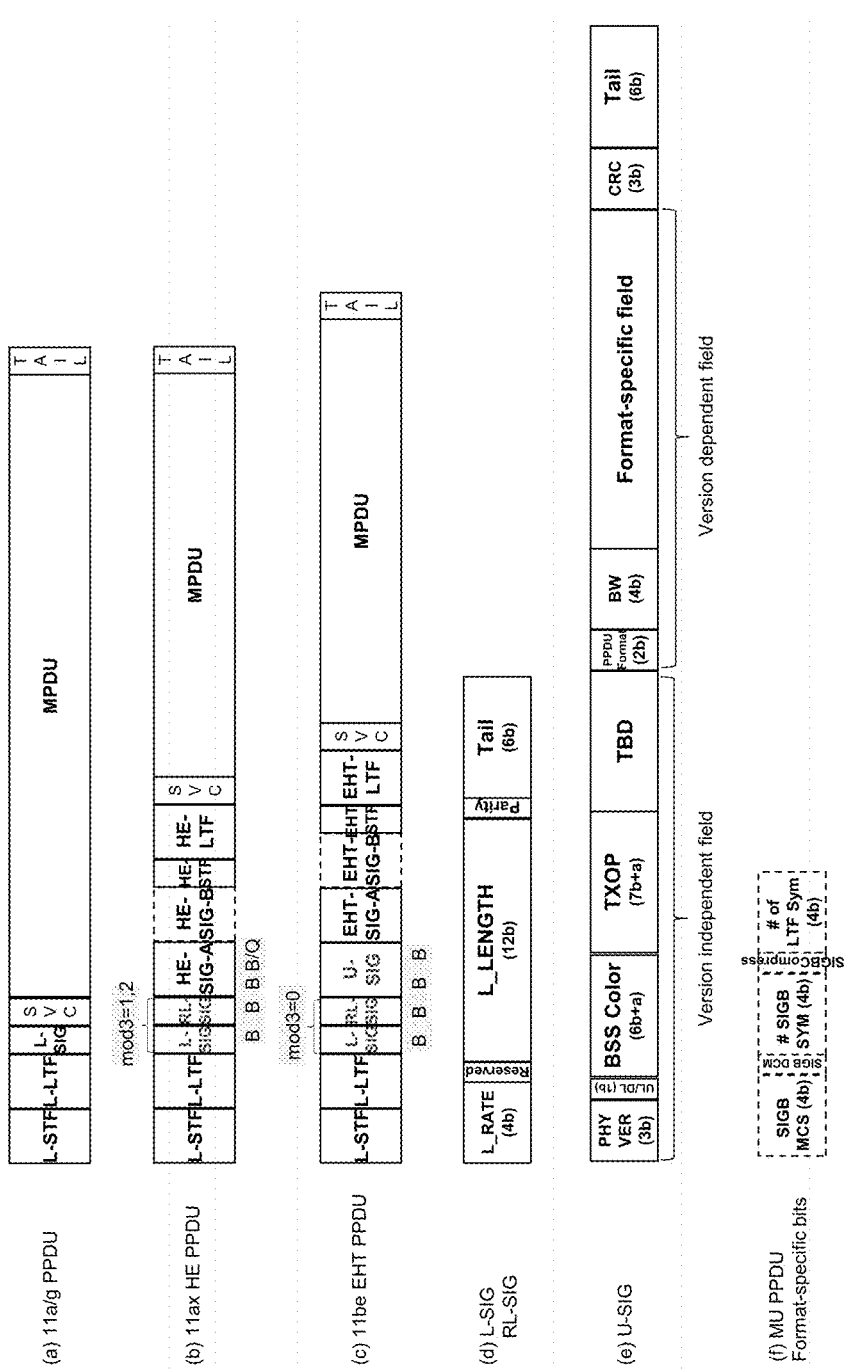
FIG. 7 illustrates an example of a format of a PLCP Protocol data unit (PPDU) for each of various standard generations.

FIG. 7 illustrates an example of a format of a PLCP Protocol data unit (PPDU) for each of various standard generations. More specifically, FIG. 7(a) illustrates an embodiment of a legacy PPDU format based on 802.11a/g, FIG. 7(b) illustrates an embodiment of an HE PPDU format based on 802.11ax, and FIG. 7(c) illustrates an embodiment of a non-legacy PPDU (i.e., EHT PPDU) format based on 802.11be. FIG. 7(d) illustrates detailed field configurations of RL-SIG and L-SIG commonly used in the PPDU formats.

Referring to FIG. 7(a), a preamble of the legacy PPDU includes a legacy short training field (L-STF), a legacy long training field (L-LTF), and a legacy signal field (L-SIG). In an embodiment of the present invention, the L-STF, the L-LTF, and the L-SIG may be referred to as a legacy preamble.

Referring to FIG. 7(b), a preamble of the HE PPDU additionally includes, in the legacy preamble, a repeated legacy short training field (RL-SIG), a high efficiency signal A field (HE-SIG-A), a high efficiency signal B field (HE-SIG-B), a high efficiency short training field (HE-STF), and a high efficiency long training field (HE-LTF). In an embodiment of the present invention, the RL-SIG, HE-SIG-A, the HE-SIG-B, the HE-STF and the HE-LTF may be referred to as an HE preamble. A specific configuration of the HE preamble may be modified according to an HE PPDU format. For example, HE-SIG-B may be used only in an HE MU PPDU format.

Referring to FIG. 7(c), a preamble of the EHT PPDU additionally includes, in the legacy preamble, a repeated legacy short training field (RL-SIG), a universal signal field (U-SIG), and an extremely high throughput signal A field (EHT-SIG-A), an extremely high throughput signal B field (EHT-SIG-B), an extremely high throughput short training field (EHT-STF), and an extremely high throughput long training field (EHT-LTF). In an embodiment of the present invention, the RL-SIG, EHT-SIG-A, the EHT-SIG-B, the EHT-STF and the EHT-LTF may be referred to as an EHT preamble. A specific configuration of a non-legacy preamble may be modified according to an EHT PPDU format. For example, EHT-SIG-A and EHT-SIG-B may be used only in a part of the EHT PPDU format.

64-FFT OFDM is applied in an L-SIG field included in the preamble of the PPDU, and the L-SIG field includes a total of 64 subcarriers. Among 64 subcarriers, 48 subcarriers excluding a guard subcarrier, a DC subcarrier, and a pilot subcarrier are used for transmission of L-SIG data. BPSK and a modulation and coding scheme (MCS) of rate=1/2 are applied in L-SIG, and therefore the L-SIG may include a total of 24 bits of information. FIG. 7(d) illustrates a 24-bit information configuration of L-SIG.

Referring to FIG. 7(d), the L-SIG includes an L_RATE field and an L_LENGTH field. The L_RATE field includes 4 bits and indicates an MCS used for data transmission. Specifically, the L_RATE field indicates one value among transmission rates of 6/9/12/18/24/36/48/54 Mbps obtained by combining a modulation scheme of BPSK/QPSK/16-QAM/64-QAM, etc. and an inefficiency of ½, ⅔, ¾, etc. A total length of a corresponding PPDU may be indicated by combining information of the L_RATE field and information of the L_LENGTH field. In a non-legacy PPDU format, the L_RATE field is configured to a minimum rate of 6 Mbps.

A unit of the L_LENGTH field is a byte and a total of 12 bits are allocated to signal up to 4095, and a length of the PPDU may be indicated in combination with the L_RATE field. A legacy terminal and a non-legacy terminal may interpret the L_LENGTH field in different ways.

Firstly, a method of interpreting the length of the PPDU by the legacy terminal and the non-legacy terminal by using the L_LENGTH field is described below. When a value of the L_RATE field is configured to indicate 6 Mbps, 3 bytes during 4 us which is one symbol duration of 64 FET (i.e., 24 bits) may be transmitted. Therefore, the 64 FET standard symbol number after an L-SIG is acquired by adding 3 bytes corresponding to a SVC field and a Tail field to the L_LENGTH field value and then dividing the same by 3 bytes which is a transmission amount of one symbol. When multiplying the acquired symbol number by 4 us which is one symbol duration 5 and then adding 20 us which is consumed to transmit the L-STF, the L-LTF, and the L-SIG, the length of a corresponding PPDU, i.e., a receipt time (RXTIME) is acquired, which is expressed by Equation 1 below.

$$EXTIME = (us)\left(\left\lceil \frac{L\_LENGTH + 3}{3} \right\rceil\right) \times 4 + 20 \qquad \text{[Equation 1]}$$

In this case, denotes the smallest natural number greater than or equal to x. Since the maximum value of the L_LENGTH field is 4095, the length of the PPDU can be set up to 5.464 ms. The non-legacy terminal transmitting the PPDU should set the L_LENGTH field as shown in Equation 2 below.

$$\text{L\_LENGTH(byte)} = \left(\left\lceil \frac{TXTIME - 20}{4} \right\rceil\right) \times 3 - 3 \qquad \text{[Equation 2]}$$

Herein, TXTIME is the total transmission time constituting the corresponding PPDU, and is expressed by Equation 3 below. In this case, TX represents the transmission time of X.

$$\begin{aligned} \text{TXTIME}(us) &= T_{L\text{-}STF} + T_{L\text{-}LTF} + T_{L\text{-}SIG} + T_{RL\text{-}SIG} + \\ &\quad (T_{EHT\text{-}SIG\text{-}A}) + (T_{EHT\text{-}SIG\text{-}B}) + T_{EHT\text{-}STF} + \\ &\quad N_{EHT\text{-}LTF} \cdot T_{EHT\text{-}LTF} + T_{DATA} \end{aligned} \qquad \text{[Equation 3]}$$

Referring to the above equations, the length of the PPDU is calculated based on a rounded up value of L_LENGTH/3. Therefore, for a random value of k, three different values of L_LENGTH={3+1, 3k+2, 3(k+1)} indicate the same PPDU length.

Referring to FIG. 7(e), a universal SIG (U-SIG) field continues to exist in an EHT PPDU and a WLAN PPDU of a subsequent generation, and serves to classify a generation of a PPDU, which includes 11be. U-SIG is a 64 FFT-based OFDM 2 symbol and may transfer a total of 52 bits of information. In 52 bits, 43 bits excluding 9 bits for CRC/Tail are largely divided into a version independent (VI) field and a version dependent (VD) field.

A VI bit enables a current bit configuration to be maintained even later on, so that even if a PPDU of a subsequent generation is defined, current 11be terminals may obtain information on the PPDU via the VI fields of the PPDU. To this end, the VI field includes PHY version, UL/DL, BSS color, TXOP, and reserved fields. The PHY version field is 3 bits, and serves to sequentially classify 11be and subsequent generation wireless LAN standards into versions. 11be has a value of 000b. The UL/DL field identifies whether the PPDU is an uplink/downlink PPDU. BSS color indicates an identifier for each BSS defined in 11ax, and has a value of 6 bits or more. TXOP indicates transmit opportunity duration transmitted in a MAC header, wherein, by adding the TXOP to a PHY header, the PPDU may infer a length of the TXOP included therein without having to decode an MPDU, and the TXOP has a value of 7 bits or more.

The VD field is signaling information useful only for an 11be version of the PPDU, and may include a field commonly used in any PPDU format, such as PPDU format and BW, and a field defined differently for each PPDU format. The PPDU format is a classifier that classifies EHT single user (SU), EHT multiple user (MU), EHT trigger-based (TB), EHT extended range (ER) PPDU, etc. The BW field signals five basic PPDU BW options (BW, which is expressible in the form of an exponential power of 20*2, may be referred to as basic BW) of 20, 40, 80, 160 (80+80), and 320 (160+160) MHz and various remaining PPDU BWs configured via preamble puncturing. After being signaled at 320 MHz, signaling may be performed in a form in which some 80 MHz is punctured. A punctured and modified channel type may be signaled directly in the BW field, or may be signaled using the BW field with a field (e.g., a field within the EHT-SIG field) appearing after the BW field. If the BW field is configured to 3 bits, a total of 8 BW signaling may be performed, and therefore only up to 3 signaling may be performed in a puncturing mode. If the BW field is configured to 4 bits, a total of 16 BW signaling may be performed, and therefore up to 11 signaling may be performed in the puncturing mode.

A field located after the BW field varies depending on the type and format of the PPDU, an MU PPDU and an SU PPDU may be signaled in the same PPDU format, a field for classification between the MU PPDU and the SU PPDU may be located before an EHT-SIG field, and additional signaling may be performed for the same. Both the SU PPDU and the MU PPDU include the EHT-SIG field, but some fields that are not required in the SU PPDU may be compressed. Information on the field to which the compression has been applied may be omitted or may have a size smaller than a size of an original field included in the MU PPDU. For example, in a case of the SU PPDU, a common field of the EHT-SIG may be omitted or replaced, or the SU PPDU may have a different configuration in which a user specific field is replaced, reduced to one, or the like.

Alternatively, the SU PPDU may further include a compression field indicating whether compression is performed, and a part of field (e.g., RA fields, etc.) may be omitted according to a value of the compressed field.

If a part of the EHT-SIG field of the SU PPDU is compressed, information to be included in the compressed field may be signaled also in an uncompressed field (e.g., the common field, etc.). The MU PPDU corresponds to a PPDU format for concurrent reception by multiple users, and therefore the EHT-SIG field is required to be transmitted subsequently to the U-SIG field, and the amount of signaled information may vary. That is, a plurality of MU PPDUs are transmitted to a plurality of STAs, so that the respective STAs should recognize locations of RUs, at which the MU PPDUs are transmitted, the STAs to which the RUs have been allocated respectively, and whether the transmitted MU PPDUs have been transmitted to the STAs themselves. Therefore, an AP should transmit information described above, by including the same in the EHT-SIG field. To this end, information for efficient transmission of the EHT-SIG field is signaled in the U-SIG field, and this may correspond to an MCS that is a modulation method and/or the number of symbols in the EHT-SIG field. The EHT-SIG field may include information on a size and location of an RU allocated to each user.

In the case of the SU PPDU, a plurality of RUs may be allocated to an STA, and the plurality of RUs may be continuous or discontinuous. If the RUs allocated to the STA are discontinuous, the STA should recognize a punctured RU in the middle in order to efficiently receive the SU PPDU. Accordingly, the AP may transmit the SU PPDU including information (e.g., a puncturing pattern of the RUs, etc.) of punctured RUs among the RUs allocated to the STA. That is, in the case of the SU PPDU, a puncturing mode field, which includes information indicating, in a bitmap format, etc., a puncturing pattern and whether the puncturing mode is applied, may be included in the EHT-SIG field, and the puncturing mode field may signal a discontinuous channel type appearing within a bandwidth.

The signaled discontinuous channel type is limited, and indicates discontinuous channel information and BW of the SU PPDU in combination with a value of the BW field. For example, the SU PPDU is a PPDU transmitted only to a single terminal, so that the STA may recognize a bandwidth allocated to itself via the BW field included in the PPDU, and the SU PPDU may recognize a punctured resource in the allocated bandwidth via the puncturing mode field of the EHT-SIG field or the U-SIG field included in the PPDU. In this case, the terminal may receive the PPDU in resource units remaining after excluding a specific channel of the punctured resource unit. The plurality of RUs allocated to the STA may be configured by different frequency bands or tones.

Only a limited discontinuous channel type is signaled in order to reduce signaling overhead of the SU PPDU. Puncturing may be performed for each 20 MHz sub-channel, so that if puncturing is performed for BW having a large number of 20 MHz sub-channels, such as 80, 160, and 320 MHz, a discontinuous channel (if puncturing of only edge 20 MHz is considered to be discontinuous) type should be signaled in the case of 320 MHz by expressing whether each of 15 20 MHz sub-channels remaining after excluding a primary channel is used. As such, allocating 15 bits to signal a discontinuous channel type of single user transmission may act as excessively large signaling overhead in consideration of a low transmission rate of a signaling part.

The present disclosure suggests a signaling technique of a discontinuous channel type of the SU PPDU and illustrates the discontinuous channel type determined according to the suggested technique. In addition, the present disclosure suggests a signaling technique of a puncturing type of each of a primary 160 MHz and a secondary 160 MHz in 320 MHz BW configuration of the SU PPDU.

In addition, an embodiment of the present disclosure suggests a technique which differs in the configuration of the PPDU indicating the preamble puncturing BW values according to the PPDU format signaled in the PPDU format field. If the length of the BW field is 4 bits, in case of the EHT SU PPDU or the TB PPDU, the EHT-SIG-A of 1 symbol may be additionally signaled after the U-SIG, or the EHT-SIG-A may be never signaled, so that by considering this, it is necessary to completely signal a maximum of 11 puncturing modes through only the BW field of the U-SIG. However, in case of the EHT MU PPDU, since the EHT-SIG-B is additionally signaled after the U-SIG, the maximum of 11 puncturing modes may be signaled by a method different from the SU PPDU. In case of the EHT ER PPDU, the BW field is configured as 1 bit to signal information on whether the PPDU uses 20 MHz or 10 MHz band.

FIG. 7(f) illustrates a configuration of a format-specific field of a VD field when the EHT MU PPDU is indicated in the PPDU format field of U-SIG. In the case of the MU PPDU, SIG-B, which is a signaling field for concurrent reception by multiple users, is essentially required, and SIG-B may be transmitted without separate SIG-A after U-SIG. To this end, information for decoding of SIG-B should be signaled in U-SIG. These fields include SIG-B MCS, SIG-B DCM, Number of SIG-B Symbols, SIG-B Compression, and Number of EHT-LTF Symbols.

Figure 8:
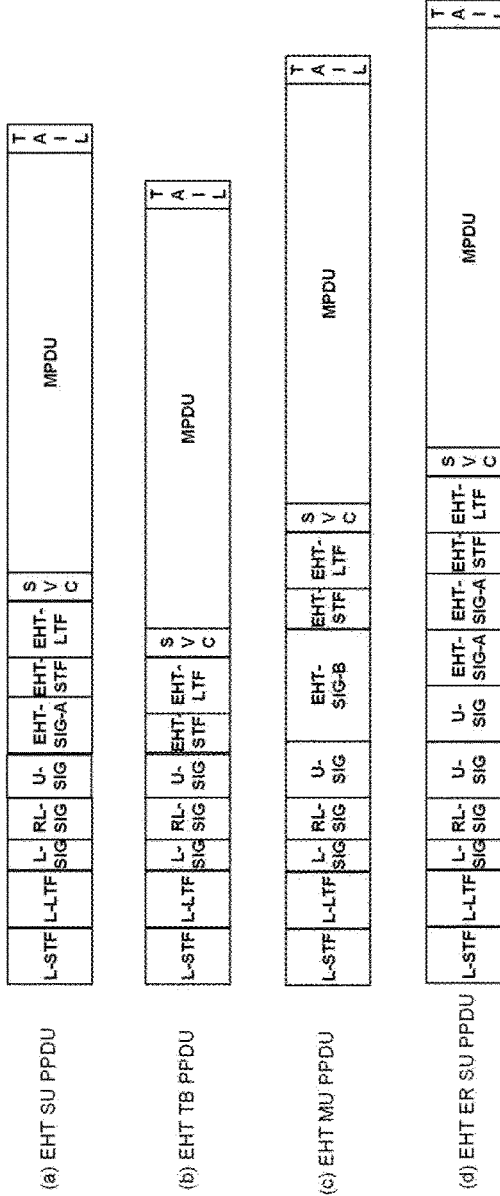
FIG. 8 illustrates an example of various extremely high throughput (EHT) physical protocol data unit (PPDU) formats and a method for indicating the same according to an embodiment of the present invention.

FIG. 8 illustrates an example of various extremely high throughput (EHT) physical protocol data unit (PPDU) formats and a method for indicating the same according to an embodiment of the present invention.

Referring to FIG. 8, a PPDU may include a preamble and a data part, and an EHT PPDU format, that is a PPDU type, may be classified according to a U-SIG field included in the preamble. Specifically, based on a PPDU format field included in the U-SIG field, whether the format of the PPDU is an EHT PPDU may be indicated.

FIG. 8(a) shows an example of an EHT SU PPDU format for a single STA. An EHT SU PPDU is a PPDU used for single user (SU) transmission between an AP and a single STA, and an EHT-SIG-A field for additional signaling may be located after the U-SIG field.

FIG. 8(b) shows an example of an EHT trigger-based PPDU format which corresponds to an EHT PPDU transmitted based on a trigger frame. An EHT Trigger-based PPDU is an EHT PPDU transmitted based on a trigger frame and is an uplink PPDU used for a response to the trigger frame. Unlike in the EHT SU PPDU, an EHT-SIG-A field is not located after a U-SIG field in the EHT PPDU.

FIG. 8(*c*) shows an example of an EHT MU PPDU format which corresponds to an EHT PPDU for multiple users. An EHT MU PPDU is a PPDU used to transmit the PPDU to one or more STAs. In the EHT MU PPDU format, an HE-SIG-B field may be located after a U-SIG field.

FIG. 8(*d*) shows an example of an EHT ER SU PPDU format used for single user transmission with an STA in an extended range. An EHT ER SU PPDU may be used for single user transmission with an STA of a wider range compared to the EHT SU PPDU described in FIG. 8(*a*), and a U-SIG field may be repeatedly located on a time axis.

The EHT MU PPDU described in FIG. 8(*c*) may be used by an AP to perform downlink transmission to a plurality of STAs. Here, the EHT MU PPDU may include scheduling information so that the plurality of STAs may concurrently receive the PPDU transmitted from the AP. The EHT MU PPDU may transfer, to the STAs, AID information of a transmitter and/or a receiver of the PPDU transmitted via a user specific field of EHT-SIG-B. Accordingly, the plurality of terminals having received the EHT MU PPDU may perform a spatial reuse operation based on the AID information of the user specific field included in a preamble of the received PPDU.

Specifically, a resource unit allocation (RA) field of the HE-SIG-B field included in the HE MU PPDU may include information on a configuration of a resource unit (e.g., a division form of the resource unit) in a specific bandwidth (e.g., 20 MHz, etc.) of a frequency axis. That is, the RA field may indicate configurations of resource units segmented in a bandwidth for transmission of the HE MU PPDU, in order for the STA to receive the PPDU. Information on the STA allocated (or designated) to each segmented resource unit may be included in the user specific field of EHT-SIG-B so as to be transmitted to the STA. That is, the user specific field may include one or more user fields corresponding to the respective segmented resource units.

For example, a user field corresponding to at least one resource unit used for data transmission among the plurality of segmented resource units may include an AID of a receiver or a transmitter, and a user field corresponding to the remaining resource unit(s) which is not used for data transmission may include a preconfigured null STA ID.

Two or more PPDUs illustrated in FIG. 8 may be indicated by a value indicating the same PPDU format. That is, two or more PPDUs may be indicated by the same PPDU format through the same value. For example, the EHT SU PPDU and the EHT MU PPDU may be indicated by the same value through the U-SIG PPDU format subfield. At this time, the EHT SU PPDU and the EHT MU PPDU may be divided by the number of the STAs receiving the PPDU. For example, the PPDU receiving one STA may be identified as the EHT SU PPDU, and when the number of the STAs is configured to receive two or more STAs, the PPDU may be identified as the EHT MU PPDU. In other words, two or more PPDU formats illustrated in FIG. 8 may be indicated through the same subfield value.

In addition, a part field among the fields illustrated in FIG. 8 or part information of the field may be omitted, and the case that the part field or the part information of the field is omitted may be defined as a compression mode or a compressed mode.

Figure 9:
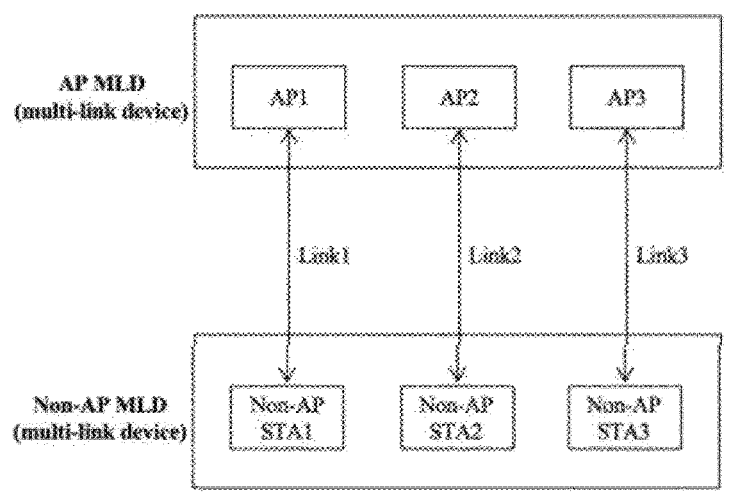
FIG. 9 is a view illustrating a multi-link device according to an embodiment of the present disclosure.

FIG. 9 is a view illustrating a multi-link device according to an embodiment of the present disclosure.

Referring to FIG. 9, a concept of a device to which one or more STAs are affiliated may be defined. According to an embodiment of the present disclosure, the devices to which more than one STA (i.e., two or more) are affiliated may be defined. At this time, the device may be a logical concept. Therefore, the devices to which one or more STAs or more than one STA having such a concept are affiliated may be referred to as a multi-link device (MLD), a multi-band device, or a multi-link logical entity (MLLE).

Otherwise, the devices of the concept may be referred to as a multi-link entity (MLE). In addition, the MLD may have one medium access control service access point (MAC SAP) until a logical link control (LLC), and the MLD may have one MAC data service.

It is possible that the STAs included in the MLD operate in one or more links or channels. That is, it is possible that the STAs included in the MLD operate in multiple channels which are different from each other. For example, it is possible that the STAs included in the MLD operate by using the channels of the different frequency bands of 2.4 GHz, 5 GHz, and 6 GHz. Accordingly, it is possible that the MLD obtains a benefit from the channel access, and increases the performance of the entire network. A conventional wireless LAN operates by the single link, but the MLD operation may obtain much more channel access opportunities by using the plurality of links or the STA may efficiently operate in the plurality of links in consideration of a situation of the channel.

In addition, in case that the STAs affiliated to the MLD are the APs, the MLD to which the APs are affiliated may be the AP MLD. However, in case that the STAs affiliated to the MLD are the non-AP STA, the MLDs to which the non-APs are affiliated may be the non-AP MLD.

Referring to FIG. 9, the MLD including the multiple STAs may exist, and the multiple STAs included in the MLD may operate in the multiple links. In FIG. 9, the MLD including an AP1, an AP2, and an AP3 which are the AP may be referred to as an AP MLD, and the MLD including a non-AP STA1, a non-AP STA2, and a non-AP STA3 which are the non-AP STA may be referred to as a non-AP MLD. The STAs included in the MLD may operate in a link 1, a link 2, a link 3, or a partial link of the link 1 to the link 3.

According to an embodiment of the present disclosure, a multi-link operation may include a multi-link configuration (multi-link setup) operation. The multi-link configuration may be an operation corresponding to association performed in a single link operation. In order to exchange the frame in the multi-link, the multi-link configuration may be performed in advance. The multi-link configuration may be performed by using a multi-link configuration element. The multi-link configuration element may include capability information related to the multi-link, and the capability information may include information regarding whether it is possible that the other STA included in the MLD transmits the frame to the other link while the STA included in the MLD receives the frame through one link. That is, the capability information may include information regarding whether the STAs (non-AP STA and/or AP (or AP STA)) transmit/receive the frames in different transmission directions at the same time, through the links included in the MLD. In addition, the capability information may further include information regarding a usable link or operating channel. The multi-link configuration may be configured through a negotiation between peer STAs, and the multi-link operation may be configured through one link.

According to an embodiment of the present disclosure, a mapping relationship between the links of the TID and the MLD may exist. For example, when the TID and the link are mapped, the TID may be transmitted through the mapped link. A mapping between the TID and the link may be performed through a transmission direction base (directional-based). For example, the mapping may be performed for each of both directions between the MLD1 and the MLD2. In addition, a default configuration may exist in the mapping between the TID and the link. For example, the mapping between the TID and link may be mapping all TIDs in any link, fundamentally.

<Quality of Service (QoS) Support of Wi-Fi>

A data rate of Wi-Fi (IEEE 802.11) has been rapidly increased whenever a new protocol version is introduced, and it is expected that 802.11ax in a completion stage recently supports a data rate of about a maximum of 10 Gbps. As such, achievement of the enhanced Wi-Fi data rate is possible since a PHY protocol can support processing of a higher MCS and a wider bandwidth (BW) and utilize multiple antennas upon enhancement of a hardware performance.

However, even though the data rate has rapidly increased, Wi-Fi still has a transmission delay problem. All communication systems including Wi-Fi support limited data rates, and thus cause a transmission delay in traffic transmission by a predetermined time interval. However, a reason why the transmission delay of Wi-Fi is considered as a problem is because the transmission delay of Wi-Fi has unpredictable characteristics. In other words, in a case of a communication system utilizing a dedicated communication resource (a wired or wireless licensed band), a delay time required to transmit traffic can be expected according to the amount of traffic to be transmitted, but a communication system utilizing an unlicensed band, such as Wi-Fi, causes an unexpected transmission delay when a medium is occupied by another device. As such, when the unexpected transmission delay occurs, the availability of traffic having a short lifetime, such voice traffic may be loss, and in this case, it is difficult to expect enhancement of quality of service (QoS) no matter how high the data rate supported by Wi-Fi is.

To overcome the limitations of the unlicensed band as described above, the IEEE 802.11 has continuously developed a MAC protocol, and enhanced distributed channel access (EDCA) introduced in 802.11e may be one of the results. Hereinafter, for convenience of description, in the following description, a QoS AP is indicated as an AP, a QoS STA is indicated as an STA, and a QoS BSS is indicated as a BSS. Accordingly, when an AP is indicated, the AP may be interpreted to indicate a QoS AP.

The EDCA provides a mechanism by which traffic is managed by differentiating the same in four access categories (ACs) according to characteristics of the traffic. In this case, four ACs includes AC voice (AC_VO), AC video (AC_VI), AC best effort (AC_BE), and AC background (AC_BK), and each AC may have different contention window (CW), transmission opportunity (TXOP), and AIFSN parameters. Simply, the EDCA is a mechanism for controlling a transmission priority of traffic transmitted utilizing each AC by differentiating CW, TXOP, and AIFSN parameters for the four ACs. To this end, the EDCA may map traffic (MSDU) to be serviced by a MAC to at least one of the four ACs according to a traffic category (TC) or a traffic stream (TS). In this case, traffic mapped to one of the four ACs by the EDCA is divided into four queues for the respective ACs, and managed. In this case, the four queues may be queues which are not physically divided but are logically divided.

AC_VO is an AC which can be utilized for traffic, such as voice traffic, the absolute amount of which is not large but which is venerable to a transmission delay, and has relatively small CW and AIFSN parameter values to increase a probability that the traffic is serviced in preference to traffic of other AC. However, a TXOP parameter of AC_VO is limited to have a relatively smaller value than a TXOP parameter of other AC, and thus only a shorter transmission time than other AC is secured.

AC_VI is an AC which can be utilized for traffic such as a video, which is more robust to a transmission delay than the voice traffic, but requires low latency transmission and processing of a large amount of traffic. AC_VI has CW and AIFSN parameter values greater than those of AC_VO but smaller than those of other AC, and instead, a TXOP is twice as long as that of AC_VI.

AC_BE is an AC which can be utilized for traffic which is robust to a transmission delay, and most normal traffic except for voice data or streaming video data may be classified as AC_BE. AC_BE uses larger CW and AIFSN parameter values than AC_VO and AC_VI. In addition, AC_BE does not have a separate TXOP, and accordingly, cannot utilize a TXOP sequence in which an ACK is received as a response after transmission of a PPDU, and the PPDU is transmitted again after an SIFS.

AC_BK is an AC which can be utilized for traffic which is robust to a transmission delay, similar to AC_BE, but has a lower priority than BE traffic. AC_BK utilizes the same CW parameter value as AC_BE, and utilizes a larger AIFSN parameter value than AC_BE. In addition, like AC_BE, AC_BK does not have a separate TXOP, and thus a TXOP transmission sequence cannot be utilized.

The above-described four EDCA ACs are mapped with user priorities (UPs) of 802.1D, and the EDCA AC is determined according to an UP value of wiredly received traffic, or a TID of the MSDU, indicated from an upper layer. In this case, when the TID of the MSDU indicates values of 0 to 7, values indicated by the TID may correspond to UPs one-to-one.

A rule of mapping the 802.1D UP and EDCA AC is as shown in Table 1 below.

TABLE 1

| | | | | Table 10-1 | UP-to-AC mappings | |
| --- | --- | --- | --- | --- | --- | --- |
| Priority | UP (Same as IEEE 802.1D user priority) | IEEE 8022.1D designation | AC | Transmit queue (dot11Alternate-EDCAActivated false or not present) | Transmit queue (dot11Alternate EDCAActivated true) | Designation(M138) |
| Lowest | 1 | BK | AC_BK | BK | BK | Background |

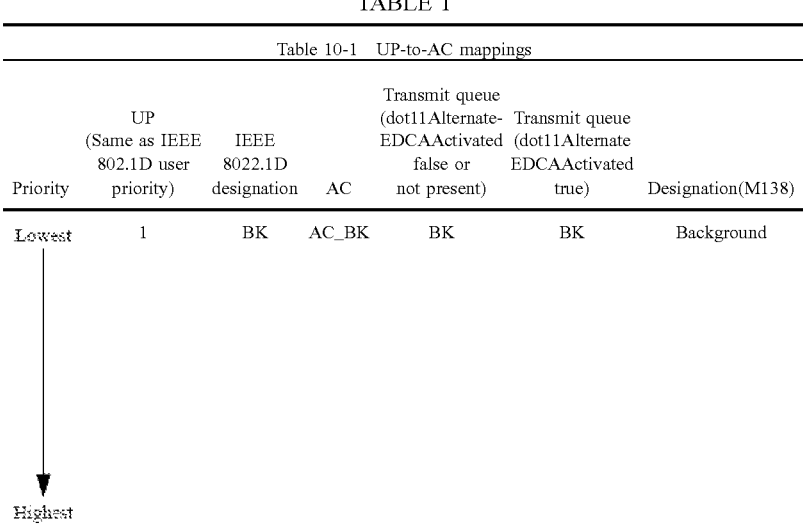

Highest

TABLE 1-continued

| | | | | Transmit queue (dot11Alternate- EDCAActivated false or not present) | Transmit queue (dot11Alternate EDCAActivated true) | |
|---|---|---|---|---|---|---|
| Priority | UP (Same as IEEE 802.1D user priority) | IEEE 8022.1D designation | AC | | | Designation(M138) |
| | 2 | | AC_BK | BK | BK | Background |
| | 0 | BE | AC_BE | BE | BE | Best Effort |
| | 3 | EE | AC_BE | BE | BE | Best Effort |
| | 4 | CL | AC_VI | VI | A_VI | Video (altenate) |
| | 5 | VI | AC_VI | VI | VI | Video (primary) |
| | 6 | VO | AC_VO | VO | VO | Voice (primary) |
| | 7 | NO | AC_VO | VO | A_VO | Voice (alternate) |

Table 10-1    UP-to-AC mappings

In addition, default CW (CWmin and CWmax), AIFSN, and TXOP parameters of each the four EDCA ACs are defined in the standard, a parameter value of each AC is changed by an AP, and thus different values may be utilized for each BSS.

Through utilization of the EDCA mechanism, Wi-Fi traffic is stored in one of four queues corresponding to four ACs, respectively, and may be transmitted to a destination device only when an AC including the Wi-Fi traffic itself successfully performs channel access upon channel access contention with other AC. In this case, a channel access operation between EDCA functions (EDCAFs) corresponding to the AC may be performed through contention, access parameters (CW[AC] and AIFSN[AC]) allocated to each AC may be used in the contention. The channel access contention performed by each AC is identical to DCF. In this case, when there is no traffic to be transmitted according to a specific AC, the corresponding specific AC cannot be used.

However, as described above, since there are different CW and AIFSN parameter values utilized according to each AC, there is a high probability that AC_VO having the smallest CW and AIFSN parameter values successfully performs channel access upon channel access contention with other AC, and accordingly, there is high possibility that traffic of AC_VO is serviced in preference to traffic of other AC.

In addition, the EDCA mechanism specifies an internal contention rule such as using, when an (internal) collision occurs between ACs, an AC (see Table 1) having a high priority and increasing a CW of other AC having caused the collision, a rule of configuring a PPDU by including traffic of an AC other than an AC (primary AC) having won the contention, and the like.

In addition to the above-described EDCA, an 802.11 MAC protocol defines an HCF controlled channel access (HCCA) mechanism for QoS management, and the HCCA mechanism provides a function such as a kind of a centralized/hybrid coordinator utilized to secure the QoS of a traffic stream (TS) (such as voice and video) of an application to be periodically serviced. In addition, there are service period channel access (SPCA) and dynamic allocation of service period mechanisms, but only DMG STA may be utilized, and the above-described EDCA may be considered as the most representative Wi-Fi QoS MAC protocol.

<MLD Operation of Quality of Service (QoS)>

In consideration of the operation of the above-described EDCA mechanism, the purpose that the EDCA applies different CW and AIFSN parameters for each AC is to adjust a transmission priority in consideration of the characteristics of traffic.

In consideration of the structure of an MLD as described through FIG. 9, an MLD may manage one or more STAs managed on different links, and accordingly, the respective STAs of the MLD may have an independent transmission queue from each other. In this case, the queue may be logically divided, and may indicate the same meaning as a description that the MLD may be a logical concept.

As the EDCA enhances QoS service by dividing and managing respective queues for four ACs, the MLD may map traffic to be serviced by the MLD itself to one of STAs managed by the MLD itself, in consideration of the characteristics of the traffic, in order to enhance the QoS. In other words, similar to the mapping of the traffic and one of four ACs by the EDCA mechanism, the MLD may map traffic to one of STAs managed by the MLD itself. In this case, an operation in which the MLD maps specific traffic to a specific STA may be understood as an operation in which the MLD maps the specific traffic to a link on which the specific STA is managed. For easier understanding, a method for enhancing a QoS by using multiple STAs (links) by the MLD is described through FIG. 10.

Figure 10:
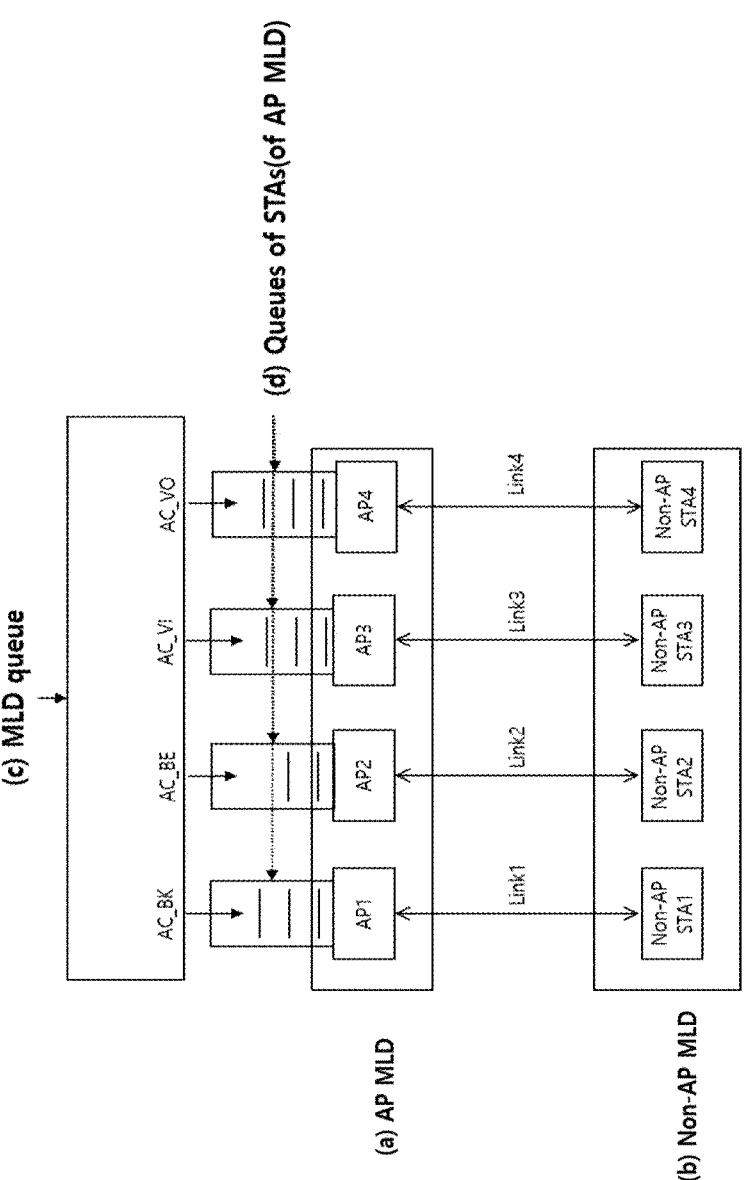
FIG. 10 illustrates an embodiment of a method for mapping, by an MLD, traffic to an STA (link) of the MLD itself, according to an embodiment of the present invention.

FIG. 10 illustrates an embodiment of a method for mapping, by an MLD, traffic to an STA (link) of the MLD itself, according to an embodiment of the present invention.

Referring to FIG. 10, an AP MLD (a) and a non-AP MLD (b) are MLDs each operating four STAs corresponding to AP1, AP2, AP3, and AP4, and non-AP STA1, non-AP STA2, non-AP STA3, and non-AP STA4, and the respective four STAs of the two MLDs may be associated with each other.

When the AP MLD utilizes a queue of four STAs (AP1, AP2, AP3, and AP4) managed by the AP MLD itself, in the similar manner to that of an AC-specific queue of the EDCA, traffic for utilizing AC_BK may be mapped to the queue of AP1, traffic for utilizing AC_BE may be mapped to AP2, traffic for utilizing AC_VI may be mapped to AP3, and traffic for utilizing AC_VO may be mapped to AP4, as shown in Table 1. As such, traffic mapped to each STA may be serviced according to a channel access procedure performed by each STA, and accordingly, traffic of different ACs are not affected by a transmission delay occurring in a process in which the traffic of different ACs are transmitted. That is, a QoS enhancement effect acquired by dividing a mapped STA according to the characteristics of traffic by the MLD is similar to an effect that the EDCA assigns a transmission priority to traffic having a higher priority, but there is a difference in that it is possible for traffic of different ACs to be not affected by transmission of each traffic.

Meanwhile, since there may be different channel qualities and load situations of links managed by respective STAs of the MLD and there may be different PHY performances and operation bandwidths of the respective STAs, a BW and an MCS of a PPDU including specific traffic may vary according to an STA to which the specific traffic is mapped by the MLD.

For example, when AP1 corresponding to an STA of an AP MLD (a) is managed in a 2.4 GHz band, AP1 may have a maximum 40 MHz operation bandwidth, and when AP4 corresponding to another STA of the AP MLD (a) is managed in a 6 GHz band, AP4 may utilize a maximum 320 MHz BW as an operation bandwidth. In this case, if the MLD needs to perform mapping of traffic having characteristics of requiring high throughput and low latency, the MLD may attempt to enhance the QoS by mapping the traffic to AP4. As such, the MLD performs STA mapping in consideration of the characteristics of traffic to be serviced by the MLD itself, and can thus acquire an effect of differentiating not only a transmission priority but also the amount of resource (hardware and frequency) which can be utilized during transmission.

<Traffic Identifier (TID)-to-Link Mapping>

Through the embodiment described in FIG. 10, it is described that the MLD may map traffic to (a link of) an STA managed by the MLD itself in consideration of the characteristics of traffic to be serviced by the MLD itself in order to enhance the QoS. In the embodiment of FIG. 10, for comparison with the EDCA, it is described that traffic mapped to each AC is mapped to each STA, but the MLD may attempt mapping for each TID for a higher resolution capability when mapping the traffic to (the link of) the STA.

According to an embodiment of the present invention, there may be a TID corresponding to a frame. For example, signaling for indicating a TID corresponding to a frame may be included in the frame, and the signaling may be a TID subfield. More specifically, signaling for indicating a TID may be included in a MAC header of a frame. For example, signaling for indicating a TID may be included in a QoS control field. For example, the type of the frame may include a data frame or a QoS data frame. 802.11 indicates a TID according to the type of traffic through a TID subfield existing in a QoS control field of a MAC frame to enhance the QoS. In this case, the TID indicates a traffic stream (TSID) or user priorities (UPs) of an A-MSDU, a fragment, or an MSDU included in a frame body. The TID subfield includes a total of four bits, and may indicate values from 0 to 15.

When the TID subfield indicates values from 0 to 7, values indicated by the TID subfield are values for UPs of MSDU(s) included in the frame body, and need to be processed in MAC entities by using AC parameters corresponding to the UPs by using the EDCA as an access policy.

When the TID subfield indicates values from 8 to 15, values indicated by the TID subfield are values for TSIDs of MSDU(s) included in the frame body, and the MSDU(s) need to process the MAC entities according to UPs indicated by a user priority subfield in a TS info field of a TSPEC, and need to follow values indicated by other parameters of the TSPEC.

In this case, the UPs of TSID traffic may be also identified through a user priority field of a TCLAS rather than the TSPEC. In addition, the access policy to be applied to the MSDU in which the TID subfield has values from 8 to 15 may be indicated by an access policy corresponding to another subfield of the TS info field, when access policy subfields (Bit7, bit8) of the TS info field are indicated as (1, 0), it may be interpreted that the subfield indicates EDCA, and when the access policy subfields (Bit7, bit8) of the TS info field are indicated as (1,0) or (1, 1), it may be interpreted that the subfield indicates HCCA.

In addition, when a TID corresponding to a TS is mapped to a link, an intra-access category priority element may be indicated by an ADDTS request frame utilized during generation of the TS, and alternate queue (AC queue) information to be utilized during transmission of the corresponding TS to the EDCA and a user priority may be included in an intra-access priority field existing in the element. In this case, the MLD may process traffic having the TID corresponding to the TS in consideration of queue information and the UP indicated by the intra-access priority field.

As such, since the TID has a meaning corresponding to UPs of traffic, and thus it may be considered that the MLD maps traffic of each TID to different STAs, similar to a case in the embodiment of FIG. 10 where traffic corresponding to each AC is mapped to different STAs. This may be conceptually understood as TID-to-STA mapping or TID-to-link mapping, and to perform the TID-to-link mapping, an agreement between MLDs performing communication with each other may be needed.

That is, a specific MLD may signal its own TID-to-link mapping plan to another MLD, and the MLD having receiving the TID-to-link mapping plan from the specific MLD may accept or reject the TID-to-link mapping planned by the specific MLD. In this case, when a separate TID-to-link mapping agreement between two MLDs connected to each other is not made, each MLD may transmit traffic through all links through which connection with a counterpart MLD is established, regardless of a TID of traffic. This may be understood that all TIDs are mapped to all links, and may be considered as a default TID-to-link mode in which two MLDs having established an initial connection are implicitly agreed to each other.

A specific rule to be observed during TID-to-link mapping may not be defined. However, the MLD needs to map all TIDs to one or more links when performing the TID-to-link mapping. According to an embodiment of the present invention, it is possible to transmit a frame for a TID mapped to a link, on the link. In addition, it is possible not to transmit a frame for a TID not mapped to a link, on the link. In addition, the TID-to-link mapping may be performed separately for each MLD. In addition, the TID-to-link mapping may be separately performed for each transmission direction of a link. For example, the TID-to-link mapping may present for each of an uplink and a downlink. In addition, in the present invention, the TID-to-link mapping may be interchangeable used with TID-to-link, TID-to-link, mapping, mapping between a TID and a link, etc. In addition, in the present invention, the TID-to-link mapping may also indicate mapping between an AC and a link, mapping between a user priority and a link, mapping between a traffic class and a link, or mapping between a traffic stream and a link.

In addition, the above-describe TID-to-link mapping may be agreed differently from MLDs connected each other. In an embodiment, when MLD1 and MLD2 are connected through Link1 and Link2, MLD1 may map traffic having TID 5 values from 0 to 3 to Link1, and MLD2 may map traffic having TID values from 4 to 7 to Link1.

In addition, signaling of the TID-to-link mapping may be implicitly performed. In an embodiment, when MLD1 and MLD2 are connected through Link1 and Link2, MLD1 may map only traffic having TID values from 0 to 3 to Link1, and may not separately signal a link to which the remaining TID is to be mapped. In this case, it may be understood that traffic having TID values other than values from 0 to 3 is mapped to Link2. That is, it may be interpreted that a TID not mapped to a specific link in the TID-to-link mapping signaling is mapped to another link that is not separately indicated in the TID-to-link mapping signaling. In this case, the link not separately indicated may be interpreted as a link to which all TIDs are mapped.

In addition, not only in a case where two connected MLDs establishes initial MLD connection but also in a case where changing is required during management, 1) if an MLD switches an STA of a specific link to a disassociation/disable state (for the purpose of power saving, etc.) according to a management policy, 2) if an MLD determines that it is difficult to secure a QoS for traffic mapped to the specific link, etc., the MLD may request changing of its own TID-to-link mapping configuration from a counterpart MLD.

In addition, the specific MLD may request the counterpart MLD to change the TID-to-link mapping. For example, when an AP MLD map traffic having TID values from 0 to 3 to Link1 among traffic to be transmitted to a non-AP MLD, the non-AP MLD may request to change the mapping link of the traffic to another link (e.g., Link2) other than Link1.

In addition, when a TID-to-link mapping request performed by a specific MLD is rejected by a counterpart MLD, requesting of mapping of the same TID-to-link configuration by the specific MLD may be restricted for a predetermined time interval. This is to prevent TID-to-link mapping requests and rejections from being repeated, and a time interval for which the same TID-to-link request after the rejection is restricted may be a time interval indicated by an AP.

That is, when the counterpart MLD rejects a mapping relationship requested through a request frame after the specific MLD requests mapping of a link for a specific TID through a TID-to-link mapping element of the request frame, it may be restricted for the specific MLD to request the rejected mapping relationship again through the request frame for a predetermined time interval.

To this end, the AP MLD may signal time information related to a TID-to-link mapping request interval to STAs of its own BSS, as a BSS management parameter. In this case, the restriction of the rejected TID-to-link mapping may be applied for each rejected TID. In other words, when simultaneously proposed requests for mapping of several TIDs and links are rejected for a specific TID, it may be restricted to request mapping of the specific TID again for the rejected link.

Figure 11:
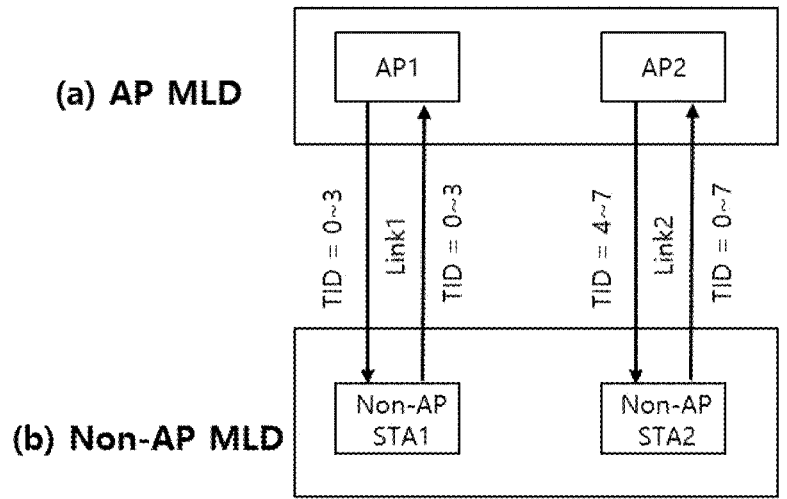
FIG. 11 illustrates an embodiment of a TID-to-link mapping method established between an AP MLD and a non-AP MLD.

FIG. 11 illustrates an embodiment of a TID-to-link mapping method established between an AP MLD and a non-AP MLD.

To establish a TID-to-link mapping rule between the AP MLD and the non-AP MLD, it is necessary to explicitly indicate which TID is to be mapped to which link.

According to an embodiment of the present invention, there may be signaling indicating which TID is to be mapped to which TID. For example, the signaling may be a TID-to-link mapping element. The TID-to-link mapping element may include a link ID field. The link ID field may include a value indicating a link to which the TID-to-link mapping element including the link ID field is mapped.

Alternatively, the link ID field may include a value indicating information of a link indicated by TIDs info field corresponding to the link ID field.

In addition, the TID-to-link mapping element may include the TIDs info field. The TIDs info field may include information on a TID to be mapped. The TIDs info field may include information on a TID mapped by a TID-to-link mapping element including the TIDs info field. For example, the TIDs info field may include information on a TID mapped to a link indicated by a link ID included in the TID-to-link mapping element including the TIDs info field. For example, the TIDs info field may include one or more bits corresponding to TID values, respectively. If a TID is mapped to a link, a bit corresponding to the TID may be configured as a pre-configured value (for example, 1). In addition, if a TID is not mapped to a link, a bit corresponding to the TID may be configured as a pre-configured value (for example, 0) which is different from the pre-configured value.

An AP MLD (a) of FIG. 11 may plan to transmit traffic having TID values 0 to 3 (0, 1, 2, and 3) among traffic (MSDU) to be transmitted to a non-AP MLD (b), through AP1 managed by Link1.

To this end, the AP MLD may indicate Link1 through a link ID field of a TID-to-link mapping element (c), and then signal that TID 0 to 3 are to be mapped to Link1 to the non-AP MLD by using a TIDs info field. In this case, the TID-to-link mapping element (c) is an element format as an example, and it can be easily understood that an element having another structure may be utilized for the same purpose.

The non-AP MLD may identify a TID-specific transmission link planned by the AP MLD, through the TID-to-link mapping element, and then approve or reject the same.

It can be understood as a situation in which after identifying the TID-to-link mapping received from the AP MLD (a), the non-AP MLD (b) of FIG. 11 agrees to map traffic corresponding to TIDs 0 to 3 to Link1, and map traffic corresponding to TIDs 4 to 7 to Link2. In this case, each TID-to-link mapping element transmitted to the non-AP MLD by the AP MLD may include two Link IDs and TIDs info subfields. In this case, the two link ID subfields may indicate Link1 and Link2, respectively, and the two TIDs info subfields may indicate a value indicating 0 to 3 and a value indicating 4 to 7, respectively.

In this case, the TIDs info subfield may include eight bits, and it can be interpreted that the respective bits correspond to TIDs 0 to 7, respectively. That is, to indicate TIDs 0 to 3, eight bits of the TIDs info subfield may be indicated as 1111 0000, and to indicate TIDs 4 to 7, eight bits of the TIDs info subfield may be indicated as 0000 1111.

In this case, the TIDs info subfield may include eight bits, and it can be interpreted that the respective bits correspond to TIDs 0 to 15, respectively. That is, to indicate TIDs 0 to 3, 16 bits of the TIDs info subfield may be indicated as 1111 0000 0000 0000, and to indicate TIDs 4 to 7, 16 bits of the TIDs info subfield may be indicated as 0000 1111 0000 0000.

Alternatively, the TIDs info subfield may include two subfields internally, and the two subfields may be a Min TID and a Max TID. In this case, the Min TID subfield may indicate the smallest TID value among TIDs to be mapped to a corresponding link, and the Max TID subfield may indicate the largest TID value among TIDs to be mapped to a corresponding link. In this case, each of the Min TID and the Max TID may be indicated by three bits or four bits.

In an embodiment of three bits, when the Mm TID subfield of the TIDs info subfield is indicated as 000 and the Max TID subfield is indicated as 011, TIDs indicated by the TIDs info subfield may be interpreted as TIDs 0 to 3, and when the Min TID subfield is indicated as 100 and the Max TID subfield is indicated as 111, TIDs indicated by the TIDs info subfield may be interpreted as TIDs 4 to 7.

In an embodiment of four bits, when the Min TID subfield of the TIDs info subfield is indicated as 0000 and the Max TID subfield is indicated as 0011, TIDs indicated by the TIDs info subfield may be interpreted as TIDs 0 to 3, and when the Min TID subfield is indicated as 0100 and the Max TID subfield is indicated as 0111, TIDs indicated by the TIDs info subfield may be interpreted as TIDs 4 to 7.

It can be understood as a situation in which after identifying the TID-to-link mapping received from the AP MLD (a), the non-AP MLD (b) of FIG. 11 agrees to map traffic corresponding to TIDs 0 to 3 to Link1, and map traffic corresponding to TIDs 4 to 7 to Link2.

In this case, the non-AP MLD (b) may only indicate that TIDs 0 to 3 are to be mapped to Link1 through the TID-to-link mapping element, and may not separately indicate that TIDs 0 to 7 are to be mapped to Link2. In other words, the non-AP MLD (b) does not separately indicate a TID to be mapped to Link2 through the TID-to-link mapping element transmitted to the AP MLD (a), and the AP MLD (a) may implicitly interpret that all TIDs are mapped to unindicated Link2.

Through utilization of the above-described TID-to-link mapping, an MLD may map traffic to be serviced to one or more STAs (Links) managed by the MLD itself according to a TID of the traffic. If TIDs mapped to a specific link correspond to two or more EDCA ACs, a QoS STA (MLD) managed on the specific link may service traffic of the mapped TIDs by differentiating ACs according to the EDCA mechanism. That is, the MLD may map a TID to each link by utilizing the TID-to-link mapping. Each STA of the MLD may apply the EDCA mechanism for the traffic of the TIDs mapped to its own link.

For example, when a specific MLD maps traffic corresponding to AC_VO and traffic corresponding to AC_BK to a specific link through TID-to-link mapping, an STA managed on the specific link is more likely to service the traffic corresponding to AC_VO earlier than the traffic corresponding to AC_BK. In this case, if the STA managed on the specific link configures a sum of CWmax and AIFSN parameters of AC_VO to be smaller than a value of an AIFSN of AC_BK, the STA managed on the specific link may always service the traffic corresponding to AC_VO in preference to the traffic of AC_BK.

As such, according to a management target, the MLD may adjust and change a TID to be mapped to each link so as to enhance a QoS or perform an operation in consideration of performance characteristics of each link, and a rule to be observed during the TID-to-link mapping may not be separately defined. This means that the MLD may freely utilize the TID-to-link mapping according to a management policy of the MLD, unlike a case where the EDCA mechanism provide an UP to AC rule. However, all TIDs need to be mapped to one or more links, and the MLD should not request, from another MLD, TID-to-link mapping in which at least one TID is not mapped to any link. Accordingly, if mapping of a TID to at least one link is not implicitly performed, all TIDs need to be explicitly mapped to one or more links.

Figure 12:
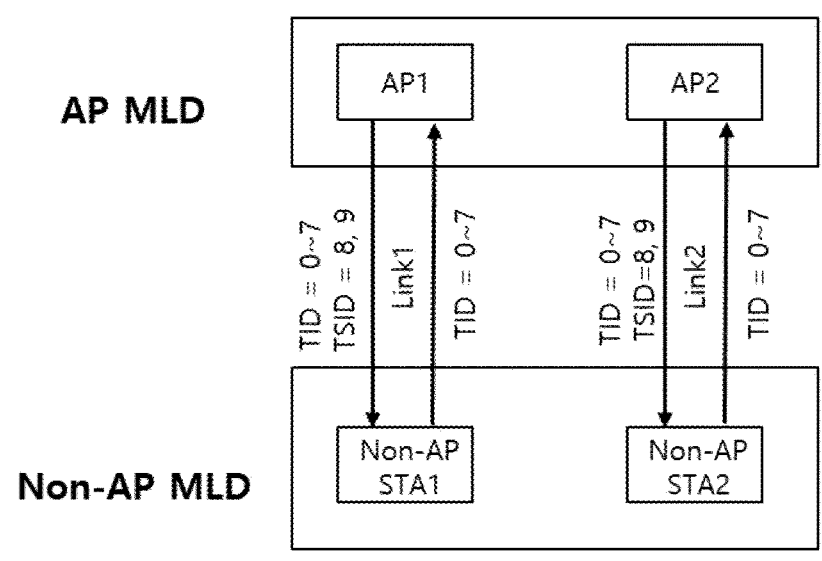
FIG. 12 illustrates an embodiment of a method for TID-to-link mapping which can be established between an AP MLD and a non-AP MLD.

FIG. 12 illustrates an embodiment of a method for TID-to-link mapping which can be established between an AP MLD and a non-AP MLD.

Part (a) of FIG. 12 is an embodiment in which both an AP MLD and a non-AP MLD utilize default TID-to-link mapping, and a situation in which the AP MLD and the non-AP MLD manage AP1 and AP2 and non-AP STA1 and non-AP STA2 in Link1 and Link2, respectively is considered. In this case, when no separate TID-to-link mapping request/approval is not performed after the AP MLD and the non-AP MLD performs MLD association, a default TID-to-link mapping state as considered in this embodiment may be maintained.

Referring to part (a) of FIG. 12, the AP MLD may identify that not only a TID but also a TSID is mapped to all links, and when the TSID also does not perform separate TID-to-link mapping, mapping to all links may be a default mapping state. In this case, when the MLD attempts to change the TSID in a mapping form other than a default mode (for example, performs mapping of TSID 9 to Link2), the MLD may perform TSID-to-Link mapping in the same manner as the TID-to-link mapping. A specific method of the TSID-to-Link mapping can be easily understood when considering the TID-to-link method, and accordingly, a detailed description thereof is omitted.

<Quality-of-Service Management Frame (QMF) Policy>

As described above, for the purpose of QoS enhancement, the MLD may perform service link differentiation in consideration of characteristics of traffic to be serviced by a MAC, by utilizing TID-to-link mapping. This can be understood that similar to a case where the conventional Wi-Fi differentiates ACs according to characteristics of traffic by utilizing the EDCA mechanism, the MLD utilizes each link as an access link (AL), and differentiates the AL according to the characteristics of traffic.

However, traffic to be processed by the MAC of Wi-Fi includes not only an MSDU requested to be processed in the upper layer but also a management frame including information for managing a BSS. Unlike each MSDU having a TID, such a management frame does not have an individual TID.

Accordingly, a QoS STA needs to determine an AC to be utilized when transmitting the QoS management frame, and the conventional 802.11 standard provides a default QMF policy for the QoS management frame so as to allow the QoS STA to determine an AC to be utilized when transmitting the QoS management frame (hereinafter, referred to as a management frame). In this case, the QMF policy may be changed by a QoS AP managing a QoS BSS. According to an embodiment, there may be an AC corresponding to a management frame.

In addition, the AC corresponding to the management frame may be determined by the QMF policy. In this case, it is possible to call the AC corresponding to the management frame as a QMF access category. In addition, the type of the management frame or the QMF AC may be determined on the basis of a type, a subtype, a category value, etc. corresponding to the management frame. In addition, a service in which the AC corresponding to the management frame is present, a service of performing channel access on the basis of the AC based on the QMF policy when transmitting the management frame, etc. may be referred to as a QMF service. In addition, transmitting a frame based on the QMF policy may limited to a case where both an STA transmitting the frame and an STA corresponding to a recipient of the frame support the QMF.

Table 2 shows an example of a part of a default QMF policy.

TABLE 2

| Description | Management Frame Subtype value | Category value | Action field | QMF access category |
|---|---|---|---|---|
| (Re)Association Request/Response | 0000-0011 | N/A | N/A | AC_VO |

TABLE 2-continued

| Description | Management Frame Subtype value | Category value | Action field | QMF access category |
|---|---|---|---|---|
| Probe Request (individually addressed) | 0100 | N/A | N/A | AC_VO |
| Probe Request (group addressed) | 0100 | N/A | N/A | AC_BE |
| Probe Response | 0101 | N/A | N/A | AC_BE |
| Timing Advertisement | 0110 | N/A | N/A | AC_BE |
| Beacon, ATIM, Disassociation, Authentication, Deauthentication | 1000-1100 | N/A | N/A | AC_VO |
| Spectrum management | 1101 | 0 | 0-3 | AC_BE |

Referring to Table 2, with respect to a (re)association request/response, AC_VO is configured as a default AC, and accordingly, when QoS STAs transmit the association request or respond with the association response, the QoS STAs may need to perform transmission by utilizing an AIFSN parameter. On the other hand, in a case of timing advertisement, when AC_BE is configured as a default AC, and accordingly, a QoS AP does not separately change a QMF policy of a QoS BSS, a QoS STA needs to perform transmission by utilizing CW and AIFSN parameters of AC_BE when transmitting the timing advertisement.

As such, a reason for assigning different QMF access categories according the type of a management frame in the default QMF policy is that there is a type of a management frame having no high processing urgency even as a management frame, and is to prevent latency of a service of another management frame and traffic in the process of processing the management frame having no high processing urgency.

As described above, the management frame also needs to differentiate an AC according to the role of the management frame and information included the management frame. Accordingly, the MLD may map management frames to different links according to the type, similar to a case where AL is differentiated according to a TID through the TID-to-link mapping.

However, the default QMF policy of the MLD may be configured so that all QMFs can utilize all ACs. In other words, in the default QMF policy of the MLD, a QMF access category may be configured as AC_Any for management frames of all subtypes.

According to an embodiment of the present invention, when a QMF service is enabled, a management frame may be transmitted on the basis of an access category corresponding to the management frame. However, being based on the access category may be limited to channel access. According to an embodiment of the present invention, in a case where a QMF service is enabled, when a management frame is transmitted, the management frame is transmitted on the basis of an access category corresponding to the management frame, but the management frame may be transmitted in any links regardless of TID-to-link mapping. For example, even in a case where the AC corresponding to the management frame is not mapped to a link on the basis of the TID-to-link mapping, the management frame may be transmitted on the link.

That is, a normal frame is transmitted on a link mapped to the allocated TID. However, in a case of a management frame, a TID may not be allocated, and thus a link to be transmitted may not be specified. In this case, the management frame has no allocated TID, and thus configuration of a mapping relationship between a TID and a link may not be required. Accordingly, the management frame may be transmitted regardless of the mapping between the TID and the link.

<Quality-of-Service Management Frame (QMF)-to-Link Mapping>

As the easiest method for performing QMF-to-link mapping, according to the QMF access category (see Table 2) assigned to each management frame, each management frame may be mapped to a link to which traffic corresponding to the AC is mapped. That is, the management frame may be transmitted on the basis of the TID-to-link mapping.

For example, when a certain AC (or TID) is mapped to a link and an AC (or TID) corresponding to a management frame is the certain AC (or TID), the management frame may be transmitted on the link. In addition, when a certain AC (or TID) is not mapped to a link and an AC (or TID) corresponding to a management frame is the certain AC (or TID), it is possible that the management frame cannot be transmitted on the link.

To describe more specifically, when a specific MLD maps a TID indicating traffic corresponding to AC_VO to a specific link, an association req/resp management frame to which a QMF access category is assigned as AC_VO may be mapped to the specific link. When processing each management frame while not following a default QMF policy, a QoS STA may change an AC to be utilized, and accordingly, may freely change a link to which each management frame is to be mapped by changing the AC assigned to each management frame.

As such, even for the QMF having no TID, the MLD may perform QMF-to-Link mapping for each QMF by using a method similar to the TID-to-link mapping.

However, the specific QMF may include information required to be exchanged between STAs of the MLD, rather than information exchanged at the MLD level, such as a normal MSDU. In this case, when the MLD has mapped the specific QMF to a specific link only, an STA managed on a link other than the specific link has a problem that the specific QMF cannot be transmitted.

That is, in a case of the QMF, there may be a QMF having a characteristic that transmission needs to be possible through all links, regardless of the type of the AC assigned to the QMF, and accordingly, the MLD may indicate the QMF which can be mapped to all links, regardless of the assigned AC.

In other words, in a case of the management frame, a specific TID is not allocated, and since there is no TID allocation, mapping between a TID and a link may be applied. Accordingly, the management frame may be transmitted through all links, regardless of mapping between the TID and the link, and in this case, the link through the management frame is transmitted may be an enabled link for which mapping between the TID and the link is configured. In this case, the enabled link may indicate a link for which a mapping relationship with at least one TID is configured.

In this case, when the management frame is transmitted only through the enabled link, a case where the management frame cannot be transmitted may occur if there is no enabled link except for the broadcasted management frame transmitted regardless of the link. Accordingly, a specific management frame may be transmitted even when there is no enabled link.

Figure 13:
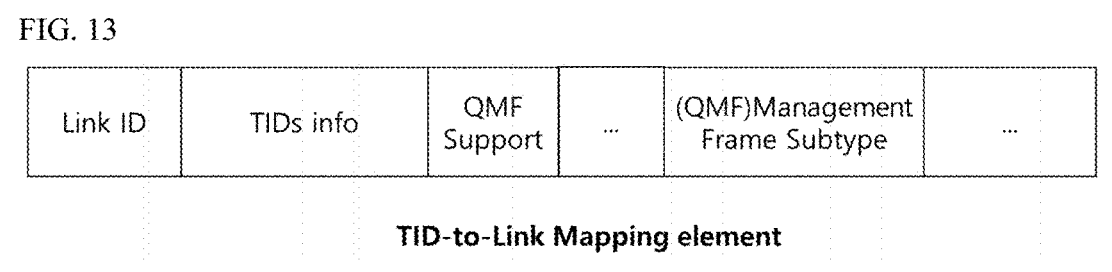

FIG. 13 illustrates an embodiment of a TID-to-link mapping element indicating a QMF which can be transmitted regardless of a link.

Referring to FIG. 13, when performing TID-to-link mapping, an MLD may indicate a QMF which can be mapped to all links regardless of an AC assigned by a QMF policy.

Specifically, information related to a management frame subtype may be indicated in a TID-to-link mapping element, and the indicated management frame subtype may be mapped to all links regardless of an AC (or TID) assigned to the management frame.

As illustrated in FIG. 13, the TID-to-link mapping element may have a QMF support field corresponding to each link ID. The QMF support field indicates whether all types of QMFs can be mapped to a link indicated by a corresponding link ID field. More specifically, when a QMF support field corresponding to a specific link is indicated as 1 (true), all types of QMFs may be mapped to the specific link regardless of a QMF policy of each of the QMFs.

In addition, a (QMF) management frame subtype may be indicated in the TID-to-link mapping element. In this case, a QMF of a subtype corresponding to a value indicated by the management frame subtype field may be mapped to all links regardless of an assigned AC. For example, when a management frame subtype field is indicated as 0101 (probe response), a probe response frame may be mapped to all links regardless of an AC assigned (allocated/indicated) by a QMF policy.

That is, the TID-to-link mapping element may include a QMF support field for indicating whether all QMFs can be mapped to each link. In addition, the TID-to-link mapping element may include a (QMF) management frame subtype for indicating whether a management frame of a specific subtype can be mapped to all links. Alternatively, there may be signaling which indicates whether QMF transmission is to be based on the TID-to-link mapping. That is, there may be signaling which indicates that whether transmission is possible is determined on the basis of the TID-to-link mapping when the QMF is transmitted on a specific link.

That is, according to an embodiment, when the signaling indicates a pre-configured value, it is possible to transmit the QMF regardless of the TID-to-link mapping. That is, even though an AC corresponding to the QMF is not mapped to a link on the basis of the TID-to-link mapping, transmission on the link may be possible. As another embodiment, when the signaling indicates a pre-configured value, it is possible to transmit the QMF on the basis of the TID-to-link mapping. That is, when an AC corresponding to the QMF is mapped to a link on the basis of the TID-to-link mapping, transmission on the link may be possible. In addition, when an AC corresponding to the QMF is not mapped to a link on the basis of the TID-to-link mapping, transmission on the link may not be possible.

However, when the MLD receives a QMF requesting (soliciting) a response, such as a probe request/response, through a specific link, a response QMF frame may be transmitted as a response (may be transmitted) through the specific link, regardless of a QMF-to-Link mapping policy of the MLD. That is, when a request-type QMF frame is received on a specific link, a response-type QMF frame responding thereto may be transmitted as a response through the specific link, regardless of the AC. In addition, when a request-type QMF frame is received on a specific link, a response-type QMF frame responding thereto may be transmitted as a response through the specific link, regardless of the QMF-to-Link mapping.

Figure 14:
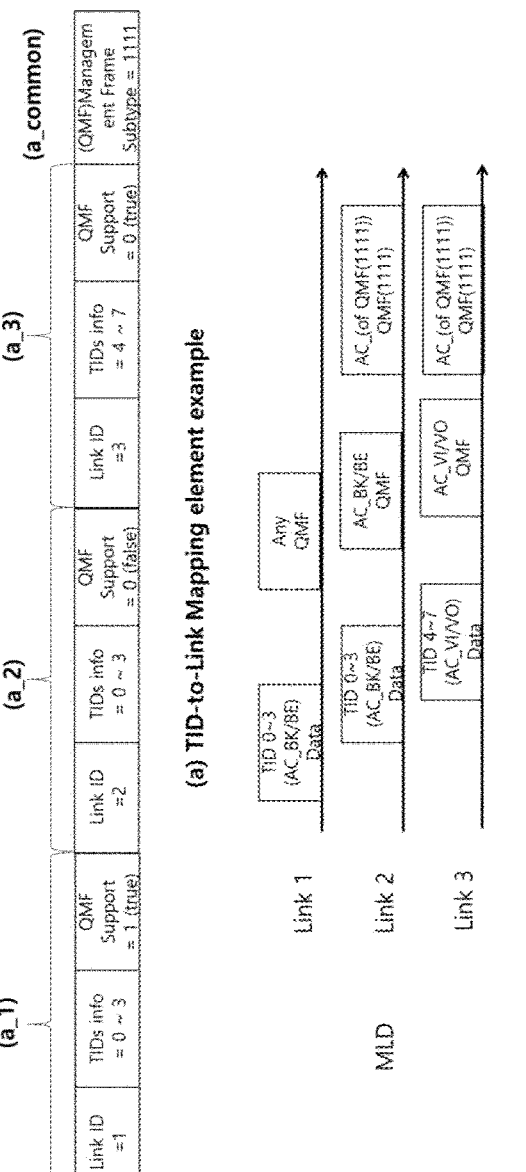
FIG. 14 illustrates an embodiment of an operation of an MLD having a QMF policy established through TID-to-link mapping.

FIG. 14 illustrates an embodiment of an operation of an MLD having a QMF policy established through TID-to-link mapping.

Part (a) of FIG. 14 shows an example of a TID-to-link mapping element which can be generated to perform TID-to-link mapping for three links. In this case, if the MLD having generated the element is associated with another MLD by utilizing more than four links, this implicitly indicates that a link not explicitly indicated by link ID fields of the element will utilize default TID-to-link mapping, and may be interpreted by a reception MLD.

In this case, when a specific MLD has generated the TID-to-link mapping illustrated in part (a) of FIG. 14 and a counterpart MLD has accepted the same, the specific MLD may transmit a QMF frame and traffic as in the scheme shown in part (b) of FIG. 14. For reference, (a_1), (a_2), and (a_3) in part (a) of FIG. 14 illustrate subfields of Link1, Link2, and Link3, respectively, and (a_common) is inserted to indicate a subfield applied to all links.

Referring to part (b) of FIG. 14, the MLD may map and transmit traffic having TIDs 0-3 by using Link1, and in this case, TIDs 0-3 may be TIDs corresponding to AC_BK(UP 1, 2) and AC_BE(UP 0, 3) among ACs. In this case, referring to (a_1) in part (a) of FIG. 14, a QMF support of Link1 is indicated as 1 (true), and accordingly, the MLD may transmit (map) all types (subtypes) of QMFs through Link1, regardless of an AC assigned to each QMF.

As illustrated in part (b) of FIG. 14, the MLD may transmit (map) traffic having TIDs 0-3 through Link2 in the same manner as Link1. However, a QMF support field (see (a_2) in part (a) of FIG. 14) corresponding to Link2 is indicated as 0, and thus only a QMF to which the same AC as that of the TID mapped to Link2 is assigned may be mapped to Link2 and transmitted. However, 1111 is indicated through a (QMF) management frame subtype field ((a_common) in part (a) of FIG. 14), and thus the MLD may transmit (map) the QMF (1111) having the management frame subtype corresponding to 1111 through Link2. In this case, for an STA of Link2 to transmit a QMF (1111), the STA may need to attempt to perform channel access by applying an AC assigned to the QMF (1111) (an AC indicated by a QMF policy).

Traffic having TIDs 4-7 may be transmitted (mapped) to Link3 of the MLD, and in this case, TIDs 4-7 may be traffic mapped to AC_VI and AC_VO. In this case, a QMF support field ((a)3) in part (a) of FIG. 14) corresponding to Link3 is indicated as 0, and thus the MLD may transmit or map only a QMF to which AC_VI/AC_VO is assigned, through Link3. However, 1111 is indicated through a (QMF) management frame subtype field, and thus the MLD may transmit (map) a QMF (1111) having a management frame subtype corresponding to 1111 through Link3. In this case, for a STA of Link3 to transmit the QMF (1111), the STA may need to attempt to perform channel access by applying an AC assigned to the QMF (1111) (an AC indicated by a QMF policy).

<Traffic Identifier (TID)-to-Link Mapping Negotiation>

According to the above-described embodiments of the present invention, MLDs can enhance a QoS by mapping respective TIDs to different links through TID-to-link mapping. The following embodiments of the present invention provide a specific signaling method and negotiation method of TID-to-link mapping performed between MLDs.

For reference, the drawing of each embodiment may illustrate that some immediate Ack frames are omitted for concise representation. For example, a responding MLD having received a TID-to-link mapping frame may transmit an immediate Ack frame (transmitted as a response after an SIFS), and the immediate Ack frame may be omitted for conciseness.

An MLD (an AP MLD or a non-AP MLD) requesting TID-to-link mapping may indicate a specific TID and a specific link by using a TID-to-link mapping element to request that the indicated TID is to be mapped to the indicated link. In this case, the TID-to-link mapping element may be utilized to indicate multiple TID groups together with multiple link groups.

For example, a single TID-to-link mapping element may indicate TID sets #1, #2, and #3 to correspond the same to link sets #1, #2, and #3, respectively. In this case, when TID set #1 is indicated to correspond to link set #1, it may be understood that TIDs corresponding to TID set #1 attempt to perform mapping to links corresponding link set #1. In this case, a TID-to-link mapping element including link information and a TID desiring the mapping may be (included in a TID-to-link mapping request frame and) transmitted through the TID-to-link mapping request frame. In this case, an MLD having transmitted the TID-to-link mapping request frame may be referred to as an initiating MDL or a requesting MLD.

As such, the MLD having received the TID-to-link mapping element (the TID-to-link mapping request frame) including indication information on the TID and the link may identify TID-to-link mapping information desired by the MLD having transmitted the TID-to-link mapping request frame. Thereafter, the MLD having received the TID-to-link mapping request frame may need to respond with a TID-to-link mapping response frame to accept/adopt or refuse/reject/deny the TID-to-link mapping requested by the initiating MLD. In this case, the MLD having received the request frame needs to respond with the TID-to-link mapping response frame, and thus the MLD may be referred to as a responding MLD.

When accepting the TID-to-link mapping requested by the initiating MLD, the responding MLD may respond without including a TID-to-link mapping element in the TID-to-link mapping response frame transmitted as a response by the responding MLD itself. That is, when the TID-to-link mapping response frame received as a response to the TID-to-link mapping request frame transmitted by the initiating MLD does not include the TID-to-link mapping element, the initiating MLD may recognize that the TID-to-link mapping requested by the initiating MLD itself has been accepted by the responding MLD.

That is, when transmission/reception of a response frame not including the TID-to-link mapping element has been completed, it may be understood that a new TID-to-link mapping negotiation between two MLDs having transmitted/received the response frame has been completed. In this case, performing communication by the two MLDs according to the newly negotiated TID-to-link mapping may be suspended for a predetermined time.

In this case, the suspension for the predetermined time may be for management of a transmission queue of STAs of each link included in (connected to) each MLD. More specifically, after completion of the TID-to-link mapping negotiation, each of the MLDs may have a suspension time to manage a transmission queue of an STA corresponding to each link according to a negotiated TID-to-link mapping state. That is, after the suspension time corresponding to the predetermined time passes, two MLDs having completed the TID-to-link mapping need to perform communication according to the negotiated TID-to-link mapping state. In this case, performing the communication according to the TID-to-link mapping state means that only traffic (frame, etc.) of a TID mapped to a specific link may be transmitted/received on the corresponding link.

On the other hand, when rejecting the TID-to-link mapping requested by the initiating MDL, the responding MLD may respond by including a TID-to-link mapping element in the TID-to-link mapping response frame transmitted as a response by the responding MLD itself. In this case, the TID-to-link mapping element included in the response frame may indicate a TID and a link that are different from those of the TID-to-link mapping element included in the request frame. For example, the TID-to-link mapping element included in the request frame may indicate that TID 0 corresponds to Link 1. In this case, when the responding MLD indicates, through the TID-to-link mapping element included in the response frame, that TID 0 corresponds to Link 2, the initiating MLD having transmitted the request frame may recognize that the proposal of mapping between TID 0 to Link 1, made by the initiating MLD itself, has been rejected. In addition, the initiating MLD may recognize that the responding MLD desires that TID 0 is mapped to Link 2, by identifying that the response frame transmitted as a response by the responding MLD indicates that TID 0 corresponds to Link2.

That is, in a case where the initiating MLD has received the response frame including the TID-to-link mapping element, as a response, the initiating MLD may need to indicate the same TID-to-link mapping information indicated by the received response frame when the initiating MLD configures a request frame to be (re)transmitted to the responding MLD later.

In addition, the responding MLD may accept only some of the TID-to-link mapping indicated (requested) by the initiating MLD through the TID-to-link mapping element. For example, the initiating MLD may request mapping between TID 0 and Link 1 by indicating that TID 0 corresponds to Link 1, and may simultaneously request mapping between TID 1 and Link 2 by indicating that TID 1 corresponds to Link 2. In this case, the responding MLD may accept only one of two mapping requests (TID 0 to Link 1 and TID 1 to Link 2) requested by the initiating MLD. In this case, the responding MLD may indicate only a TID remaining after excluding a specific TID to be accepted through the TID-to-link mapping element included in the response frame, so as to accept the TID-to-link mapping request requested in relation to the specific TID. In other words, when there is TID-to-link mapping for acceptance (TID-to-link mapping included in the TID-to-link mapping element of the request frame) among a TID-to-link mapping list (field or subfield) indicated by the initiating MLD, the responding MLD may implicitly indicate the acceptance by not indicating a corresponding TID (the TID for acceptance) through the response frame. Accordingly, when there is a TID not indicated (or not counter-proposed) through the response frame of the responding MLD among TIDs indicated by the initiating MLD by itself through the request frame, the initiating MLD may recognize (interpret) that the TID-to-link mapping request for the TID has been accepted.

An AP MLD may transmit a TID-to-link mapping element by including the same in a beacon frame to assist non-AP STAs (MLDs) having received the beacon frame in recognizing a TID-to-link mapping state preferred by the AP MLD itself. In this case, the non-AP STA MLD may request a TID-to-link mapping negotiation through a TID-to-link mapping element when transmitting an association request frame to a corresponding AP MLD. In this case, the non-AP STA MLD may need to configure a TID-to-link mapping element to be included in the association request frame transmitted by the non-AP STA MLD itself, in consideration of the AP's preferred TID-to-link mapping state indicated through the beacon frame. In this case, the AP MLD which includes the TID-to-link mapping element in the beacon frame may be limited to an AP MLD supporting the TID-to-link mapping negotiation.

A TID-to-link mapping element may be transmitted to be included in a (re)association request/response frame, or may be transmitted through a TID-to-link mapping request/response frame. In this case, the TID-to-link mapping elements included in the two types of response frames may be included to propose preferred TID-to-link mapping to the MLD having transmitted the request frame. Alternatively, a response frame (unsolicited response frame) transmitted without receiving a request frame including the TID-to-link mapping element may be transmitted to propose (indicate) a preferred TID-to-link mapping state to an MLD corresponding to a single destination device of the corresponding frame.

Figure 15:
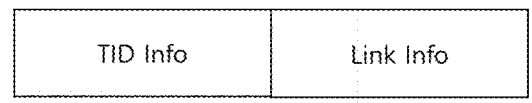
FIG. 15 illustrates an embodiment of a format of a TID-to-link mapping element.

FIG. 15 illustrates an embodiment of a format of a TID-to-link mapping element.

A TID-to-link mapping element needs to indicate a TID-link pair, and thus the TID-to-link mapping element may have a configuration including a subfield indicating a TID and a subfield indicating a link. In this case, subfields indicating the TID and the link may be utilized to indicate a single TID and a single link, or may be utilized to indicate a TID set and a link set. In this case, a method for indicating a TID, a link, a TID set, and a link set may be similar to the TID indication method using an 8-bit size TIDs info field, described in an embodiment of FIG. 11.

That is, an 8-bit links info field may be utilized to indicate a link set, and each bit of the links info field may be utilized to indicate whether indicated TIDs correspond to links corresponding respective indices. For example, in a pair of a TIDs info field and a links info field included in a TID-to-link mapping element, when the TIDs info field is indicated as 1111 0000 and the links info field is indicated as 1100 0000, it may be understood that mapping between TIDs 0 to 3 to Link 1(0) or Link 2 (1) is proposed/counter-proposed.

Referring to part (a) of FIG. 15, a TID-to-link mapping element may have a configuration including multiple TID-to-link mapping info fields (see part (c) of FIG. 15). This means that mapping of a pair of multiple TIDs and links can be proposed/counter-proposed through a single TID-to-link mapping element. That is, the TID-to-link mapping element may include mapping information indicating each mapping relationship to indicate mapping between one or more TIDs and one or more links. In this case, multiple TIDs may be mapped to one link.

That is, the TID-to-link mapping element may indicate different TIDs and links in respective TID-to-link mapping info fields through multiple TID-to-link mapping info fields. However, within a single TID-to-link mapping element, a specific TID cannot be indicated by one or more TID-to-link mapping fields.

In other words, there may be a limit that each TID needs to be indicated only once (or once or less than once) within the TID-to-link mapping element. For example, when TID 0 is indicated in a TID info subfield of the first TID-to-link mapping info field of the TID-to-link mapping element, TID 0 should not be indicated by the remaining TID-to-link mapping info fields included in the corresponding element.

In this case, when TID 0 is indicated, it may mean that TID 0 is solely indicated, or a TID set (e.g., TIDs 0 to 3) including TID 0 is indicated.

As illustrated in FIG. 15, a format of the TID-to-link mapping element may vary according to the number of included TID-to-link mapping info fields. Accordingly, the TID-to-link mapping element may be configured to include a field for indicating information related to its length.

A TID-to-link mapping control field in part (a) of FIG. 15 may be indicated before the TID-to-link mapping info field, and may indicate information related to the lengths of TID-to-link mapping info fields. In this case, the information related to the lengths may be information related to the number of TID-to-link mapping info fields (part (c) of FIG. 15) and the length (size) of each TID-to-link mapping info field, included in the TID-to-link mapping info fields. That is, the information on the length may be information related to the number of one or more TIDs mapped to one or more links.

Referring to part (b) of FIG. 15, the TID-to-link mapping control field may be configured to include a TID-to-link mapping info size subfield and a link bitmap size subfield. The TID-to-link mapping info size subfield may indicate information related to the lengths of the TID-to-link mapping info fields included in the TID-to-link mapping element. For example, the TID-to-link mapping info size subfield may indicate the number of TID-to-link mapping info subfields included in the TID-to-link mapping element. Alternatively, the TID-to-link mapping info size subfield may indicate the sizes (octet unit, etc.) of the TID-to-link mapping info fields included in the TID-to-link mapping element.

The link bitmap size subfield may be utilized to indicate the size of the link info subfield included in each TID-to-link mapping info field. A reason that the link bitmap size subfield is needed is that the number of links of an MLD may be variable, unlike the number of TIDs is fixed (TIDs 0 to 7) as eight. Accordingly, the link bitmap size subfield may indicate a value related to the size of the link info subfield included in the TID-to-link mapping info field. For example, the link bitmap size subfield may be configured with four bits to indicate that the link info subfield has the size of 1-bit (link bitmap size=0000) to 16-bit (link bitmap size=1111). Alternatively, the link bitmap size subfield may be configured with 1 bit, one of the sizes of a pre-configured link info subfield may be indicated. For example, the link bitmap size subfield is indicated as 0 so that it is indicated that the size of the link info subfield is 8 bits, and the link bitmap size subfield is indicated as 1 so that it is indicated that the size of the link info subfield is 16 bits.

In addition, as described above, a TID-to-link mapping negotiation may be independently performed for DL and UL directions (see FIG. 11). Accordingly, a TID-to-link mapping negotiation performed between MLDs through the TID-to-link mapping element may be simultaneously performed for DL and UL directions. That is, information on the negotiation of DL TID-to-link mapping and UL TID-to-link mapping may be simultaneously indicated by a single TID-to-link mapping element. In consideration of this, TID-to-link mapping info fields may include both DL TID-to-link mapping info subfield(s) and UL TID-to-link mapping info field(s).

In addition, the TID-to-link mapping info size subfield may include two types of TID-to-link mapping info size subfields (DL TID-to-link mapping info size subfield and UL TID-to-link mapping info size subfield) to indicate information related to the size of the DL TID-to-link mapping info field(s) and the size of the UL TID-to-link mapping info fields(s), respectively. However, the information on the DL and the UL is not separately indicated in the TID-to-link mapping element, unidirectional TID-to-link mapping information applied to transmission or reception direction of the MLD having transmitted the request frame including the TID-to-link mapping element may be indicated.

Meanwhile, there may be a case where each TID is indicated more than once within the TID-to-link mapping element. For example, a TID set including TID 0 may be mapped to Link 1 in the first field of two TID-to-link mapping info fields included in the TID-to-link mapping element of the request frame, and another TID set including TID 0 may be mapped again to Link 2 in the second field of the two TID-to-link mapping info fields. In this case, the MLD (responding MLD) having received the same may interpret that TID 0 is mapped to both Link 1 indicated through the first TID-to-link mapping info field and Link 2 indicated through the second TID-to-link mapping info field. Accordingly, in this case, the responding MLD may map TID 0 to both Link 1 and Link 2 by responding with a response frame not including the TID-to-link mapping element, so as to complete the TID-to-link mapping negotiation.

<Method for Proposal/Acceptance/Rejection (Counter-Proposal) of TID-to-Link Mapping Negotiation>

As described above, a TID-to-link mapping negotiation may be performed between MLDs by using a TID-to-link element. An initiating MLD may indicate TID-to-link mapping to be proposed (preferred) by the initiating MLD itself by utilizing a TID-to-link mapping element included in a request frame (a TID-to-link mapping request frame or a (re)association request frame). A responding MLD may receive the request frame from the initiating MLD and determine whether to accept TID-to-link mapping indicated by the TID-to-link mapping element. The responding MLD and the initiating MLD may utilize a TID-to-link mapping request frame, a TID-to-link mapping response frame, a TID-to-link mapping teardown frame, etc. to perform the TID-to-link mapping negotiation.

The TID-to-link mapping req/resp/teardown frames may be frame formats corresponding to a TID-to-link mapping action frame. That is, a value indicating a TID-to-link mapping action frame may be indicated by a category field of an action field, and a value for distinguishing the TID-to-link mapping request frame, the TID-to-link mapping response frame, and the TID-to-link mapping teardown frame may be indicated by an action details field. For example, the TID-to-link mapping action frame may be indicated by a category value (e.g., 32) between 32 and 125, remaining as reserved in the 11 ax. In this case, the TID-to-link mapping req/resp/teardown frame may be indicated as 0, 1, and 2 in the immediately subsequent 1 octet of the category field, and distinguished. That is, when the category field value of the action frame is indicated as 32 and the immediately subsequent octet of the category field indicates 0 (0000 0000), the corresponding action frame may be a TID-to-link mapping request frame.

If the responding MLD rejects all or some of the TID-to-link mapping method proposed by the initiating MLD, the responding MLD may reject the TID-to-link mapping proposed by the initiating MLD, by responding with the TID-to-link mapping element included in the response frame (a TID-to-link mapping response frame and a (re)association response frame). That is, when the TID-to-link mapping element is included in the response frame and transmitted as a response, it may be understood that the TID-to-link mapping negotiation between the initiating MLD and the responding MLD has not be completed. In this case, the TID-to-link mapping info field included in the TID-to-link mapping element of the response frame may indicate TID-to-link mapping information counter-proposed to the initiating MLD by the responding MLD. For example, when the initiating MDL proposes (indicates/request) mapping between TID 0 and Link 1 (through the request frame) and the responding MLD indicates that TID 0 corresponds (is mapped) to Link 2 through the request frame, the initiating MLD may interpret that the responding MLD has (counter-) proposed mapping between TID 0 and Link 2.

In addition, the responding MLD may indicate (counter-propose) only some TID-to-link mapping only among TID-to-link mapping proposed (requested) by the initiating MLD, through the response frame, so as to accept a link mapping request (indicated (proposed) through the request frame) for a TID remaining after excluding the indicated TID. In other words, the TID-to-link mapping of the initiating MLD for the TID not indicated by the responding MLD through the response frame may be understood as being accepted by the responding MLD. Accordingly, after the initiating MLD indicates Link mapping for a specific TID through the TID-to-link mapping element of the request frame, when the specific TID is not indicated in the TID-to-link mapping element of the response frame, it should be interpreted that the link mapping request proposed for the specific TID has been accepted by the responding MLD.

As described above, the responding MLD may implicitly accept a TID-to-link mapping relationship requested (or proposed) by the initiating MLD through the request frame by not including mapping information relating to a mapping relationship for a TID in the TID-to-link mapping element included in the response frame. Similarly, the initiating MLD may implicitly propose a mapping relationship between some TIDs and links to the responding MLD by not including mapping information relating to a mapping relationship for some TIDs in the TID-to-link mapping element included in the request frame.

That is, when transmitting the request frame to configure TID-to-link mapping with the responding MLD, the initiating MLD may not include mapping information relating to some of multiple TIDs for mapping with the link in the TID-to-link mapping element of the request frame so as to implicitly indicate, to the responding MLD, a mapping relationship for some TIDs that are not included. In other words, when mapping information relating to a mapping relationship between a link and a specific TID is missing from the request frame, a mapping relationship between the link and the specific TIC may be implicitly indicated (or proposed).

In this case, the implicit proposal may include 1) the previous configured mapping relationship which has not been changed and remains valid, and 2) a TID-to-link mapping relationship corresponding to a default mapping relationship.

In this case, the default mapping relationship may be a mapping relationship in which all links are mapped to one TID.

Specifically, the implicit proposal may be proposal of mapping between a TID not indicated through the TID-to-link mapping element and all links. That is, when the initiating MLD does not indicate a specific TID through the TID-to-link mapping element included in the request frame, the specific TID may be (implicitly) indicated/requested to be mapped to all links.

Alternatively, the implicit proposal may be proposal of remaining, with respect to a TID not indicated through the TID-to-link mapping element, a link mapping state previously negotiated for the corresponding TID. That is, when the initiating MLD does not indicates a specific TID through the TID-to-link mapping element included in the request frame, the specific TID may be (implicitly) indicated/requested to remain the TID-to-link mapping state previously established before transmission of the request frame including the corresponding TID-to-link mapping element.

That is, when the TID-to-link mapping requested through the previously transmitted request frame is accepted for a specific TID, the initiating MLD may not indicate information on the specific TID in the request frame to be subsequently transmitted, so as to remain, valid, the link mapping state already accepted for the specific TID, without changing the state.

Alternatively, in a case of a TID-to-link mapping mode (including a default TID-to-link mapping mode) in which the negotiation has been already completed and a case where it is not desired to change a link mapping state for a specific TID, the initiating MLD may not indicate information on the specific TID in the request frame to remain a link mapping state for the specific TID.

In this case, the state of the TID-to-link mapping mode in which the negotiation has been completed may be a state in which the default TID-to-link mapping mode between two MLDs is applied after association, or a state in which the TID-to-link mapping response frame which has been most recently transmitted/received between the MLDs does not includes the TID-to-link mapping element.

Meanwhile, when the responding MLD accepts all TID-to-link mapping (explicitly/implicitly) by the initiating MLD, the responding MLD may respond with a TID-to-link mapping response frame not including the TID-to-link mapping element after receiving the TID-to-link mapping request frame from the initiating MLD. In other words, by not performing counter-proposal of TID-to-link mapping through the response frame, the responding MLD may accept the TID-to-link mapping indicated (or proposed) by the initiating MLD. When receiving the TID-to-link mapping response frame not including the TID-to-link mapping element from the responding MLD, the initiating MLD may identify that the TID-to-link mapping negotiation has been completed. In addition, it may be considered that the TID-to-link mapping accepted by the responding MLD is applied from a time point at which the TID-to-link mapping negotiation is completed.

The above-described method for proposal/acceptance/rejection (counter-proposal) of the TID-to-link mapping negotiation is applicable to each of TIDs of the DL and the UL, and is simultaneously applicable to all TIDs of the DL or the UL. For example, when the initiating MLD does not indicate a TID for the DL through the TID-to-link mapping element (when a DL TID-to-link mapping info size is indicated as 0), it may be considered that the initiating MLD has implicitly proposed that the TID-to-link mapping state for the DL will be maintained as the pre-negotiated state. Alternatively, the initiating MLD may have not indicated a TID for the DL to change the TID-to-link mapping state for the DL to a default TID-to-link mapping state.

That is, when the initiating MLD has indicated only a TID for the UL through the TID-to-link mapping element included in the request frame, the responding MLD may interpret that the initiating MLD desires to maintain the TID-to-link mapping state for the DL to be the same state as the existing state. Alternatively, the responding MLD may interpret that the initiating MLD has requested change of the TID-to-link mapping state for the DL to the default TID-to-link mapping state.

Similarly, when the responding MLD has not indicated all TIDs of the DL or the UL in the response frame (when a DL or UL TID-to-link mapping info size is 0), the initiating MLD may interpret that for the unindicated DL or UL, the TID-to-link mapping proposed by the initiating MLD has been all accepted.

As such, once a TID-to-link mapping negotiation procedure between the initiating MLD and the responding MLD has been completed, the two MLDs need to perform Link operation within a predetermined time according to the TID-to-link mapping state for which the negotiation has been completed. In other words, in a case where the TID-to-link mapping negotiation procedure is completed, the two MLDs may process only traffic corresponding to a TID mapped to a corresponding link and direction (DL/UL) when performing transmission.

In addition, when the TID-to-link mapping state operated between the two MLDs is released, that is, when switching to the default TID-to-link mapping mode is performed, the two MLDs need to process traffic for all TIDs through all links within a predetermined time. For example, an MLD having performed switching to the default TID-to-link mapping mode needs to maintain a state in which a BA frame response (immediate BA) for all TIDs can be performed through all links after the predetermined time. In this case, all TIDs may mean only TIDs for which a BA session is established between two MLDs. That is, when a TID-to-link mapping relationship is established, an MLD may transmit/receive a frame and a BA for the frame to/from a counterpart MLD through the established mapping relationship.

Figure 16:
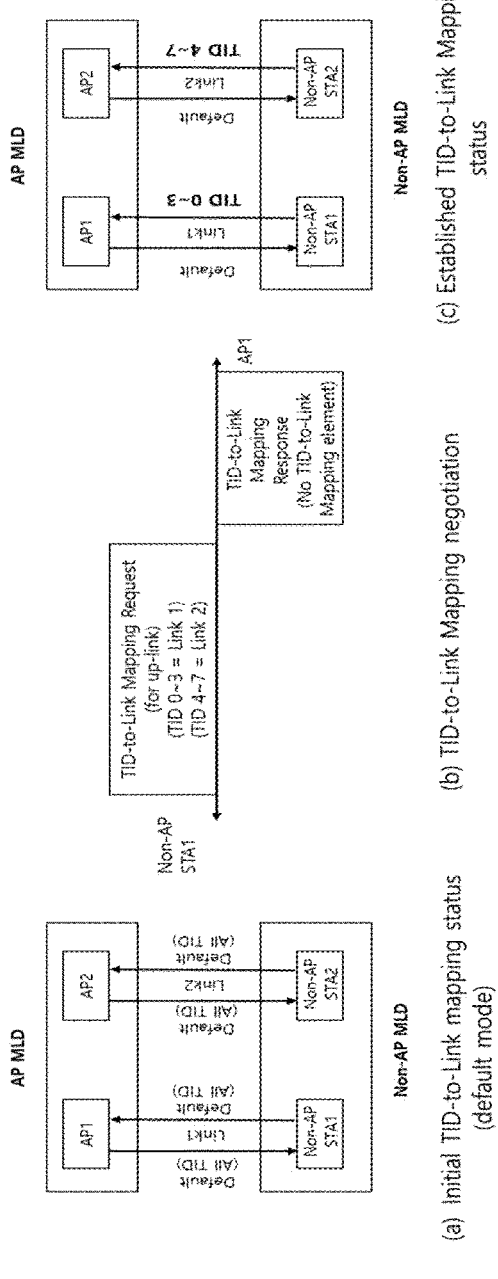
FIG. 16 illustrates a TID-to-link mapping procedure according to an embodiment of the present invention.

FIG. 16 illustrates a TID-to-link mapping procedure according to an embodiment of the present invention.

Referring to part (a) of FIG. 16, an AP MLD and a non-AP MLD maintain a default TID-to-link mapping state. The AP MLD and the non-AP MLD are associated through two links (Link1 and Link2), and all TIDs (TIDs 0 to 7, or including a TSID) are mapped to the two links.

As described in part (b) of FIG. 16, the non-AP MLD may transmit a TID-to-link mapping request frame to the AP MLD to perform a TID-to-link mapping negotiation with the AP MLD. In this case, the non-AP MLD may not indicate a TID of a DL, indicate mapping of UL TIDs 0 to 3 and Link 1, and indicate mapping of UL TIDs 4 to 7 and Link 2, through a request frame transmitted through STA1. In this case, the non-AP MLD may have indicated TIDs 0 to 3 in a TID info subfield of the first UL TID-to-link mapping info field, and Link 1 in a link info subfield of a corresponding UL TID-to-link mapping info field, so as to indicate mapping of TIDs 0 to 3 and Link 1. In this case, the non-AP MLD may have indicated TIDs 4 to 7 in a TID info subfield of the second UL TID-to-link mapping info field and Link 2 in a link info subfield of a corresponding UL TID-to-link mapping info field, so as to indicate mapping between TIDs 4 to 7 and Link 2.

After receiving a TID-to-link mapping request frame from STA1 of the non-AP MLD, the AP MLD may recognize, through the TID-to-link mapping element included in the received frame, that the non-AP MLD desires to maintain the default TID-to-link mapping state for a TID of the DL, and to map UL TIDs 0 to 3 to Link 1 and UL TIDs 4 to 7 to Link 2. When the AP MLD accepts the TID-to-link mapping indicated (requested) by the non-AP MLD, the AP MLD may respond with a TID-to-link mapping response frame not including the TID-to-link mapping element as described in part (b) of FIG. 16.

The non-AP MLD having received the TID-to-link mapping response frame not including the TID-to-link mapping element from the AP MLD may recognize that the TID-to-link mapping negotiation has been completed. Thereafter, the TID-to-link mapping state shown in part (c) of FIG. 16 is applied between the AP MLD and the non-AP MLD, and the non-AP MLD may perform UL transmission of traffic for TIDs 0 to 3 only through Link1, and perform UL transmission of only traffic for TIDs 4 and 7 through Link2.

Figure 17:
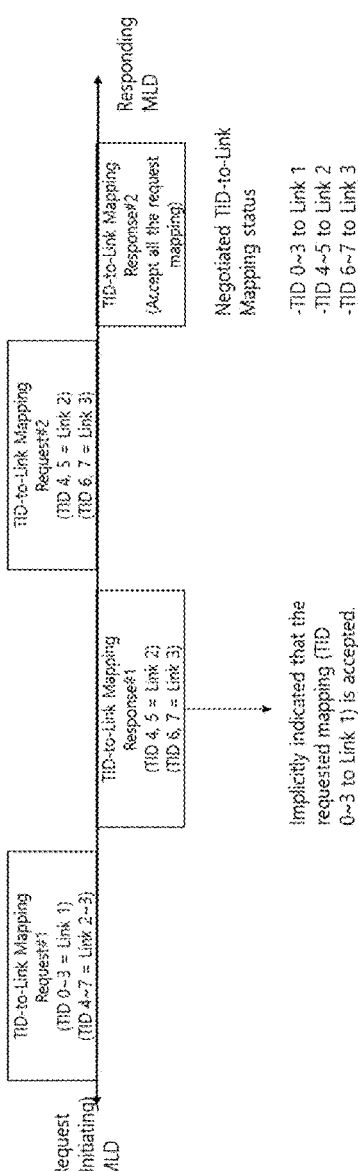
FIG. 17 illustrates an embodiment of selectively making a response for some TIDs by a responding MLD during TID-to-link mapping indicated (or proposed) by an initiating MLD.

FIG. 17 illustrates an embodiment of selectively making a response for some TIDs by a responding MLD during TID-to-link mapping indicated (or proposed) by an initiating MLD.

Referring to FIG. 17, the initiating MLD performs indication (proposal) through a TID-to-link mapping element to map TIDs 0 to 3 to Link 1 and map TIDs 4 to 7 to Link 2 through TID-to-link mapping request frame #1. In this case, the responding MLD accepts the proposal for the mapping of TIDs 0 to 3 to Link 1, made by the initiating MLD, but may reject the proposal for the mapping of TIDs 4 to 7 to Link 2.

In this case, the responding MLD may transmit TID-to-link mapping response frame #1 including a TID-to-link mapping element to the initiating MLD, as a response to TID-to-link mapping request frame #1 received from the initiating MLD. In this case, when configuring the TID-to-link mapping element, the responding MLD may indicate (counter-propose) mapping of TIDs 4 and 5 to Link 2 and mapping of TIDs 6 and 7 to Link 3, so as to indicate that the mapping of TIDs 0 to 3 to Link 1 has been accepted and the mapping of TIDs 4 to 7 to Link 3 has been rejected.

The initiating MLD having received TID-to-link mapping response frame #1 as a response from the responding MLD may re-configure TID-to-link mapping request frame2 in consideration of a TID-to-link mapping state (TIDs 4 and 5=Link 2 and TIDs 6 and 7=Link 3) indicated by the responding MLD through TID-to-link mapping response frame #1. In this case, the initiating MLD may transmit TID-to-link mapping request frame #2 which indicates mapping of TIDs 4 and 5 to Link 2 and mapping of TIDs 6 and 7 to Link 3 through the TID-to-link mapping element in consideration of the TID-to-link mapping state counter-proposed by the responding MLD. The responding MLD may terminate the TID-to-link mapping negotiation by responding with TID-to-link mapping response frame #2 not including the TID-to-link mapping element, so as to accept the TID-to-link mapping state indicated by TID-to-link mapping request frame #2 received from the initiating MLD.

In this case, the TID-to-link mapping state established (negotiated) between the initiating MLD and the responding MLD may be a state in which a TID-to-link mapping state (TIDs 0-3=Link 1) accepted through TID-to-link mapping response frame #1 and a TID-to-link mapping state (TIDs 4-5=Link 2 and TIDs 6-7=Link 3) accepted through TID-to-link mapping response frame #2 are integrated. If the initiating MLD has indicated (proposed) again, through TID-to-link mapping request frame #2, a specific TID (link mapping for a specific ID) accepted through TID-to-link mapping request frame #1, a link mapping state of the specific TID, finally established (negotiated) through TID-to-link mapping response frame #2 not including the TID-to-link mapping element, may be a link mapping state of the specific TID, indicated through TID-to-link mapping request frame #2.

<Restriction on TID-to-Link Mapping Negotiation>

An MLD may or may not support a TID-to-link mapping negotiation according to a capability. For example, MLDs having dot11TIDtoLinkMappingActivated not indicated as true may be MLDs not supporting the TID-to-link mapping negotiation. Accordingly, the initiating MLD may need to identify whether the responding MLD supports the TID-to-link mapping negotiation, before initiating the TID-to-link mapping negotiation. That is, the initiating MLD needs to transmit a TID-to-link mapping request frame only to an MLD having dot11TIDtoLinkMappingActivated indicated as true.

In addition, even for an MLD supporting the TID-to-link mapping negotiation, there may be restriction on the number of link sets supporting TID-to-link mapping for each MLD. For example, an MLD supporting four links which can distinguish and manage TIDs through TID-to-link mapping may not be able to support the TID-to-link mapping negotiation for more than four links. Accordingly, when configuring a TID-to-link mapping request frame for the TID-to-link mapping negotiation, the initiating MLD needs to configure a request frame in consideration of the number of link sets supported by the responding MLD. In addition, the initiating MLD may attempt a TID-to-link mapping negotiation for two directions including DL and UL, and thus when configuring the TID-to-link mapping request frame, the initiating MLD needs to consider not only the number of link sets supported by the responding MLD but also the number of link sets which can be supported by the initiating MLD itself.

Similarly, when (counter-)proposing TID-to-link mapping by transmitting a TID-to-link mapping response frame after receiving the TID-to-link mapping request frame from the initiating MLD, the responding MLD also needs to configure a response frame in consideration of both the number of link sets which can be supported by the responding MLD itself and the number of link sets which can be supported by the initiating MLD.

Accordingly, to perform the TID-to-link mapping negotiation between MLDs, the MLDs need to recognize the number of link sets which can be supported, and to this end, a TID-to-link mapping negotiation supported subfield may be indicated in an EHT MAC capabilities information field. The TID-to-link mapping negotiation supported subfield may indicate a value related to a maximum number of link sets which can be managed by an MLD itself through the TID-to-link mapping negotiation. If a specific MLD does not support a TID-to-link mapping negotiation at all (dot11TIDtoLinkMappingActivated=false), the specific MLD may need to indicate the TID-to-link mapping negotiation supported subfield as 0. On the other hand, an MLD which can manage four link sets through TID-to-link mapping may need to indicate a value indicating 4 through the TID-to-link mapping negotiation supported subfield.

To sum up, when each MLD proposes/counter-proposes a TID-to-link mapping state to a counterpart MLD through a TID-to-link mapping request/response frame transmitted by each MLD itself, each MLD needs to perform TID-to-link mapping in consideration of a maximum number of link sets which can be supported by each MLD itself and a maximum number of link sets of the counterpart MLD, identified through the TID-to-link mapping supported subfield. That is, the initiating MLD transmitting the request frame should not (explicitly/implicitly) indicate link sets exceeding min(the number of link sets supported by the initiating MLD itself, the number of link sets supported by the responding MLD) through the TID-to-link mapping element of the request frame. Similarly, the responding MLD transmitting the response frame should not (explicitly/implicitly) indicate (counter-propose) link sets exceeding min(the number of link sets supported by the responding MLD itself, the number of link sets supported by the initiating MLD) through the TID-to-link mapping element of the response frame.

In addition, when TID-to-link mapping for a specific TID has been rejected (or counter-proposed) by the responding MLD, the initiating MLD should not request again link mapping identical to the rejected link mapping for a predetermined time. In this case, the predetermined time may be a value determined by a parameter indicated by the AP MLD. In this case, the predetermined time may be a time taken until an unsolicited response frame is received from the responding MLD. In this case, the predetermined time may mean a lifetime.

For example, when the initiating MLD has received an indication (counter-proposal) of mapping of TID 0 to Link 2 from the responding MLD after indicating (proposing/requesting) mapping of TID 0 to Link 1 through the TID-to-link mapping request frame, the initiating MLD should not request mapping of TID 0 to Link 1 for a predetermined time (or a pre-configured time or a time indicated by the AP MLD). This restriction is for preventing a frequency resource from being wasted and a network from being complex due to repeated TID-to-link mapping request/response frame exchanges. However, the proposal of mapping of TID 0 to Link 3 has never been rejected, the initiating MLD may make a new request for mapping of TID 0 to Link 3, without following the proposal from the responding MLD.

<Simple TID-to-Link Mapping Negotiation Procedure>

In the above-described TID-to-link mapping negotiation procedure, mapping between TIDs and links is proposed by the initiating MLD, and the responding MLD may accept or reject the mapping state proposed by the initiating MLD. In this case, for the TID-to-link mapping state proposed by the initiating MLD, the responding MLD may accept proposal only for some TIDs, and reject proposal for the remaining TIDs. In this case, the responding MLD may indicate (counter-propose) a preferred link mapping state for the TID for which the proposal is rejected. A time point at which the TID-to-link mapping negotiation between the initiating MLD and the responding MLD is completed is limited to a time point at which the responding MLD responds with a TID-to-link mapping response frame not including the TID-to-link mapping element.

In consideration of such a TID-to-link mapping negotiation procedure, even though the initiating MLD having received counter-proposal of the TID-to-link mapping state from the responding MLD accepts the (counter-)proposal of the responding MLD, inefficiency that the TID-to-link mapping request frame needs to be transmitted again is caused. That is, to accept to TID-to-link mapping counter-proposed by the responding MLD, the initiating MLD needs to transmit again the TID-to-link mapping request frame indicating the counter-proposed TID-to-link mapping state through the TID-to-link mapping element. Similarly, the responding MLD receives again proposal of the same TID-to-link mapping as the mapping counter-proposed by the responding MLD itself, and responds again with the TID-to-link mapping response frame not including the TID-to-link mapping element, so as to complete the TID-to-link mapping negotiation procedure. In this case, an exact time point at which the TID-to-link mapping negotiation procedure is completed may be a time point at which Ack responding to the TID-to-link mapping response frame is performed.

As such, even though the initiating MLD has intention to follow the TID-to-link mapping state counter-proposed by the responding MLD, if the initiating MLD needs to transmit the request frame again and the responding MLD needs to also respond again with the responds frame, the retransmitted request frame and response frame may correspond to a TID-to-link mapping negotiation causing unnecessary overhead.

Accordingly, a TID-to-link mapping negotiation in which the initiating MLD accepts the TID-to-link mapping state (counter-)proposed by the responding MLD may be considered. That is, after the initiating MLD transmits a TID-to-link mapping request frame, when a TID-to-link mapping response frame transmitted by the responding MLD is received as a response and includes a TID-to-link mapping element, the initiating MLD may accept a TID-to-link mapping state indicated through the TID-to-link mapping element. In this case, after receiving the TID-to-link mapping response frame from the responding MLD, the initiating MLD may not include a TID-to-link mapping element in the transmitted TID-to-link mapping request frame, or may not indicate a specific TID through the TID-to-link mapping element, so as to (implicitly) accept the (counter-)proposal on the specific TID, made by the responding MLD. Such a TID-to-link mapping request frame responding method of the initiating MLD is similar to the TID-to-link amping response frame responding method of the responding MLD, and thus a detailed description thereof is omitted. In this case, the initiating MLD may transmit a TID-to-link mapping response frame (not including the TID-to-link mapping element) rather than the TID-to-link mapping request frame, to accept the TID-to-link mapping state proposed by the responding MLD.

However, when the initiating MLD has transmitted a TID-to-link mapping request frame not including the TID-to-link mapping element, the TID-to-link mapping negotiation procedure may be completed at a time point at which the responding MLD responds with an Ack frame for the TID-to-link mapping request frame. That is, when the TID-to-link mapping request frame not including the TID-to-link mapping element is received, the responding MLD may complete the TID-to-link mapping negotiation procedure by responding with the Ack frame.

Figure 18:
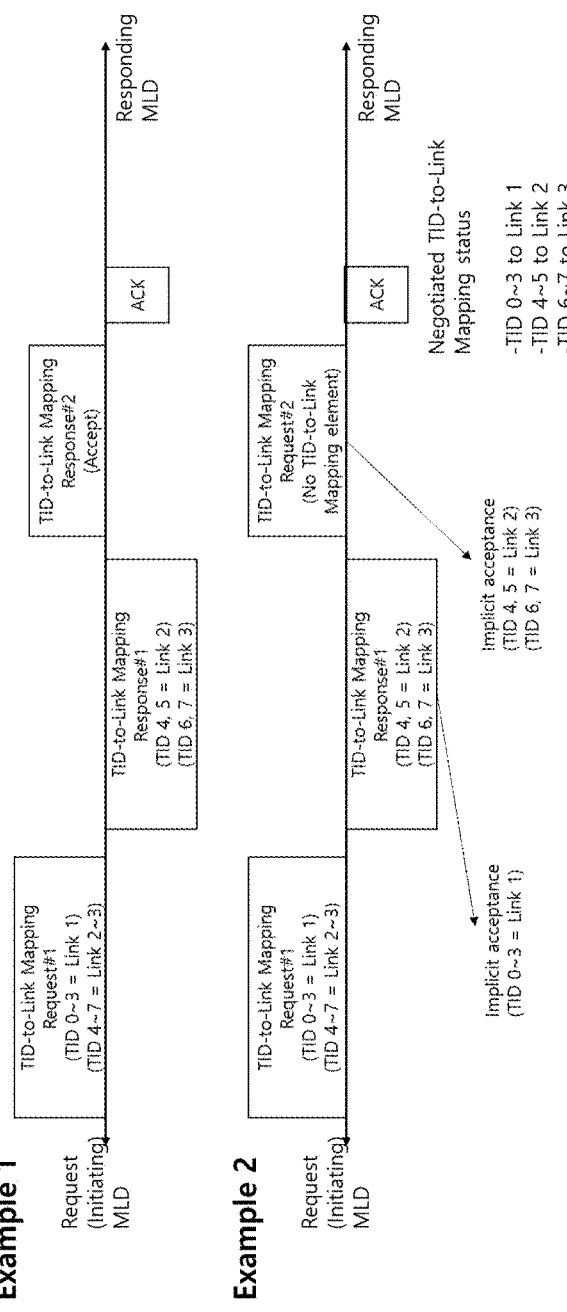
FIG. 18 illustrates a responding method of an initiating MLD accepting (approving) TID-to-link mapping counter-proposed by a responding MLD.

FIG. 18 illustrates a responding method of an initiating MLD accepting (approving) TID-to-link mapping counter-proposed by a responding MLD.

Referring to FIG. 18, to initiate a TID-to-link mapping negotiation procedure, the initiating MLD may transmit TID-to-link mapping request frame #1 to the responding MLD, and the responding MLD may perform (counter-)proposal while rejecting link mapping for TIDs 4 to 7 by responding with response frame #1. In this case, the initiating MLD may determine to accept a TID-to-link mapping state indicated through by the responding MLD through TID-to-link mapping request frame #1, and request to complete TID-to-link mapping from the responding MLD.

In Example 1 in FIG. 18, after receiving TID-to-link mapping request frame #1, the initiating MLD may transmit TID-to-link mapping response frame #2 to complete a TID-to-link mapping procedure. Precisely, TID-to-link mapping response frame #2 transmitted by the initiating MLD may be an unrequested (unsolicited) response frame. In this case, TID-to-link mapping response frame #2 transmitted by the initiating MLD has a configuration not including a TID-to-link mapping element, and the responding MLD having received TID-to-link mapping response frame #2 from the initiating MLD may recognize that the initiating MLD desires to accept the TID-to-link mapping state (counter-)proposed by the responding MLD and complete the TID-to-link mapping procedure. Accordingly, after receiving TID-to-link mapping request frame #2, the responding MLD may complete the TID-to-link mapping negotiation procedure with the initiating MLD by responding with an Ack frame.

In Example 2 in FIG. 18, after receiving TID-to-link mapping request frame #1, the initiating MLD may transmit TID-to-link mapping request frame #2 to complete a TID-to-link mapping procedure. In this case, TID-to-link mapping request frame #2 transmitted by the initiating MLD has a configuration not including a TID-to-link mapping element, and the responding MLD having received TID-to-link mapping request frame #2 from the initiating MLD may recognize that the initiating MLD desires to accept the TID-to-link mapping (counter-)proposed by the responding MLD and complete the TID-to-link mapping procedure. Accordingly, after receiving TID-to-link mapping request frame #2, the responding MLD may complete the TID-to-link mapping negotiation procedure with the initiating MLD by responding with an Ack frame or a TID-to-link mapping response frame not including a TID-to-link mapping element.

<Utilization of Unsolicited TID-to-Link Mapping Response Frame>

In general, a TID-to-link mapping negotiation procedure performed between MLDs starts by a TID-to-link mapping request frame transmitted by an initiating MLD. Such a general TID-to-link mapping negotiation is performed between the initiating MLD and a responding MLD, and a request/response frame exchanged between the two MLDs may be an individually addressed frame.

However, an AP MLD needs to perform a TID-to-link mapping negotiation with various non-AP MLDs of a BSS, and thus performing an individual TID-to-link mapping negotiation with all non-AP MLDs may cause large overhead. Accordingly, the AP MLD may inform the non-AP MLDs of a TID-to-link mapping configuration preferred by the AP MLD itself by transmitting a non-individually addressed TID-to-link mapping response frame. When the AP MLD informs the non-AP MLDs of a TID-to-link mapping state preferred by the AP MLD itself, it is advantageous in that the non-AP MLDs may know the TID-to-link mapping configuration preferred by the AP MLD corresponding to a responding MLD when starting the TID-to-link mapping negotiation procedure. That is, at a time point at which a non-AP MLD, as an initiating MLD, transmits a TID-to-link mapping request frame, the non-AP MLD may operate by already knowing the preference of the responding MLD, and thus the TID-to-link mapping negotiation procedure can be performed much easier.

An unsolicited TID-to-link mapping response frame transmitted by the AP MLD may have a different TID-to-link mapping element configuration from the general TID-to-link mapping request/response frame. More specifically, the unsolicited TID-to-link mapping response frame transmitted by the AP MLD may indicate the same TID more than one time through a TID-to-link mapping element. For example, TIDs 0 and 1 may be indicated to correspond (map) to Links 1 and 2 through a specific (DL/UL) TID-to-link mapping info field included in a TID-to-link mapping element, and TIDs 0 to 4 may be indicated to correspond to Links 1 to 3 through another (DL/UL) TID-to-link mapping info field.

Accordingly, when non-AP MLDs having received the unsolicited TID-to-link mapping response frame from the AP MLD have the purpose of differentiating links for TIDs 0 and 1 from links for TIDs 2 and 3, the non-AP MLDs may make a selection such as setting up Link 1 and/or Link 2 for TIDs 0 and 1, and setting up Link 3 for TIDs 3 and 4. That is, the AP MLD may transmit a TID-to-link mapping element to a beacon frame transmitted by the AP MLD itself, so as to assist the non-AP MLDs in selecting a setup link from an association stage. More specifically, the non-AP MLD may identify the TID-to-link mapping state preferred by the AP MLD through the beacon frame, so as to select a link according to a TID separation method desired by the non-AP MLD itself and perform the setup.

Figure 19:
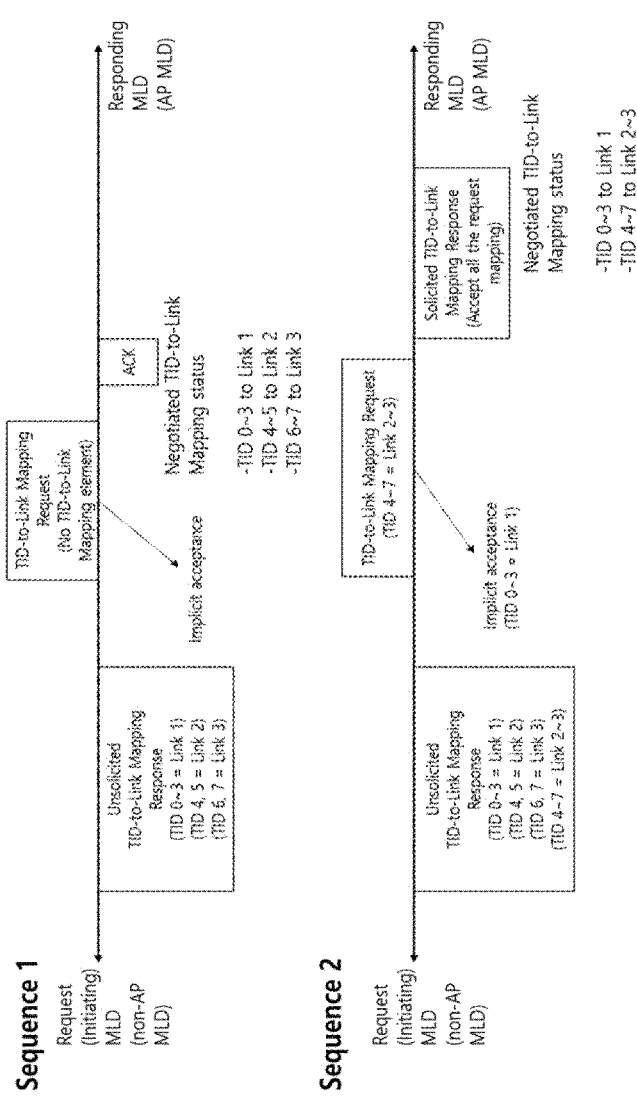
FIG. 19 illustrates an embodiment of an unsolicited TID-to-link mapping response frame transmitted from an AP MLD, and a TID-to-link mapping negotiation process between the AP MLD and a non-AP MLD.

FIG. 19 illustrates an embodiment of an unsolicited TID-to-link mapping response frame transmitted from an AP MLD, and a TID-to-link mapping negotiation process between the AP MLD and a non-AP MLD.

Referring to FIG. 19, the AP MLD may transmit an unsolicited TID-to-link mapping response frame. In this case, the unsolicited TID-to-link mapping response frame may be transmitted as a non-individually addressed frame. That is, the unsolicited TID-to-link mapping response frame transmitted by the AP MLD may consider one or more non-AP MLDs as destination devices.

As illustrated in FIG. 19, the AP MLD may indicate, through the unsolicited TID-to-link mapping request frame, that the AP MLD desires to map TIDs 0 to 3 to Link 1, TIDs 4 and 5 to Link 2, and TIDs 6 and 7 to Link 3.

The non-AP MLD (initiating MLD) having received the frame may transmit a TID-to-link mapping request frame not including a TID-to-link mapping element, as shown in Sequence 1 in FIG. 19, so as to indicate, to the AP MLD (responding MLD), that the non-AP MLD desires to accept TID-to-link mapping indicated through the unsolicited response frame and perform and complete the TID-to-link mapping negotiation. The AP MLD may receive the TID-to-link mapping request frame not including the TID-to-link mapping element, and then respond with an Ack frame indicating that the TID-to-link mapping negotiation has been completed.

In a case of Sequence 2, the non-AP MLD (initiating MLD) may identify that there are two link mapping options for TIDs 4 to 7 among the TID-to-link mapping indicated by the AP MLD (responding MLD) through the unsolicited TID-to-link mapping response frame. In this case, the non-AP MLD may select an option of mapping TIDs 4 to 7 to Links 2 and 3 and transmit the TID-to-link mapping request frame to the AP MLD. In this case, the non-AP MLD does not indicate TIDs 0 to 3 through the TID-to-link mapping element of the request frame, and thus it may be interpreted that the non-AP MLD has accepted the link mapping proposal (indicated through the unsolicited TID-to-link mapping response frame) of the AP MLD for TIDs 0 to 3.

<Releasing of TID-to-Link Mapping>

A TID-to-link mapping negotiation made between two MLDs may be released when one of the two MLDs transmits a TID-to-link mapping teardown frame and the other MLD performs an Ack response. When the TID-to-link mapping negotiation made between the two MLDs is released through the TID-to-link mapping teardown frame, the two MLDs may need to operate in a default TID-to-link mapping mode. That is, switching to the same state as a state in which traffic of all TIDs for the DL and the UL is mapped to all links may be performed.

In consideration of the above-described TID-to-link mapping negotiation method of the present invention, when configuring a TID-to-link mapping request frame, the initiating MLD may indicate, through a TID-to-link mapping info field of a TID-to-link mapping element, all TIDs and all links, and may thus also identify that switching to a default TID-to-link mapping mode is possible. More specifically, when a TID info subfield is indicated as 1111 1111 (8-bit embodiment) and a link info subfield is indicated as 1111 1111 (8-bit embodiment) through a DL TID-to-link mapping info field included in the TID-to-link mapping element, DL TID-to-link mapping may be indicated as a default mode.

Alternatively, as in the above-described embodiment of the present invention, when a DL TID-to-link mapping info size of a TID-to-link mapping element is indicated as 0, an MLD having received the same may recognize that a counterpart MLD indicates (proposes) a default TID-to-link mapping mode for a DL direction. Accordingly, when the initiating MLD indicates both a DL TID-to-link mapping info size subfield and a UL TID-to-link mapping info size subfield as 0 through the TID-to-link mapping request frame, the responding MLD may recognize that the initiating MLD indicates (proposes) a default TID-to-link mapping mode. Similarly, when the responding MLD indicates DL/UL TID-to-link mapping info size fields as 0 through the TID-to-link mapping response frame, the initiating MLD may recognize that the responding MLD indicates (counter-proposes) a default TID-to-link mapping mode.

As such, a reason why a TID-to-link mapping teardown frame is required even though switching to the default TID-to-link mapping mode through the TID-to-link mapping request frame and the TID-to-link mapping response frame is possible is that a TID-to-link mapping negotiation releasing process may be completed according to an intention (resolution) of a specific MLD, instead of a negotiation between two MLDs. That is, when a specific MLD of two MLDs desires to operate in a default TID-to-link mapping mode, a counterpart MLD may need to mandatorily switch to the default TID-to-link mapping mode according to a request from the specific MLD. Accordingly, when the specific MLD transmits a TID-to-link mapping teardown frame, the counterpart MLD cannot perform counter-proposal using a TID-to-link mapping response frame, and should accept the switching to the default TID-to-link mapping mode. In this case, the counterpart MLD may need to respond with an Ack frame or a TID-to-link mapping response frame not including the TID-to-link mapping element to indicate the acceptance.

In this case, the specific MLD and the counter-part MLD should operate each link in the default TID-to-link mapping mode within a predetermined time after agreeing on the switching to the default TID-to-link mapping mode. That is, the two MLDs having switched to the default TID-to-link mapping mode through the TID-to-link mapping teardown frame need to operate in (switched to) a state in which transmission/reception, BlockAck (BA) response, etc. for all TIDs through all links can be performed, within the predetermined time. In this case, the predetermined time may be a time pre-configured by the EHT standard or BSS, or a time pre-promised between the two MLDs performing TID-to-link mapping.

For the purpose of operation, the AP MLD may simultaneously release TID-to-link mapping modes negotiated with multiple associated non-AP MLDs and switch to a default TID-to-link mapping mode. In this case, the AP MLD may transmit a non-individually addressed TID-to-link mapping teardown frame, instead of individually transmitting a TID-to-link mapping teardown frame to all associated non-AP MLDs. In this case, the AP MLD may transmit the TID-tolink mapping teardown frame as a group addressed frame after transmitting a DTIM beacon frame. In the process of receiving the group addressed frame after receiving the DTIM beacon frame, the non-AP MLDs may receive the TID-to-link mapping teardown frame and recognize that the TID-to-link mapping mode negotiated with the AP MLD has been switched to the default TID-to-link mapping mode.

In this case, the non-AP MLDs having received the TID-to-link mapping teardown frame as the group addressed frame using the DTIM beacon frame may need to switch to the default TID-to-link mapping mode without performing responding using the Ack or the TID-to-link mapping response frame. That is, the TID-to-link mapping teardown frame transmitted to the multiple non-AP MLDs by the AP MLD 5 may be applicable without identification (Ack, TID-to-link mapping response, etc.) of the responding MLD (non-AP MLDs). This may be because it is considered that the TID-to-link mapping teardown frame transmitted after the DTIM may have been well received by the responding MLDs even though there is no separate response.

<Another Embodiment of TID-to-Link Mapping Element>

A TID-to-link mapping element is an simple element having a function of indicating a pair of a TID and a link, and thus various formats may be considered. In the above-described embodiment in FIG. 15, a TID-to-link mapping element format having a structure in which one or more TID sets can be mapped to one or more link sets is considered, and other functionally identical element formats can be configured in various ways.

Figure 20:
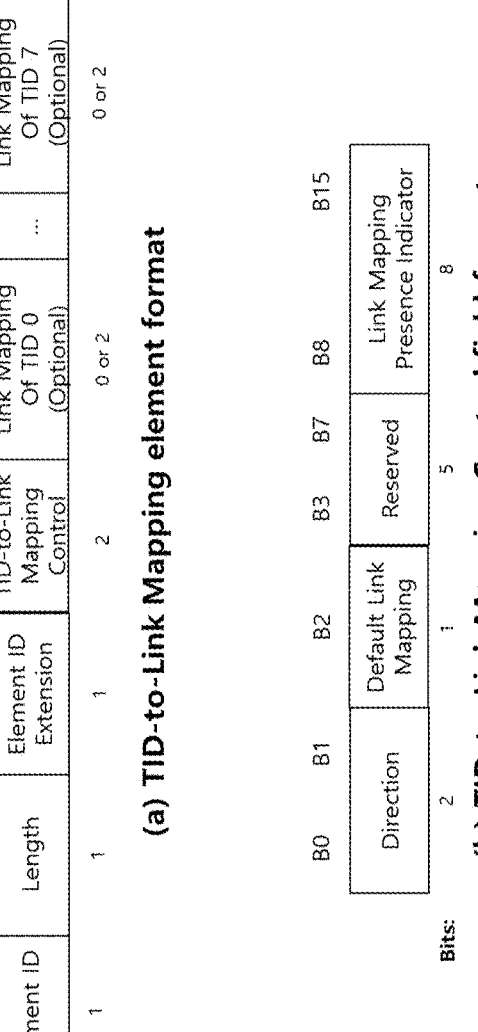
FIG. 20 illustrates another embodiment of a TID-to-link mapping element.

FIG. 20 illustrates another embodiment of a TID-to-link mapping element.

Referring to part (a) of FIG. 20, a TID-to-link mapping element may include element ID, length, element ID extension, TID-to-link mapping control, link mapping of TID 0-7 fields. The element ID, length, and element ID extension fields indicate information indicating that a corresponding element is a TID-to-link mapping element and information related to the length of the element, and have the same usage as a field included in other elements, and thus a detailed description thereof is omitted.

A link mapping of TID 0-7 field includes two octets (16 bits), and each bit may correspond to a link ID of each link. In this case, each bit of the link mapping of TID field corresponds to a link ID having a value smaller than the bit order by one. More specifically, the first bit of the link mapping of TID field may correspond to a link having a link ID corresponding to 0 (1-1), the second bit of the link mapping of TID field may correspond to a link having a link ID corresponding to 1 (2-1), the 11th bit of the link mapping of TID field may correspond to a link corresponding to 9 (10-1).

That is, when the link mapping of TID "n" field is indicated as 1100 0000 0000 0000 in the TID-to-link mapping element of the TID-to-link mapping request, a request has been made so that TID "n" is mapped to a link corresponding to Link ID 0 or 1.

Referring to part (b) of FIG. 20, the TID-to-link mapping control field may include direction, default link mapping, and link mapping presence indicator subfields.

The direction subfield indicates information related to directivity of information included in the TID-to-link mapping element. More specifically, the direction subfield indicates whether the TID-to-link mapping element is for UL TID-to-link mapping, DL TID-to-link mapping, or UL/DL (bidirectional) TID-to-link mapping. For example, the direction subfield may be configured as 0/1/2 to indicate that the corresponding TID-to-link mapping element includes DL/UL/bidirectional TID-to-link mapping information. In this case, another value 3 indicated by the direction subfield (2-bit) may be reserved.

The default link mapping subfield may be a subfield indicating that a TID-to-link mapping mode proposed through a corresponding TID-to-link mapping element is a default mode (mapping of all TIDs to all setup links). For example, a device for transmitting the TID-to-link mapping element may configure the default link mapping subfield as 1 to propose (counter-propose) a default mapping mode.

That is, when the default link mapping subfield of the TID-to-link mapping element for which DL direction information is indicated through the direction subfield is indicated as 1, it may be considered that the DL TID-to-link mapping is proposed as a default mode.

On the other hand, when the default link mapping subfield of the TID-to-link mapping element for which UL direction information is indicated through the direction subfield is indicated as 1, it may be considered that the UL TID-to-link mapping is proposed as a default mode.

Alternatively, when the default link mapping subfield of the TID-to-link mapping element for which directional information is indicated through the direction subfield is indicated as 1, it may be considered that the bidirectional (DL/UL) TID-to-link mapping is proposed as a default mode.

As described above, the TID-to-link mapping element may include UL/DL/bidirectional TID-to-link mapping information, and accordingly, a TID-to-link mapping request frame and a (solicited or unsolicited) TID-to-link mapping response frame including one or two TID-to-link mapping elements may be transmitted. However, the TID-to-link mapping (request or response) frame including two TID-to-link mapping elements may have direction subfields (TID-to-link mapping control fields) of the two TID-to-link mapping elements configured as 0 and 1, respectively. That is, it is not allowed that two TID-to-link mapping element direction subfields included in a single TID-to-link mapping frame is all configured as 0 or 1. In addition, when a TID-to-link element having a direction subfield configured as 2 is included in the TID-to-link mapping frame, another TID-to-link element cannot be additionally included.

In this case, when the DL TID-to-link mapping is in a default mode, it may mean a state in which all TIDs are mapped to all setup links for the DL direction. In this case, when the UL TID-to-link mapping is in a default mode, it may mean a state in which all TIDs are mapped to all setup links for the UL direction. In this case, when the bidirectional TID-to-link mapping is in a default mode, it may mean a state in which all TIDs are mapped to all setup links for both DL and UL directions.

A default TID-to-link mapping mode means that all TIDs are mapped to all setup links for both DL and UL directions between MLDs, but a default TID-to-link mapping state for the DL direction or the UL direction may be separately defined.

Moreover, a default TID-to-link mapping state may be defined for each TID and each link. More specifically, a state in which a specific TID is mapped to all setup links may be understood that the specific TID is in a default (TID-to-link) mapping state. Similarly, a state in which all TIDs are mapped to a specific link may be understood that the specific link is in a default (TID-to-link) mapping state.

For example, when a specific TID of the DL direction is in a default mapping mode (state), it may mean a state in which traffic of the specific TID to be transmitted in the DL direction is mapped to (is transmittable through) all setup links. In another example, when a specific TID of the UL direction is in a default mapping mode (state), it may mean a state in which all traffic of the UL direction is mapped to the specific link.

However, the default link mapping mode of the TID-to-link mapping control field may be utilized for minimum DL or UL default mapping mode establishment, instead of being utilized for default mapping mode establishment for each TID and each link.

Alternatively, the default link mapping mode of the TID-to-link mapping control field may be utilized to switch the TID-to-link mapping mode between two MLDs to a default mode. That is, to switch to the bidirectional default TID-to-link mapping mode, the default link mapping subfield may be indicated as 1, and accordingly, the default link mapping subfield may be configured as 1 only when the direction subfield is configured as 2.

The link mapping presence indicator subfield includes 8 bits, and may indicate whether the link mapping of TID field (of the TID-to-link mapping element) for each TID is included in the TID-to-link mapping element. More specifically, when the $i^{th}$ bit of the link mapping presence indicator subfield is indicated as 1, it means that a link mapping of (i) subfield for TID I is included in the TID-to-link mapping element. When the default link mapping subfield of the TID-to-link mapping element is configured as 1, the link mapping presence indicator subfield included in the corresponding TID-to-link mapping element may be reserved, and all bits may need to be configured as 0.

For example, when the link mapping presence indicator subfield is indicated as 1100 1000, link mapping of TID subfields for TID 0, TID 1, and TID 4 (i.e., a link mapping of TID 0 subfield, a link mapping of TID 1 subfield, and a link mapping of TID 4 subfield) may be sequentially included in the TID-to-link mapping element.

In this case, for a specific TID (a TID for the direction indicated through the direction subfield), when a separate link mapping of TID subfield is not included in the TID-to-link mapping element having the default link mapping subfield indicated as 0, it may be implicitly indicated from a device having transmitted the TID-to-link mapping element that a current link mapping state for the specific TID will remain. That is, in the above-described embodiment, a link mapping state for TIDs 2 and 3 and TIDs 5 to 7 may remain the same as the previous link mapping state without any change even though a negotiation is performed by (a request frame including) the corresponding TID-to-link mapping element.

That is, a TID-to-link mapping requesting MLD may transmit a TID-to-link mapping element not including a link mapping of TID subfield for a specific TID to request (propose) to maintain a link mapping state already established for the specific TID. In this case, when there is no separate link mapping established for the specific TID, the specific TID may maintain the default link mapping state (mapping to all setup links). In this case, the TID-to-link mapping requesting MLD may mean an MLD for transmitting a TID-to-link mapping request frame or a (re)association request frame including the TID-to-link mapping element.

In addition, an MLD (responding MLD) for transmitting an unsolicited TID-to-link mapping response frame may transmit a TID-to-link mapping element not including a link mapping of TID field for a specific TID to indicate (counter-propose) to a counterpart MLD that the maintaining a link mapping state already established for the specific TID is preferred.

That is, the MLD may transmit the unsolicited TID-to-link mapping response frame to indicate a TID-to-link mapping relationship preferred by the MLD before the counterpart MLD transmits a request frame for a TID-to-link mapping relationship configuration. In this case, when the MLD does not include, in the unsolicited TID-to-link mapping response frame, mapping information related to a mapping relationship between one or more TIDs and one or more links, a preferred mapping relationship between one or more TIDs and one or more links may be implicitly indicated.

In this case, the implicitly indicated mapping relationship may be one of 1) the existing mapping relationship remaining valid without change, 2) no mapping relationship specially preferred, and 3) a default mapping relationship.

First, in a case where it is implicitly indicated that remaining the existing mapping relationship valid without change is preferred, by not including mapping information related to a mapping relationship in the unsolicited TID-to-link mapping response frame by the MLD, when there is no separate link mapping established for a specific TID, the counterpart MLD may interpret that a default mapping relationship (mapping to all setup links) is preferred for one or more TIDs. In this case, the unsolicited TID-to-link mapping response frame may be an (individually addressed) unsolicited TID-to-link mapping response frame transmitted to the counterpart MLD (requesting MLD or peer MLD) corresponding to a destination device by the responding MLD.

Second, when it is implicitly indicated that there is no specially preferred mapping relationship, by not including mapping information related to a mapping relationship in the unsolicited TID-to-link mapping response frame by the MLD, there is no mapping relationship specially preferred by the MLD, and thus the MLD cannot reject, but should allow a TID-to-link mapping relationship requested by the counterpart MLD through a request frame. That is, there is no TID-to-link mapping relationship preferred by the MLD, and thus when a TID-to-link mapping relationship is requested by the counterpart MLD through the request frame, the MLD should not reject but accept the same through a response frame.

Third, when it is implicitly indicated that a default mapping relationship is preferred, by not including mapping information related to a mapping relationship in the unsolicited TID-to-link mapping response by the MLD, it is indicated that the default mapping state is preferred in a mapping relationship with a link for one or more TIDs, and thus unlike the second case above, the MLD may reject a requested mapping relationship through a response frame even though the counterpart MLD requests a mapping relationship with the link for one or more TIDs through a request frame.

However, when the counterpart MLD needs to request the preferred mapping relationship indicated through the unsolicited TID-to-link mapping response frame transmitted from the MLD in the same manner, the MLD cannot reject, but may need to accept the requested mapping relationship. That is, when a requesting MLD corresponding to the counterpart MLD transmits a TID-to-link mapping request frame including the same TID-to-link mapping element as the TID-to-link mapping element transmitted by a responding MLD corresponding to the MLD, the responding MLD may need to mandatorily accept proposed (or requested) TID-to-link mapping.

The above-described method for interpreting the TID-to-link mapping relationship is applicable to a case where a preferred TID-to-link mapping relationship is indicated through mapping information by a (re)association response frame or a TID-to-link mapping response frame, in addition to a case where a preferred TID-to-link mapping relationship is indicated through mapping information by an unsolicited TID-to-link mapping response frame.

That is, when a TID-to-link mapping relationship requested through a request frame such as an association request frame or a TID-to-link mapping request frame is not allowed and the TID-to-link mapping relationship is rejected or counter-proposed through a (re)association response frame or a TID-to-link mapping response frame, a preferred TID-to-link mapping relationship indicated by the (re)association response frame or the TID-to-link mapping response frame may be interpreted through one of the three methods described above.

Specifically, as described above, the MLD may receive, from the counterpart MLD, a request for a TID-to-link mapping relationship configuration through mapping information included in a TID-to-link mapping element of a request frame (for example, an association request frame, a TID-to-link mapping request frame, or the like). In this case, the MLD may allow the TID-to-link mapping relationship requested through the request frame, but may also reject the same. If the MLD reject the TID-to-link mapping relationship requested through the request frame, the MLD may reject the requested mapping relationship through a response frame (for example, a (re)association response frame, a TID-to-link mapping response frame, or the like).

In this case, the MLD may transmit, to the counterpart MLD, the TID-to-link mapping relationship preferred to the MLD through a response frame by including the same in the TID-to-link mapping element, while rejecting the requested mapping relationship through the response frame. In this case, when a mapping relationship with a link for some or all TIDs is not included in the mapping information of the preferred mapping relationship, the unincluded TID-to-link mapping relationship may be implicitly indicated as described above. The implicitly indicated mapping relationship may be one of 1) the existing mapping relationship remaining valid without change, 2) no mapping relationship specially preferred, and 3) a default mapping relationship, and a specific interpretation method may be the same as the description above.

Thereafter, the counterpart MLD may recognize a mapping relationship preferred by the MLD, through the response frame, and transmit a request frame again to the MLD on the basis of the recognized mapping relationship.

As another embodiment of the present invention, in a case where the MLD rejects the requested TID-to-link mapping link through the response frame, when the MLD includes mapping information of the preferred TID-to-link mapping relationship in the TID-to-link mapping element through the response frame, a mapping relationship with a link for all TIDs may be explicitly included. In this case, the mapping relationship with the link for all TIDs is explicitly indicated through the mapping information, and thus an implicit interpretation method for the TID-to-link mapping relationship is not applied.

As another embodiment, a TID-to-link mapping element may be configured to not only indicate TID-to-link mapping for a specific direction (UL or DL) as default, but also include TID-to-link mapping proposal/indication information for a direction (DL direction when the specific direction is UL, and UL direction when the specific direction is DL) other than the specific direction. More specifically, when a direction subfield of a specific TID-to-link mapping element is indicated (for the DL direction) as 0 and a default link mapping subfield is indicated as 1, the specific TID-to-link mapping element may be included in a TID-to-link mapping request frame to perform a function of requesting DL TID-to-link mapping as default mapping. Simultaneously, the specific TID-to-link mapping element may have a configuration in which the TID-to-link mapping element includes one or more link mapping of TID fields, and in this case, the one or more link mapping of TID fields may have been included to request TID-to-link mapping for the UL direction (a direction opposite from the DL, indicated through a direction subfield).

That is, when the TID-to-link mapping element requesting/indicating the TID-to-link mapping for a specific direction as default mapping includes a link mapping of TID field, the link mapping of TID field may include information requesting TID-to-link mapping for a direction opposite from the direction for which the default mapping is requested. In this case, a link mapping response indicator subfield of the TID-to-link mapping element may indicate information related to information on a TID, indicated by (one or more) link mapping of TID fields of the opposite direction. That is, even though the TID-to-link mapping for a specific direction is requested/indicated as default, the link mapping presence indicator subfield may not be reserved. Accordingly, when the default link mapping subfield in the received TID-to-link mapping element is indicated as 1 and the link mapping presence indicator subfield of the corresponding TID-to-link mapping element is not all 0, the MLD may recognize that a link mapping of TID field for a direction opposite from the direction indicated through the direction subfield is indicated.

<TID-to-Link Mapping Proposal Rule in Consideration of Link Setup>

As described above, a requesting MLD (initiating MLD) may transmit a TID-to-link mapping request frame to a responding MLD (responding MLD) to establish TID-to-link mapping, and the responding MLD may accept TID-to-link mapping proposed by a requesting STA, in response to a TID-to-link mapping response frame.

In a case where the TID-to-link mapping is established/negotiated between two MLDs, when transmitting traffic corresponding to a specific TID, the two MLDs need to perform transmission using only a link to which the specific TID is mapped.

In a case where TID-to-link mapping is established between two MLDs, if a specific TID is only mapped to a link which not set up between the two MLDs, limitation that the specific TID needs to perform transmission only through the link which is not set up is applied and the transmission cannot be performed. This means that TID mapping with the link which is not set up (not associated) is not valid, and accordingly, MLDs which desire to establish a TID-to-link mapping negotiation may need to attempt TID mapping only for a link that are set up between the MLDs.

To this end, an MLD transmitting a TID-to-link mapping request frame to a counterpart MLD may need to request TID mapping only for a link that is set up with the counterpart MLD. That is, for a link that is not set up, mapping of any TID should not be requested.

Accordingly, when indicating a link to be mapped for a specific TID, a requesting MLD may need to perform a TID-to-link mapping request by always configuring bits corresponding to IDs of a link for which setup is not performed as 0.

Similarly, an MLD (responding MLD) indicating (suggesting) preferred TID-to-link mapping to the requesting MLD may need to perform a TID-to-link mapping response by always configuring bits corresponding to a link for which setup is not performed as 0. That is, for a link that is not set up, mapping of any TID should not be proposed.

Accordingly, when proposing a link to be mapped for a specific TID, the responding MLD may need to perform a (solicited or unsolicited) TID-to-link mapping response by always configuring bits corresponding to IDs of a link for which setup is not performed as 0. In this case, the unsolicited TID-to-link mapping response may mean that a specific MLD transmits a TID-to-link mapping response frame to a counterpart MLD to propose TID-to-link mapping proposal preferred by the specific MLD itself (to make preferred TID-to-link mapping suggestion).

To sum up, the MLD transmitting the TID-to-link mapping element needs to always configure a bit (of a TID-to-link mapping element) of a link ID corresponding to a link that is not set up with the counterpart MLD as 0. That is, in the TID-to-link mapping element transmitted/received between two MLDs, a link ID of a link for which setup is not established between the two MLDs needs to be always configured as 0.

However, an MLD transmitting a TID-to-link mapping element by including the same in a (re)association requests frame may need to request TID mapping only for a link for which the MLD requests setup from a counterpart MLD. That is, the MLD transmitting the TID-to-link mapping element by including the same in the (re)association request frame needs to always configure a bit (of a TID-to-link mapping element) of a link ID corresponding to a link for which the MLD has not requested setup from the counterpart MLD as 0.

Similarly, an MLD transmitting the TID-to-link mapping element by including the same in the (re)association response frame may need to indicate (suggest) preferred TID mapping only for a link for which setup is accepted. That is, the MLD transmitting the TID-to-link mapping element by including the same in the (re)association response frame needs to always configure a bit (of a TID-to-link mapping element) of a link ID corresponding to a link for which setup with the counterpart MLD is not accepted as 0.

In this case, a maximum index of an ID of a link for which setup can be established between MLDs is limited to 14 (the link IDs are used to distinguish a maximum of 15 links by utilizing link IDs 0 to 14), and thus the 16th bit (i.e., a bit corresponding to link ID 15) of the link mapping of TID field needs to be always configured as 0.

<Method for Efficiently Configuring Link Mapping of TID Field>

Referring to the above-described embodiment of the present invention, a TID-to-link mapping element transmitted/received between MLDs may have a configuration in which some of bits of a link mapping of TID field are always configured as 0.

In a situation in which there are only two links set up between two MLDs performing a TID-to-link mapping negotiation, 14 bits (13 bits corresponding to a link ID of a link that is not set up+$16^{th}$ bit) among 16 bits of the link mapping TID field may be bits always indicated as 0. When bits which can be only indicated as 0 are repeatedly indicated in the TID-to-link mapping element, an overhead problem may be caused, and thus more efficient link mapping of TID field configuration can be considered.

According to an embodiment of the present invention, the size of each link mapping of TID field included in a TID-to-link mapping element may be determined on the basis of the number of links set up between MLDs transmitting/receiving the TID-to-link mapping element.

For example, when a requesting MLD and a responding MLD are set up through three links, a TID-to-link mapping element transmitted/received by the requesting MLD and the responding MLD may include a 3-bit link mapping of TID field.

According to an embodiment of the present invention, a link (link ID) corresponding to each bit of a link mapping of TID field included in a TID-to-link mapping element may be determined on the basis of an ID of a link set up between MLDs transmitting/receiving the TID-to-link mapping element. In this case, the link corresponding to the link mapping of TID field may correspond to each bit in ascending order of a link ID.

For example, when a requesting MLD and a responding MLD are set up through three links (link ID 0, link ID 3, and link ID 10), 3 bits of a link mapping of TID field of a TID-to-link mapping element transmitted/received by the requesting MLD and the responding MLD may correspond to link ID 0, link ID 3, and link ID 10, respectively. That is, when 3 bits of a link mapping of TID field for a specific TID is indicated as 010, it may be interpreted that the specific TID is requested/indicated to be mapped to a link corresponding to link ID 3.

That is, an MLD transmitting/receiving a TID-to-link mapping element after performing multi-link (re)setup determines (selects and recognizes) the size of a link mapping of TID field on the basis of the number of links set up with a counterpart MLD (peer MLD).

That is, an MLD transmitting/receiving a TID-to-link mapping element after 5 performing multi-link (re)setup determines a link corresponding to each bit of a link mapping of TID field in consideration of an ID of a link set up with a counterpart MLD (peer MLD).

In addition, according to an embodiment of the present invention, when a link mapping of TID field having a variable length is utilized, a padding field for maintaining the length of the TID-to-link mapping element in units of multiple octets may be included in the TID-to-link mapping element. In this case, the padding field may be included after the link mapping of TID fields, and may have the size less than 1 octet.

Figure 21:
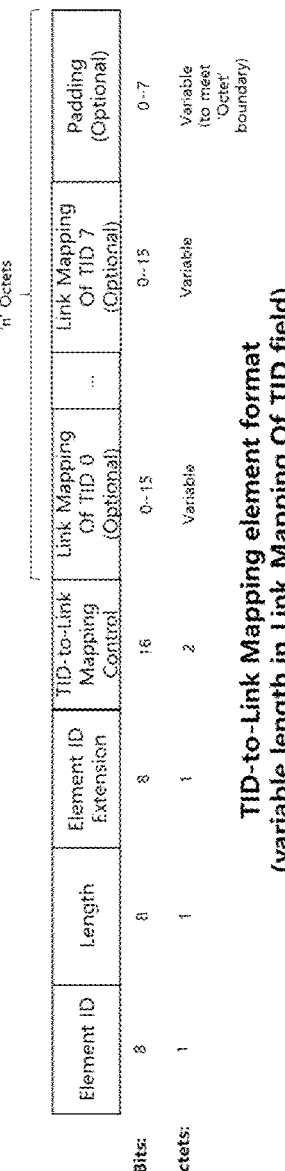
FIG. 21 illustrates an embodiment of a TID-to-link mapping element including a link mapping of TID field having a variable length.

FIG. 21 illustrates an embodiment of a TID-to-link mapping element including a link mapping of TID field having a variable length.

Referring to FIG. 21, a TID-to-link mapping element may have a configuration including a padding field and a link mapping of TID field having a variable length.

The link mapping of TID field is a field, the size of which is determined on the basis of the number of links set up between MLDs transmitting/receiving (a frame including) a TID-to-link mapping element. That is, when there are three links set up between MLDs transmitting/receiving a TID-to-link mapping element, each link mapping of TID field has a 3-bit size, and when there are five links set up, each link mapping of TID field may have a 5-bit size.

When a link mapping of TID field has a 3-bit size and link mapping of TID fields for three TIDs are included in a TID-to-link mapping element, the link mapping of TID fields may have a size of a total of 9 bits. In this case, a 7-bit padding field may be included in the TID-to-link mapping element so that the size of the link mapping of TID fields+ the size of the padding field may be configured as 2 octets.

In addition, each bit of the link mapping of TID field corresponds to a link for which setup is performed. For example, in a TID-to-link mapping element transmitted/ received between two MLDs for which ML setup has been performed through link ID 0, link ID 3, and link ID 7, a link mapping of TID field may have a 3-bit size, the first bit of each link mapping of TID field may correspond to link ID 0, 0 the second bit may correspond to link ID 3, and the third bit may correspond to link ID 7. That is, when a bit corresponding to link ID 3 of a link mapping TID field for a specific TID (link mapping of TID "specific TID" field) is indicated as 1, the specific TID may be requested (proposed) to be mapped to a link having a link ID corresponding to 3.

<Management of TID-to-Link Mapping (Re)Setup>

An AP MLD and a non-AP MLD may change a configuration of a setup link by performing (re)setup. That is, the AP MLD and the non-AP MLD may perform re-setup to add a setup link or release the setup of a link. In this case, the re-setup performed between the AP MLD and the non-AP MLD may be performed through a (re)association request/ response frame exchange. When the re-setup is performed between two MLDs, TID mapping management related to a setup link added or deleted through the re-setup needs to be performed. For convenience of description, the following embodiments of the present invention does not mention the directivity (UL or DL) of TID-to-link mapping. However, all TID-to-link mapping has directivity, and thus it should be understood that description of a specific direction or bi-direction is all provided even though a TID-to-link mapping direction is not separately mentioned.

First, when a setup link is added through re-setup, the added setup link may be set up as a state in which all TIDs are mapped (a default TID mapping state of a link).

This may be a TID mapping state of an additional setup link, applied when a (re)association request frame exchanged for re-setup is not included in a TID-to-link mapping element.

However, when a setup link is added through the (re) association request frame including the TID-to-link mapping element, the added setup link may be mapped to a TID on the basis of information indicated by the TID-to-link mapping element. In this case, the method for determining a TID mapped to the added setup link is not different from the above-described TID-to-link mapping negotiation procedure, and thus a detail description thereof is omitted.

Next, when a link that is set up is deleted through the re-setup (when setup release is performed), the state of a TID mapped to the deleted link may change to a default mapping state. More specifically, the state of TIDs mapped to a link, the setup of which has been released through the re-setup, may change to a state of mapping to all setup links (except for the released link) after the re-setup (i.e., a default link mapping state of a TID). This may be a TID-to-link mapping management method which is considered to prevent changing to a state in which a specific TID is not mapped to any setup link due to releasing of the setup for the specific TID through the re-setup in a state where the specific TID is mapped to a specific link.

However, when a TID mapped to a specific link for which setup is released through the re-setup is also mapped to another setup link (is in a setup state after the re-setup), the specific TID may not be switched to a state of being mapped to all setup links even though the setup of the specific link is released.

In addition, when the (re)association request frame exchanged for re-setup includes a TID-to-link mapping element, TIDs mapped to a link for which the setup is released may be mapped to another setup link on the basis of information indicated by the TID-to-link mapping element.

That is, after MLDs perform the re-setup, when a specific TID is in a state in which the specific TID is not explicitly mapped to any setup link, the specific TID may be changed (configured) to be in a state of being mapped to all setup link (a default link mapping state of a TID).

Alternatively, MLDs may change (configure), according to a pre-promised scheme, the specific TID (a TID which becomes not to be mapped to any setup link) to be in a state of being mapped to a specific setup link. In this case, the pre-promised scheme may include various methods such as changing mapping to a set uplink having the lowest link ID index, or changing mapping to a link (except for the released link) that is most recently set up.

Exceptionally, setup of another link is released while a specific link is additionally set up through re-setup (that is, when there is no change in the number of setup links and only link IDs of the setup links are changed), TIDs mapped to the link for which the setup is released may be automatically mapped to the additionally set-up link. This may be understood as TID-to-link mapping transition limitedly applied when the (re)association request frame exchanged during the re-setup is not included in the TID-to-link mapping element. In this case, the similar TID-to-link mapping transition may be applied when there are one or more links additionally added through re-setup, and there are one or more links for which setup is released. For example, when two setup links are released and one link is added (set up) through the re-setup, TIDs mapped to the released two links may be automatically mapped to the one added link. In another example, when one setup link is released and two links are added (set up) through the re-setup, TIDs mapped to the one released setup link may be automatically mapped to both of the two added links. In another example, when two setup links are released and two links are added (set up) through the re-setup, TIDs (a sum of TIDs mapped to two links) mapped to the two released setup link may be automatically mapped to both of the two added links, respectively.

Alternatively, for simple management of TID-to-link mapping, MLDs having deleted a setup link through re-setup may need to switch to a default TID-to-link mapping mode (all TIDs to all setup links) in which all TIDs are mapped to all setup links. In this case, a condition for the MLDs having deleted the link through the re-setup to switch to the default TID-to-link mapping mode may be limited to a case where the (re)association request frame exchanged for the re-setup is a request frame not including the TID-to-link mapping element. That is, when a new TID-to-link mapping negotiation is not performed (completed) together with the re-setup, MLDs having deleted the setup link through the re-setup may need to switch to the default TID-to-link mapping mode. In this case, the switching to the default TID-to-link mapping mode for the MLDs may be releasing of TID-to-link mapping established between the MLDs (teardown of negotiated TID-to-link mapping). Alternatively, the switching to the default TID-to-link mapping mode for the MLDs may be considering that there has been no TID-to-link mapping negotiated between the MLDs.

Accordingly, when the (re)association request frame transmitted to delete the setup link through the re-setup does not include the TID-to-link mapping element, the similar/ same function as in a case where the (re)association request frame includes a teardown element may be performed.

Alternatively, when two MLDs having negotiated TID-to-link mapping (in this case, a default mode is excluded) releases a setup link through re-setup, the MLDs may be forced to mandatorily perform a new TID-to-link mapping negotiation through the (re)association request/response frame. That is, a requesting MLD which desires to release a setup link through re-setup with an MLD having negotiated TID-to-link mapping may need to mandatorily include the (re)association request frame in the TID-to-link mapping element.

In addition, when accepting re-setup for releasing a setup link, a responding MLD (AP MLD) performing re-setup with an MLD having negotiated TID-to-link mapping may need to respond with the (Re)association response frame not including the TID-to-link mapping element. That is, when accepting the re-setup for releasing the setup link, the responding MLD (AP MLD) may need to mandatorily accept a TID-to-link mapping request that is requested together.

Figure 22:
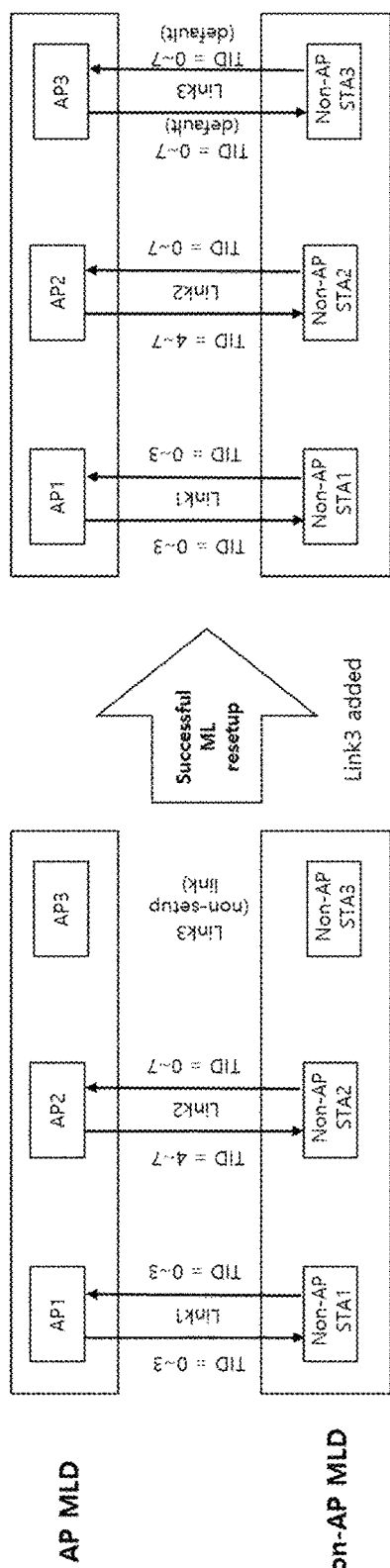
FIG. 22 illustrates an embodiment of a TID-to-link mapping management method for two MLDs to which a setup link is added through re-setup.

FIG. 22 illustrates an embodiment of a TID-to-link mapping management method for two MLDs to which a setup link is added through re-setup.

Referring to FIG. 22, an AP MLD and a non-AP MLD may have performed ML setup through Link1 and Link2. In addition, the AP MLD and the non-AP MLD may be in a state in which the AP MLD and the non-AP MLD have performed TID-to-link mapping negotiation for mapping of TIDs 0 to 3 to Link1 and mapping of TIDs 4 to 7 to Link2.

The AP MLD and the non-AP MLD may perform ML setup through three links by additionally setting up Link3, and to this end, the non-AP MLD may perform re-setup through a (re)association request frame. When additional setup for Link3 is accepted by the AP MLD, the AP MLD and the non-AP MLD are changed to a ML setup state through Link1 to Link3.

When the AP MLD and the non-AP MLD perform the TID-to-link mapping negotiation for Link1 and Link2, Link3 is not a setup link, and thus there is not pre-established negotiated TID mapping state. Accordingly, for Link3 newly set up through the re-setup, setup is completed in a default TID mapping state (a state in which all TIDs are mapped) for bi-direction (UL and DL).

If the non-AP MLD includes the TID-to-link mapping element in the (re)association request frame for re-setup and the included TID-to-link mapping element requests a separate TID-to-link mapping request for Link3, Link3 may be set up as a state other than the default TID mapping state.

Figure 23:
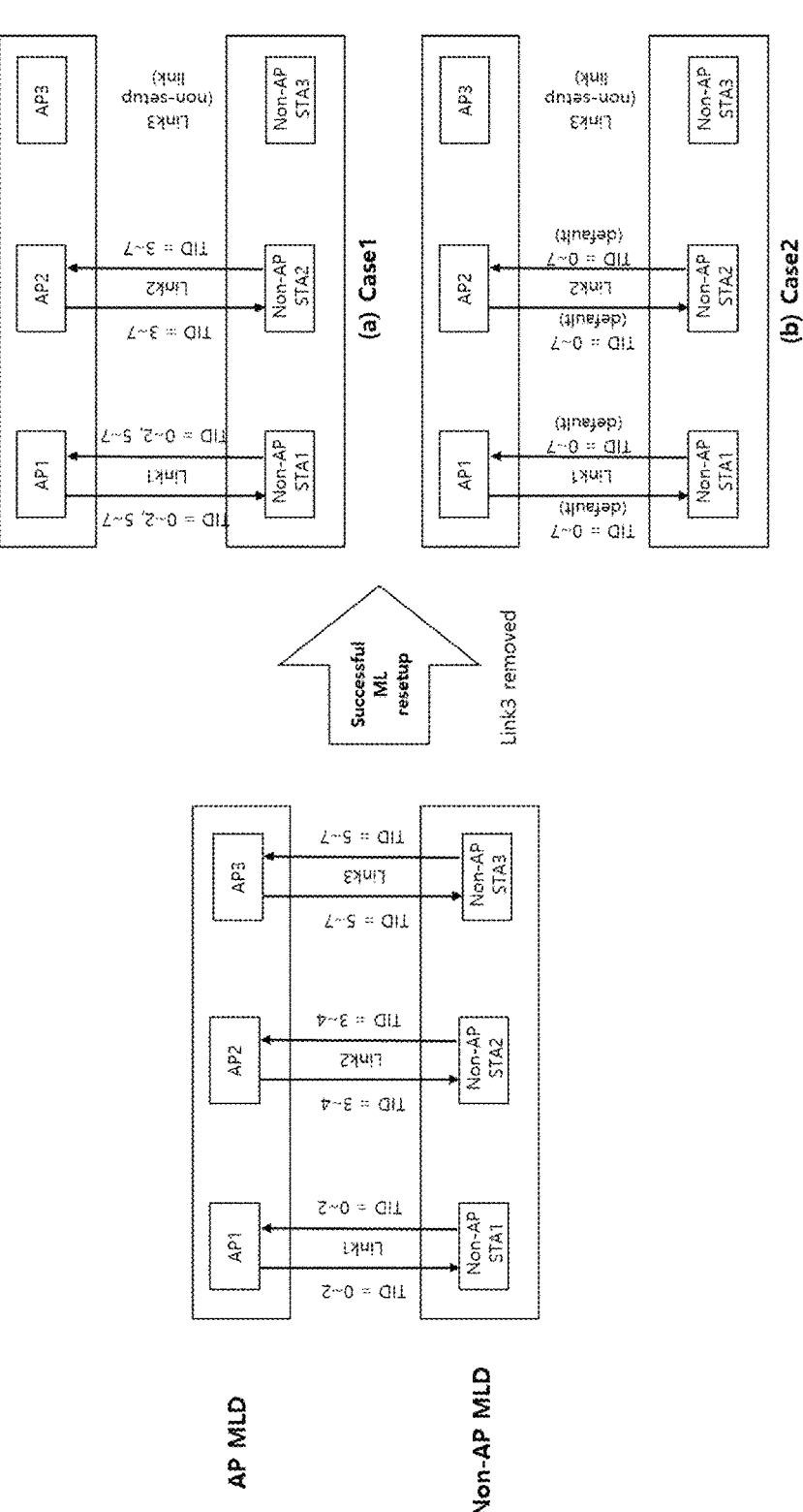
FIG. 23 illustrates an embodiment of a TID-to-link mapping management method for two MLDs for a link for which setup is released through re-setup.

FIG. 23 illustrates an embodiment of a TID-to-link mapping management method for two MLDs for a link for which setup is released through re-setup.

Referring to FIG. 23, an AP MLD and a non-AP MLD have established ML setup through initial three links. In addition, the AP MLD and the non-AP MLD perform TID-to-link mapping negotiation for Link1 to Link 3 so that for the bi-direction, Link1 is mapped to TIDs 0 to 2, Link2 is mapped to TIDs 3 and 4, and Link3 is mapped to TIDs 5 and 7. The non-AP MLD may transmit a (re)association request frame to the AP MLD to change the ML setup, maintain links of Link1 and Link2 only, and release a setup link of Link3. After receiving the (re)association request frame, the AP MLD may recognize that links having requested association are only Link1 and Link2, respond with a (re)association response frame, and accept to maintain setup for Link1 and Link2 and release setup for Link3. In this case, the re-setup procedure between the AP MLD and the non-AP MLD may be successfully performed and the setup for Link3, established between the AP MLD and the non-AP MLD, may be released.

When the setup link is released between the AP MLD and the non-AP MLD, a TID mapped to a link (Link3 of FIG. 23)

for which setup is released may be changed to a state in which the TID is not mapped to any setup link.

Accordingly, as in Case 1 in part(a) of FIG. 23, the AP MLD and the non-AP MLD may automatically map TIDs 5 to 7 mapped to Link3 to links for which setup is maintained. In Case 1 in part (a), even though Link 3 is released (re-setup is completed), Link1 and Link2 still remain as setup links, and thus TIDs 5 to 7 mapped to Link3 are automatically mapped to Link1 and Link2.

Alternatively, as in Case 2 in part (b) of FIG. 23, as negotiated TID-to-link mapping is released when the re-setup procedure in which Link3 is released is completed, the AP MLD and the non-AP MLD may switch to a default TID-to-link mapping mode. That is, two MLDs may perform TID-to-link mapping management similar to a case where a TID-to-link mapping teardown frame is exchanged after re-setup.

Figure 24:
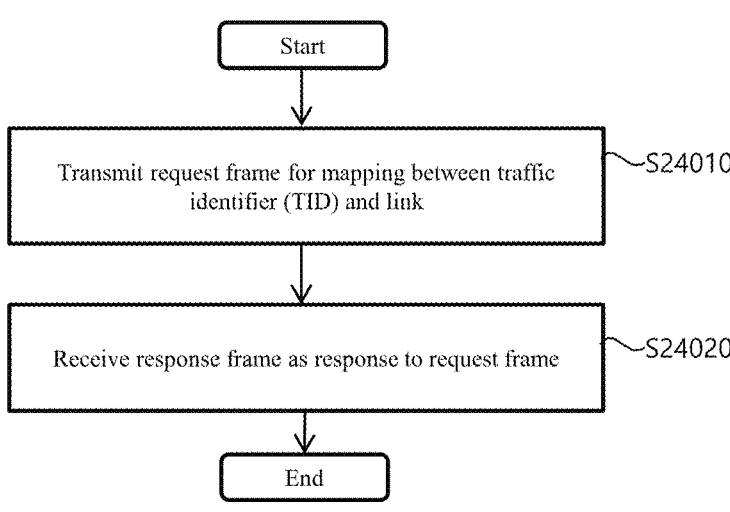
FIG. 24 is a flow chart illustrating an example of a method for mapping a TID and a link according to the present invention.

FIG. 24 is a flow chart illustrating an example of a method for mapping a TID and a link according to the present invention.

Referring to FIG. 24, an MLD corresponding to a device having one or more STAs corresponding to logical entities affiliated therewith may perform mapping of one or more TIDs and more or more links with a counterpart MLD. Hereinafter, the MLD may refer to an AP MLD or a non-AP MLD.

Specifically, the MLD may transmit a request frame for mapping between a traffic identifier (TID) and a link to the counterpart MLD (S24010). In this case, the request frame may include first mapping information for configuration of a mapping relationship between at least one of multiple TIDs and at least one link, and information related to the number of the at least one TIDs which needs to be mapped to the at least one link.

Before transmitting the request frame, the MLD may receive, from the counterpart MLD, a frame including second mapping information for configuration of a mapping relationship for one or more of multiple TIDs and one or more links. That is, the MLD may receive, from the counterpart MLD, an unsolicited TID-to-link mapping response frame including the second mapping information for a preferred mapping relationship for one or more TIDs and one or more links.

In this case, as described above, for a second remaining TID after excluding the one or more TIDs from the multiple TIDs, a specific preferred mapping relationship may be implicitly indicated or it may be implicitly indicated that there is no preferred mapping relationship.

The specific preferred mapping relationship corresponds to the an originally configured mapping relationship or the default mapping relationship, and when the specific mapping relationship is the default mapping relationship or there is no preferred mapping relationship, a mapping relationship for an overlapping TID among the at least one TID and the second remaining TID may not be indicated by the response frame.

Thereafter, the MLD may receive a response frame from the counterpart MLD, as a response to the request frame (S24020).

In this case, for first remaining TIDs after excluding the at least one TID of the multiple TIDs, a mapping relationship previously configured with a link may be maintained as valid, or a default mapping relationship may be applied, and for the first remaining TIDs, a mapping relationship with a specific link may not be indicated by the first mapping information.

One of the at least one link may be mapped with one or more TIDs among the at least one TID, and the default mapping relationship may mean a state in which TIDs are mapped with all links.

In addition, the default mapping relationship may be applied when the default mapping relationship is configured for the first remaining TIDs before the transmission of the request frame.

The request frame may further include transmission direction information indicating a transmission direction of the at least one TID, and the multiple TIDs may be only mapped with a link for which a configuration between the MLD and a counterpart MLD having transmitted the request frame is completed.

In addition, the response frame may indicate whether to allow the mapping relationship between the at least one TID of the multiple TIDs and the at least one link.

In addition, when the mapping relationship between the at least one TID of the multiple TIDs and the at least one link is allowed, the response frame may not include second mapping information relating to another mapping relationship between the at least one TID of the multiple TIDs and the at least one link, and when the mapping relationship between the at least one TID of the multiple TIDs and the at least one link is not allowed, the response frame may further include second mapping information indicating a mapping relationship different from the first mapping relationship for the at least one TID of the multiple TIDs.

In this case, as described in FIGS. 10 to 16, the MLD may receive a management frame from a counterpart MLD, and the management frame may be transmitted only on the at least one link for which the mapping relationship is configured with the at least one TID. In addition, the management frame is transmitted on the basis of an allocated access category (AC), and is transmitted on the at least one link regardless of an access category configured for the at least one link.

In a case of the management frame, a specific TID is not allocated, and since there is no TID allocation, mapping between a TID and a link may be applied. Accordingly, the management frame may be transmitted through all links, regardless of mapping between the TID and the link, and in this case, the link through the management frame is transmitted may be an enabled link for which mapping between the TID and the link is configured.

In this case, when the management frame is transmitted only through the enabled link, a case where the management frame cannot be transmitted may occur if there is no enabled link except for the broadcasted management frame transmitted regardless of the link. Accordingly, a specific management frame may be transmitted even when there is no enabled link.

The above-mentioned description of the present invention is for illustrative purposes, and it will be understood that those who skilled in the art to which the present invention belongs can easily modify the present invention in other specific forms, without altering the technical ideas or essential characteristics of the present invention. Therefore, it should be understood that the embodiments described above are illustrative and are not limited in all aspects. For example, each element described as a single entity may be distributed and implemented, and likewise, elements described as being distributed may also be implemented in a combined form.

The scope of the present invention is defined by the appended claims rather than the above detailed description, and all changes or modifications derived from the meaning and range of the appended claims and equivalents thereof should be interpreted as being included within the scope of the present invention.

The invention claimed is:

1. A non-access point multi-link device (non-AP MLD) of a wireless communication system, the non-AP MLD comprising:

a communication module; and a processor configured to control the communication module, wherein the processor is configured to:

transmit a request frame including a traffic identifier (TID)-to-Link Mapping element to an AP MLD, wherein the TID-to-Link Mapping element includes i) one or more Link Mapping Of TID fields and ii) a link mapping presence subfield indicating whether each of the one or more Link Mapping Of TID fields are present, and wherein each of the one or more Link Mapping Of TID fields indicates a mapping between a corresponding TID among multiple TIDs and at least one link among multiple links, and receive a response frame as a response to the request frame, wherein, when all of at least one first link mapped to a first TID among the multiple TIDs are removed based on a multi-link reconfiguration procedure related to removal or addition of a link, the first TID among the multiple TIDs is mapped to all remaining enabled links of the non-AP MLD except all of the at least one first link among the multiple links, and wherein the first TID is mapped only to the at least one first link before the at least one first link is removed.

2. The MLD of claim 1, wherein a most recent mapping of at least one TID among the multiple TIDs with one or more links among the multiple links remains unchanged and valid when at least one Link Mapping Of TID field corresponding to the at least one TID is not present in the TID-to-Link Mapping element.

3. The MLD of claim 2, wherein the at least one TID is mapped to all setup links of multiple links when a mapping for the at least one TID has not been successfully negotiated.

4. The MLD of claim 1, wherein the request frame further includes transmission direction information indicating a transmission direction of the multiple TIDs, and wherein the multiple links are links for which setup between the non-AP MLD and the AP MLD has been completed.

5. The MLD of claim 1, wherein the response frame indicates whether the mapping indicated by the TID-to-Link Mapping element is accepted.

6. The MLD of claim 1, wherein a disabled link for the non-AP MLD is used for the request frame and the response frame when i) the request frame is a probe request frame, which is a management frame, ii) the response frame is a probe response frame, which is the management frame, and iii) there is the disabled link for the non-AP MLD.

7. The MLD of claim 1, wherein the processor is configured to, receive a management frame, wherein the management frame is transmitted only on one or more links mapped to the multiple TIDs.

8. The MLD of claim 7, wherein the management frame is transmitted on the basis of an assigned access category (AC).

9. A method for transmitting a frame by a non-access point multi-link device (non-AP MLD) in a wireless communication system, the method comprising:

transmitting a request frame for mapping between a traffic identifier (TID) and a link, wherein the request frame includes a traffic identifier (TID)-to-Link Mapping element to an AP MLD, wherein the TID-to-Link Mapping element includes i) one or more Link Mapping Of TID fields and ii) a link mapping presence subfield indicating whether each of the one or more Link Mapping Of TID fields are present, and wherein each of the one or more Link Mapping Of TID fields indicates a mapping between a corresponding TID among multiple TIDs and at least one link among multiple links; and receiving a response frame as a response to the request frame, wherein, when all of at least one first link mapped to a first TID among the multiple TIDs are removed based on a multi-link reconfiguration procedure related to removal or addition of a link, the first TID among the multiple TIDs is mapped to all remaining enabled links of the non-AP MLD except all of the at least one first link among the multiple links, and wherein the first TID is mapped only to the at least one first link before the at least one first link is removed.

10. The method of claim 9, wherein a most recent mapping of at least one TID among the multiple TIDs with one or more links among the multiple links remains unchanged and valid when at least one Link Mapping Of TID field corresponding to the at least one TID is not present in the TID-to-Link Mapping element.

11. The method of claim 10, wherein the at least one TID is mapped to all setup links of multiple links when a mapping for the at least one TID has not been successfully negotiated.

12. The method of claim 9, wherein the request frame further includes transmission direction information indicating a transmission direction of the multiple TIDs, and wherein the multiple links are links for which setup between the non-AP MLD and the AP MLD has been completed.

13. The method of claim 9, wherein the response frame indicates whether the mapping indicated by the TID to-Link Mapping element is accepted.

14. The method of claim 9, wherein a disabled link for the non-AP MLD is used for the request frame and the response frame when i) the request frame is a probe request frame, which is a management frame, ii) the response frame is a probe response frame, which is the management frame, and iii) there is the disabled link for the non-AP MLD.

15. The method of claim 9, further comprising:

receiving a management frame, wherein the management frame is transmitted only on one or more links mapped to the multiple TIDs.

16. The method of claim 15,
wherein the management frame is transmitted on the basis
of an assigned access category (AC).

* * * * *